United States Patent
Faraji-Dana et al.

(10) Patent No.: US 12,189,192 B2
(45) Date of Patent: Jan. 7, 2025

(54) OPTICAL OUT-COUPLER UNIT FOR OUT-COUPLING LIGHT FROM A WAVEGUIDE

(71) Applicant: ROCKLEY PHOTONICS LIMITED, Altrincham (GB)

(72) Inventors: Mohammadsadegh Faraji-Dana, Pasadena, CA (US); Farzaneh Afshinmanesh, Pasadena, CA (US); Iain Anteney, Newport (GB); Jeffrey Driscoll, San Jose, CA (US); Alexander Gondarenko, San Jose, CA (US); Dhiraj Kumar, Redondo Beach, CA (US); Abu Thomas, Oak Park, CA (US); Andrea Trita, Pasadena, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 99 days.

(21) Appl. No.: 17/744,108

(22) Filed: May 13, 2022

(65) Prior Publication Data
US 2022/0365280 A1   Nov. 17, 2022

Related U.S. Application Data

(60) Provisional application No. 63/188,359, filed on May 13, 2021.

(51) Int. Cl.
*G02B 6/42* (2006.01)
*G02B 6/12* (2006.01)
*G02B 6/26* (2006.01)

(52) U.S. Cl.
CPC .. *G02B 6/4214* (2013.01); *G02B 2006/12097* (2013.01); *G02B 2006/12104* (2013.01); *G02B 6/262* (2013.01)

(58) Field of Classification Search
CPC ..... G02B 6/4214; G02B 6/262; G02B 6/4212
See application file for complete search history.

(56) References Cited

U.S. PATENT DOCUMENTS 6,108,472 A    8/2000 Rickman et al.
6,266,468 B1 * 7/2001 Rickman ............ G02B 6/122
                                          385/44

(Continued)

OTHER PUBLICATIONS

Kim, KH., Q-Han Park, Perfect anti-reflection from first principles, 2013, Sci Rep, 3, 1062, p. 1 (Year: 2013).*

(Continued)

*Primary Examiner* — Michelle R Connelly
*Assistant Examiner* — Kirsten D. Endresen
(74) *Attorney, Agent, or Firm* — Lewis Roca Rothgerber Christie LLP

(57) ABSTRACT

An optical out-coupler unit for out-coupling light from a waveguide, comprising a substrate having a planar top surface, a waveguide arranged on the top surface of the substrate and having a facet, a reflective surface, wherein the reflective surface is arranged spaced apart from the facet and opposing the facet, wherein the reflective surface is inclined with respect to a normal to the top surface of the substrate by more than 45°. The optical out-coupler may be part of a photonic integrated chip (PIC).

10 Claims, 39 Drawing Sheets

(56) References Cited

U.S. PATENT DOCUMENTS

| | | | |
|---|---|---|---|
| 9,709,734 B2 | 7/2017 | Krishnamurthi et al. | |
| 9,753,218 B2 | 9/2017 | Kraft et al. | |
| 9,829,631 B2 | 11/2017 | Lambert | |
| 10,132,996 B2 | 11/2018 | Lambert | |
| 10,408,998 B2 | 9/2019 | Tseng et al. | |
| 10,782,468 B2 | 9/2020 | Ayi-Yovo et al. | |
| 10,816,738 B2* | 10/2020 | Mathai | G02B 6/4214 |
| 2004/0001664 A1* | 1/2004 | Wang | G02B 6/4214 385/15 |
| 2007/0290360 A1* | 12/2007 | Akage | G02B 6/122 257/773 |
| 2014/0363120 A1 | 12/2014 | Stephens et al. | |
| 2016/0211644 A1 | 7/2016 | Kleinfeld et al. | |
| 2018/0106954 A1* | 4/2018 | Ayi-Yovo | B23K 26/00 |

OTHER PUBLICATIONS

Pierce and Spicer, Optical constants of Si (Silicon), 1972, Phys. Rev. B, 5, accessed URL: <https://refractiveindex.info/?shelf=main&book=Si&page=Pierce> on Jan. 4, 2024 (Year: 1972).*

Luke et al., Optical constants of Si3N4, SIN (Silicon nitride), 2015, Opt. Lett. 40, accessed URL: <https://refractiveindex.info/?shelf=main&book=Si3N4&page=Luke> on Jan. 4, 2024 (Year: 2015).*

Arosa and de la Fuente, Optical constants of SiO2 (Silicon dioxide, Silica, Quartz), 2020, Opt. Lett., 45, accessed URL: <https://refractiveindex.info/?shelf=main&book=SiO2&page=Arosa> on Jan. 4, 2024 (Year: 2020).*

Kim et al., Perfect anti-reflection from first principles, 2013, Scientific Reports, vol. 3, Article No. 1062, p. 1 (Year: 2013).*

D. R. Smith and E. V. Loewenstein. Optical constants of far infrared materials. 3: plastics, 1975, App. Opt. 14, 1335-1341; accessed URL: https://refractiveindex.info/?shelf=other&book=Kapton&page=Smith (Year: 1975).*

I. H. Malitson. Interspecimen comparison of the refractive index of fused silica, 1965, J. Opt. Soc. Am. 55, 1205-1208; accessed URL: https://refractiveindex.info/?shelf=main&book=SiO2&page=Malitson (Year: 1965).*

Resnik, D. et al., "The role of Triton surfactant in anisotropic etching of { 1 1 0 } reflective planes on ( 1 0 0 ) silicon", Journal of Micromechanics and Microengineering, Apr. 22, 2005, pp. 1174-1183, Institute of Physics Publishing Ltd.

* cited by examiner

OPTICAL OUT-COUPLER UNIT FOR OUT-COUPLING LIGHT FROM A WAVEGUIDE

CROSS-REFERENCE TO RELATED APPLICATION(S)

The present application claims priority to and the benefit of U.S. Provisional Application No. 63/188,359, filed May 13, 2021, entitled "OPTICAL OUT-COUPLER UNIT FOR OUT-COUPLING LIGHT FROM A WAVEGUIDE", the entire content of which is incorporated herein by reference.

FIELD

One or more aspects of embodiments according to the present invention relate to an optical out-coupler unit for out-coupling light from a waveguide. The out-coupler unit includes a substrate having a planar top surface and a waveguide arranged on the top surface of the substrate and having a facet. Optionally, the out-coupler is integrated on the same chip as the waveguide, for example on a photonic integrated chip (PIC).

BACKGROUND

Optical out-couplers are used to couple light vertically out of a waveguide into the free space or into a material adjacent the out-coupler, or vice versa. On a photonic integrated chip, such an out-coupler may be arranged facing a facet of the waveguide. It is desired that reflection and transmission losses are minimised such that the light propagating in the waveguide is completely or almost completely coupled out of the waveguide into free space or into a material adjacent the out-coupler.

SUMMARY

Accordingly, some embodiments of the present invention aim to solve the above problems by an optical out-coupler unit according to claim 1. The dependent claims describe further embodiments of the invention.

An integrated optical out-coupler unit for out-coupling light from a waveguide comprises a substrate having a planar top surface, a waveguide arranged on the top surface of the substrate and having a facet, and a reflective surface, wherein the reflective surface is arranged spaced apart from the facet and opposing the facet, wherein the reflective surface is inclined with respect to a normal to the top surface by 45° or more.

The optical out-coupler unit provides efficient vertical out-coupling of light from the waveguide to the free space with reduced back-reflection into the fundamental mode. Furthermore, a divergence of beam exciting the optical out-coupler unit is minimal.

Optional features of the invention will now be set out. These are applicable singly or in any combination with any aspect of the invention.

In an optional embodiment, the optical out-coupler unit further comprises a transparent filler portion which is arranged in a space between the facet and the reflection surface.

In an optional embodiment, the optical out-coupler unit further comprises a reflection layer including the reflective surface, wherein the filler portion is made of material having a first refractive index and the reflection layer is made of material having a second refractive index, wherein the first refractive index is greater than the second refractive index.

In an optional embodiment, the difference between the first refractive index and the second refractive index is such that a light beam coming from the waveguide and impinging on the reflection layer is reflected by total internal reflection.

In an optional embodiment, the filler portion comprises amorphous silicon and/or the reflection layer comprises silicon oxide (SiO2).

In an optional embodiment, the reflection layer has a thickness of 250 nm or more. Optionally, the thickness of the reflection layer is approximately 300 nm or 300 nm±10 nm, 300 nm±20 nm, or 300 nm±30 nm.

In an optional embodiment, the optical out-coupler unit further comprises a reflection layer including the reflective surface, wherein the reflection layer comprises a metal material, in particular gold and/or aluminum.

In an optional embodiment, the optical out-coupler unit further comprises a cladding portion arranged on the waveguide.

In an optional embodiment, the optical out-coupler unit further comprises a reflection layer including the reflective surface, wherein the reflection layer and the cladding portion are made from the same material.

In an optional embodiment, the waveguide is a ridge-type waveguide and includes a base section and a rib arranged on the base section, wherein the cladding portion is arranged on the base section and has a height at least corresponding to a height of the rib and covering the top of the rib to form a flat top surface.

In an optional embodiment, the optical out-coupler unit further comprises a reflection layer and a transparent filler portion which is arranged in a space between the facet and the reflection layer, wherein the filler portion and the cladding portion form a flat surface.

In an optional embodiment, the optical out-coupler unit further comprises a supporting material portion having a side surface and a top surface, wherein the reflection layer extends over both the side surface and the top surface.

In an optional embodiment, the top surface of the supporting material portion has a height that corresponds to the height of the base section and/or the supporting material portion and the waveguide are made from the same material.

In an optional embodiment, a thickness of the reflection layer on the top surface of the supporting material portion is equal to a thickness of the cladding portion.

In an optional embodiment, the optical out-coupler unit further comprises an anti-reflection coating which includes a first top layer arranged at least on a surface of the filler portion which faces the surrounding of the optical out-coupler unit.

In an optional embodiment, the optical out-coupler unit further comprises an anti-reflection coating which includes a first top layer arranged on filler portion.

In an optional embodiment, the first top layer comprises material having a refractive index that is smaller than the refractive index of the filler portion.

In an optional embodiment, wherein the first top layer comprises silicon nitride (SiN).

In an optional embodiment, the first top layer has a thickness of $\lambda/4$, $\lambda$ being a wavelength in a wavelength range of electromagnetic radiation passing through the first top layer.

In an optional embodiment, the thickness is between 100 nm and 300 nm, optionally 183 nm±25 nm.

In an optional embodiment, the anti-reflection coating further comprises a second top layer arranged on first top layer.

In an optional embodiment, the second top layer comprises a material having a refractive index that is smaller than the refractive index of a material of the first top layer.

In an optional embodiment, the first top layer and/or the second top layer have a thickness of $\lambda/4$, $\lambda$ being a wavelength in a wavelength range of electromagnetic radiation passing through the first top layer and the second top layer.

In an optional embodiment, the first top layer comprises silicon nitride (SiN) and has a thickness between 100 nm and 200 nm, optionally 160 nm, and/or the second top layer comprises silicon oxide (SiO2) and has a thickness between 100 nm and 200 nm, optionally 150 nm.

In an optional embodiment, the top surface of the supporting material portion is free from the reflection layer.

In an optional embodiment, wherein the anti-reflection coating is directly arranged on the filler portion and/or the top surface of the supporting material portion.

In an optional embodiment, the reflective surface is inclined with respect to the normal to the top surface by 45°.

In an optional embodiment, a normal to the facet defines an angle of 70° to 89°, optionally 84°, with the reflective surface, wherein the angle is measured in a plane parallel to the substrate.

In an optional embodiment, the waveguide includes a bend, optionally a Euler bend.

In an optional embodiment, the reflective surface is inclined with respect to the normal to the top surface by 46° to 51°, optionally by 48° or 49°.

In an optional embodiment, a normal to the facet defines an angle of 90° with the reflective surface, wherein the angle is measured in a plane parallel to the substrate. This embodiment may also be defined in that the reflective surface is aligned on the substrate in a plane parallel to the surface of the substrate at approximately 90° to the direction of light emitted from the facet or the reflective surface is aligned on the substrate in a plane parallel to the surface of the substrate at approximately 90! to an orthogonal at the facet surface. Approximately 90° can be understood as 90°±1°, 90°±2°, or 90°±3°.

In an optional embodiment, a free space is provided between the facet and the reflective surface.

In an optional embodiment, the reflective surface is inclined with respect to the normal to the top surface by 52° to 57°, optionally by 54° to 55°.

In an optional embodiment, the optical out-coupler unit further comprises a supporting material portion having a side surface and a top surface, wherein the side surface includes the reflective surface.

In an optional embodiment, the optical out-coupler unit further comprises a reflection layer including the reflective surface and a supporting material portion having a side surface and a top surface, wherein the reflection layer extends over the side surface.

In an optional embodiment, the supporting material portion and the waveguide are made from the same material.

In an optional embodiment, the optical out-coupler unit further comprises an intermediate layer covering the facet, wherein a refractive index of the intermediate layer is between a refractive index of the waveguide and 1.

In an optional embodiment, the substrate includes an upper substrate layer and a lower substrate layer, wherein the upper substrate layer includes an opening between the side surface of the supporting material portion and the facet and/or the lower substrate layer includes a recess between the side surface of the supporting material portion and the facet, wherein the intermediate layer and/or the reflection layer extend over a side surface of the opening to a bottom surface of the recess.

In an optional embodiment, the optical out-coupler further comprises a waveguide substrate being a layer of material on the substrate and including two waveguide cavities which extend parallel to each other for forming the waveguide between the two waveguide cavities.

In an optional embodiment, wherein a side surface of the waveguide substrate forms the facet, and the waveguide cavities are spaced apart from the side surface of the waveguide substrate for forming a T-bar.

In an optional embodiment, wherein the filler portion includes two parallelly extending filler cavities forming a second waveguide.

In an optional embodiment, wherein the filler cavities are spaced apart from the facet for forming a T-bar facing the waveguide.

In an optional embodiment, wherein the filler cavities are spaced apart from the reflective surface for forming a T-bar facing the reflective surface.

In an optional embodiment, wherein a normal to the facet defines an angle of 70° to 89°, optionally 78° to 82°, further optionally 80°, with the reflective surface, wherein the angle is measured in a plane parallel to the substrate.

In an optional embodiment, wherein the second waveguide is straight and in line with the waveguide.

In an optional embodiment, wherein the second waveguide includes a bend, optionally a Euler bend.

In an optional embodiment, wherein a first end surface of the second waveguide facing the facet is parallel to the facet and a normal to a second end surface of the second waveguide facing the reflective surface is orthogonal to the reflective surface.

In an optional embodiment, the waveguide includes a T-bar providing the facet.

Further optional features of the invention are set out below.

BRIEF DESCRIPTION OF THE DRAWINGS

Embodiments of the invention will now be described by way of example with reference to the accompanying drawings in which:

FIG. 1B is a cross-sectional view in a y-z-plane of the optical out-coupler unit of FIG. 1a;

FIG. 1c is a cross-sectional view in a x-z-plane of the optical out-coupler unit of FIG. 1a;

FIG. 1d is a cross-sectional view in a x-y-plane of the optical out-coupler unit of FIG. 1a;

DETAILED DESCRIPTION

Figure 1A:
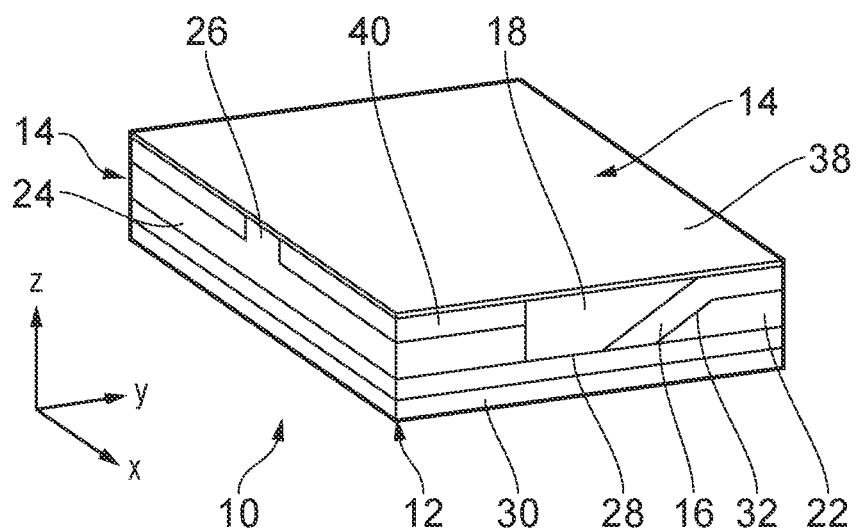
FIG. 1a is a perspective view of a first embodiment of an optical out-coupler unit.

The detailed description set forth below in connection with the appended drawings is intended as a description of exemplary embodiments of an optical out-coupler unit provided in accordance with the present invention and is not intended to represent the only forms in which the present invention may be constructed or utilized.

The present out-coupler unit may be regarded as a combination of a section of a waveguide and the actual out-coupler upon a photonic chip. For example, the waveguide of the optical out-coupler unit may be a section of a waveguide from which the electromagnetic radiation propagating therein is intended to be out-coupled. Thus, the waveguide of the out-coupler unit may be a terminal section of a waveguide. However, the waveguide of the out-coupler unit may include a complete waveguide.

The waveguide is configured to transmit or propagate electromagnetic radiation. For example, the electromagnetic radiation cannot exit the waveguide due to total internal reflection. The waveguide may be configured to transmit electromagnetic radiation in the visible spectrum and/or in the infrared (IR) spectrum, for example electromagnetic radiation having a wavelength between 1 µm and 2 µm.

The waveguide may be a strip waveguide or a rib/ridge waveguide. A strip waveguide may include a rectangular cross-section. A fundamental mode of the electromagnetic radiation propagating within the strip waveguide may be symmetrical in a cross-sectional view of the waveguide. The rib/ridge waveguide may include base section on which a rib is arranged. The base section and/or the rib may include a rectangular cross-section, whereby a width of the base section is larger than a width of the rib. A fundamental mode of the electromagnetic radiation propagating within the rib/ridge waveguide may be asymmetrical in a cross-sectional view of the waveguide.

The waveguide is arranged on a planar top surface of a substrate. The substrate is provided for supporting the waveguide, a reflection layer and/or other components of the out-coupler unit. The substrate may be a waiver and/or includes other commonly known substrate materials. The substrate may be made or include silicon oxide ($SiO_2$) or (crystalline) silicon. The substrate may include one or more layers of (different) materials.

The waveguide may include a bottom (lower) surface and the top (upper) surface as well as a plurality of side surface. The terms "top" and "bottom" refer to the usual arrangement of the substrate or the optical out-coupler unit, as for example visible in the attached drawings. The top surface as well as the bottom surface may be planar. The top surface of the substrate may be understood to refer to the surface of the substrate upon which the waveguide is arranged.

The term "top surface" as used in the following may also refer to a surface of the component, portion and/or material of the optical out-coupler unit that defines an interface with another component, portion and/or material of the optical out-coupler and/or the free space. The term "top surface" in relation to a component refers to that interface of the component, portion and/or material of the optical out-coupler unit that extends parallel or almost parallel to the top surface of the substrate and/or that is arranged furthest away from the top surface of the substrate. The components, portions and/or materials of the optical out-coupler may have two surfaces/interfaces as defined above, whereby the "top surface" is that surface of the two surfaces/interfaces is farther away from the top surface of the substrate compared to the other one of the two surfaces/interfaces.

A distal end surface of the waveguide may be considered a facet. In other words, the waveguide terminates at the facet and the electromagnetic radiation propagating within the waveguide can exit the waveguide at the facet. The facet may be a planar (flat) surface which is inclined to the substrate by 90°. In other words, the facet may be arranged perpendicular to the substrate or parallel to a normal to the top surface of the substrate. What is more, the facet may be arranged perpendicular to the direction of propagation of the electromagnetic radiation propagating within the waveguide. Alternatively, the facet may be tilted about an axis perpendicular to the direction of propagation in order to reduce back reflection at the facet interface.

The waveguide may include a T-bar which provides the facet. The T-bar may be constituted by an end portion of the waveguide. The end portion can be formed so that the end portion and the distal end surface provided thereon (and being the facet) have a width greater than a width of the waveguide leading to the end portion. Optionally, the end portion and/or the facet have a width of least W+2R, wherein W is the width of the waveguide leading to the end portion and R is the radius of curvature of corners of the end portion caused as a result of the manufacturing process used to fabricate the end portion or T-bar. This may ensure that an area of the facet at which the electromagnetic radiation exits the waveguide is planar, i.e., free from curvatures or round corners that may result in back reflection of the electromagnetic radiation at the facet. Thus, the T-bar can help to prevent back reflection at the facet. The T-bar may have a height that is equal to the height of the waveguide. Optionally, a distal end surface of the T-bar corresponds to the facet of the waveguide. The features and characteristics of the facet as described herein equally applies to distal end phase of the T-bar.

The reflective surface (of the reflection layer) is that surface or interface at which the electromagnetic radiation exiting the waveguide at the facet is reflected to be coupled out of the out-coupler unit. This needs to be understood in terms of a theoretical consideration of the reflection of electromagnetic radiation at a reflective surface and/or interface. Thus, the reflective surface may be understood in a mathematical sense at which the electromagnetic radiation is effectively reflected. A more precise description of the reflection at the reflective surface or reflection layer may reveal that the impinging electromagnetic radiation actually partially penetrates the reflective surface and/or the reflection layer and, thus, is not precisely reflected at the reflective surface. However, in terms of a mathematical description of the reflection, the reflective surface may be used to define the location and the properties of the reflection.

The reflective surface may be an outer surface of the reflection layer which faces the facet. The reflective surface may also be an interface between the reflection layer and another material being in contact with the outer surface of the reflection layer.

The direction of extension of the waveguide may be defined by the extension of the waveguide. This direction of extension of the waveguide may also define the effective direction of propagation of the electromagnetic radiation propagating within the waveguide. The direction of extension of the waveguide or the effective direction of propagation of the electromagnetic radiation may intersect with the reflection layer and/or the reflective surface. In other words, the reflective surface opposes the facet. What is more, the reflective surface is spaced apart from the facet along the direction of extension of the waveguide. As a result, there is a space between the facet and a reflective surface which can be filled with material or is free.

For example, there is a distance between the line where the facet contacts the substrate and the line where the reflective surface contacts the substrate. More generally, there is a certain distance between the point or line of the reflective surface that is closest to the facet and the point or line of the facet which is closest to the reflective surface. Since the reflective surface is inclined to the substrate, these points or lines are on the top surface of the substrate or adjacent thereto.

The reflective surface may be planar (flat) or, in other words, not bent. The reflection layer and, in particular, the reflective surface protrudes from the top surface of the substrate. The reflective surface may be in contact the top surface of the substrate, optionally along a straight line. An angle between the reflective surface and the normal to the top surface is 45° or more. In other words, an angle between the reflective surface and the top surface is 45° or less. The normal may be an imaginary line which is perpendicular to the top surface of the substrate or a substrate plane axis.

The filler portion may completely fill the space between the facet and the reflective surface. The filler portion may be in direct contact with the facet and/or the reflective surface. The filler portion may have a height measured from the top surface of the substrate which is identical to the height of the waveguide measured from the top surface of the substrate and/or the height of the reflection layer which is also measured from the top surface of the substrate. The height is measured perpendicular to the top surface of the substrate. Thus, the waveguide, the filler portion and/or the reflection layer may define a common and planar top surface.

The filler portion is transparent to the electromagnetic radiation propagating within the waveguide. Thus, the electromagnetic radiation can propagate through the filler portion. The filler portion may have a refractive index that is lower than the refractive index of the waveguide and/or higher than the refractive index of air. Therefore, the difference between the refractive indices of the waveguide material and of the material of the filler portion is smaller than the difference between the refractive indices of the waveguide material and of air. This allows to reduce back reflection of the electromagnetic radiation propagating through the facet compared to a situation where the facet is in contact with air; in other words compared to a situation where no filler portion is present. The filler portion may therefore provide improved out-coupling of the electromagnetic radiation from the waveguide. The filler portion increases the transmission ratio out of the waveguide at the facet.

The filler portion provides a refractive index interface at a top (or upper/outer) surface with the surrounding free space, i.e. air. In other words, electromagnetic radiation that is reflected at the reflective surface is partially reflected at the top surface of the filler portion—at the interface of the filler portion with the free space (i.e. at the surface where the electromagnetic radiation exits the filler portion). This interface gives rise to a further interface at which some of the electromagnetic radiation to be coupled-out can be reflected. In order to reduce the ratio of reflection at the filler portion/air interface, the angle between the reflective surface and the normal to the top surface of the substrate may be between 46° and 51°, optionally 48° or 49°. The angle between the reflective surface and the top surface of the substrate may be between 48° and 49°. These angles reduce the proportion of reflection at the filler portion/air interface and, thus, improve the overall ratio of the out coupled intensity of the electromagnetic radiation compared to the intensity of the electromagnetic radiation propagating within the waveguide. In addition, these angles provide beams exiting the optical out-coupler unit whose divergence is reduced. In particular, the divergence of the beams exiting the optical out-coupler unit is minimal at angles of 48° and 49°.

In the embodiment, where the angle between the reflective surface and the normal to the top surface of the substrate may be between 46° and 51°, optionally 48° or 49°, a normal to the facet defines an angle of 90° with the reflective surface. The angle is measured in a plane parallel to the substrate. In this case, the waveguide has a direction of extension that is perpendicular to the reflective surface. The inclination of the reflective surface avoids back reflection of electromagnetic radiation back into the waveguide so that the normal to the facet can be chosen to define an angle of 90° with the reflective surface. This orientation of the waveguide can of course be employed for different angles of the reflective surface with respect to the top surface of the substrate.

The refractive index of the material of the filler portion may further fulfil a second condition: the material of the filler portion may have a (first) refractive index that is greater than a (second) refractive index of a material of the reflection layer. This condition allows total internal reflection at the interface between the filler portion and the reflection layer. This interface may be considered as the reflective surface.

In particular, the difference between the first refractive index and the second refractive index is such that the critical angle which defines the minimum angle of incidence for which total internal reflection occurs corresponds to the angle between the reflective surface and the top surface of the substrate. The refractive index difference therefore defines a minimum critical angle which corresponds to the angle between a reflective surface and the top surface of the substrate or 90° minus the angle between the normal to the top surface of the substrate and the reflective surface. Thus, each refractive index difference for any given two material need to provide a minimum critical angle of 45° or more. However, to arrange for small deviations of the incident angle of the impinging light onto the reflective surface, the refractive index difference between the filler portion and the reflection layer is optionally chosen such that the critical angle is 40° or less.

For example, the filler portion comprises amorphous silicon and/or the reflection layer comprises silicon oxide. These examples for the filler portion and the reflection layer provide a critical angle which allows total internal reflection at the reflective surface—the interface between the filler portion and the reflection layer.

Reflection by means of total internal reflection provides a reflective surface having the characteristics of a perfect mirror or PEC (perfect electric conductor). An alternative way of providing a reflective surface is achieved by the deposition of a thin metallic layer acting as a reflection layer. However, due to the intrinsic material loss of metals, they do not provide the same reflection capabilities as achieved by total internal reflection. Furthermore, the integration of metal in a Si-photonics processes for manufacturing optical circuits is not straight-forward. Thus, implementing the reflective surface by total internal reflection avoids the need for handling metallic materials in the manufacturing process of the optical out-coupler unit. This technique for manufacturing the optical out-coupler unit is therefore compatible with monolithic fabrication techniques. In addition, the total insertion loss is much smaller than the similar case, where a metal is deposited.

The reflection layer may have a (minimal) thickness of 250 nm or more, optionally a thickness of 300 nm. The thickness of the reflection layer is measured perpendicular to its extension. Optionally, the reflection layer has a constant thickness. If not, the minimal thickness at any point of the reflection layer is 250 nm or more. This minimum thickness of the reflection layer eliminates transmission through the reflection layer by the impinging light for example due to tunnelling effects. In other words, a thickness of less than 250 nm of the reflection layer may result in that that fractions of the impinging light may propagate through the reflection layer.

The reflection layer may be arranged on an inclined side surface of a supporting material portion. The side surface of the supporting material portion may have the same angle of inclination with respect to the normal to the top surface of the substrate as the reflective surface. This allows a reflection layer having a constant thickness. However, it is also possible that the side surface of the supporting material portion has an angle different to the angle of the reflective surface. In this case, the reflection layer may have a varying thickness to accommodate a reflective surface of 45° or more.

The reflection surface may extend beyond the side surface of the supporting material portion onto a top (or upper) surface of material supporting portion. The top surface of the material supporting portion is that surface of the material supporting portion that is arranged opposite to a bottom surface of the material supporting portion which is in contact with the substrate. Further, the reflection layer may cover a part of the top surface of the substrate between the side surface of the supporting material portion and the facet. For example, the reflection layer may be a strip on the top surface of the substrate directly adjacent to the side surface of the supporting material portion.

The reflection layer may be a layer of constant thickness that is arranged on the side surface of the supporting material portion. The supporting material portion may be made from any materials suitable to be manufactured as having an inclined side surface. For example, the supporting material portion may be made from the same material as the substrate, the waveguide or other materials is used in the manufacturing of the optical out-coupler unit.

The supporting material portion may be used as a substrate for a metal layer acting as the reflection layer in an alternative embodiment of the invention. Gold, silver, and/or aluminium may be used for the metal layer. The surface of the metal layer facing the facet acts as a reflective surface. This embodiment allows for a greater choice of the material arranged between the facet and reflection layer, i.e. the material of the filler portion. Further, the metal reflection layer allows a thickness of less than 250 nm.

In an optional embodiment, the optical out-coupler unit includes a cladding portion which is arranged on the waveguide. The cladding portion is provided for increasing the refractive index contrast between the waveguide and its surroundings. Thus, the cladding portion may contribute to the confinement of electromagnetic radiation within the waveguide. In case of a strip waveguide, the cladding portion may be arranged on a top surface of the strip waveguide.

In an optional embodiment, the ridge waveguide may include a cladding portion which is arranged on the base section. Optionally, the height of the cladding portion corresponds to at least the height of the rib. The cladding portion can also be arranged on the rib. However, the thickness of the cladding portion on the rib is smaller compared to the thickness of the cladding portion on the base section. Optionally, the thickness of the cladding portion on the base section is approximately equal to sum of the height of the rib and the thickness of the cladding portion on the rib. Thus, the cladding portion may form a flat surface.

The cladding portion and the reflection layer may be made from the same material. Optionally, the cladding portion and the reflection portion may be applied in a single process step when manufacturing the optical out-coupler unit.

In an optional embodiment, the top surface of the supporting material portion has a height that corresponds to the height of waveguide, in particular its base section. The supporting material portion and the waveguide can be made from the same material. The supporting material portion and the waveguide may be used to form a single waveguide in which a trench was inserted to provide the side surface of the supporting material portion for supporting the reflection layer.

In an optional embodiment, a thickness of the reflection layer on the top surface and/or on the side surface of the supporting material portion corresponds to a thickness of the cladding portion. Thus, the reflection layer and the cladding portion may define a flat surface. What is more, the reflection layer and the cladding layer can be manufactured in a single manufacturing step, such as a deposition step.

In the embodiment in which a metal layer is used as a reflection layer, a transparent filler portion may be provided within the space between the facet and the reflection layer. This filler portion may have the same characteristics as the filler portion discussed in conjunction with the embodiment in which the reflection is achieved by total internal reflection. However, in case of the metal reflection layer, the material of the filler portion can be chosen more freely since its refractive index does not need provide a refractive index difference with the reflection layer for generating total internal reflection. Thus, the material of the filler portion can be chosen in order to reduce back reflection at the facet and reflection at the top surface of the filler portion, i.e. at the filler portion/air interface. In addition, the material for the filler portion may be chosen with regards to an advantageous manufacturing process of the out-coupler unit.

For example, the filler portion comprises silicon oxide ($SiO_2$) and/or silicon nitride (SiN). The material of the filler portion can be the same as the material of the substrate, which can simplify the manufacturing process.

The reflective surface may be inclined by 46° to 51°, optionally by 48° or 49°, with respect to the normal to the top surface of the substrate in the embodiment having a metal layer as the reflection layer. Similar to advantages as discussed in conjunction with the embodiment having a reflective surface by total internal reflection, the defined angle ranges reduce the back reflection at the filler portion/air interface and reduce the divergence of the beam exiting the optical out-coupler unit.

Since the reflection layer is made from a metal material, the thickness of the reflection layer may be 150 nm or more. Thus, the thickness of the metal layer can be less than the thickness of the reflection layer providing total internal reflection. This is due to the fact that the reflection is not achieved by total internal reflection but by the reflection properties of the metal layer. Thereby, the impinging electromagnetic radiation does not penetrate as far into the reflection layer compared to a situation where the reflection is achieved by total internal reflection.

In a different optional embodiment, the reflective surface is inclined with respect to the normal to the top surface by 45°. This degree of inclination results in the electromagnetic radiation that is reflected by the reflective surface impinges by 90° on the top surface of the filler portion and/or the reflection layer. This may ensure minimal reflection at the interface between the filler portion and air, at the interface between the filler portion of the anti-reflection coating, and/or at the interface between the anti-reflection coating and air.

In this embodiment, the facet may be inclined with respect to the reflective surface, optionally between 1° and 20°, for example 6°. In other words, a normal to the facet defines an angle θ of 70° to 89°, optionally 84°, with the reflective surface. This angle is measured in a plane parallel to the substrate. In other words, the defined arrangement refers to the direction of extension of the waveguide and, therefore, of the direction of propagation of electromagnetic radiation before impinging on the reflective surface. More generally, there are a plurality of imaginary lines extending through the facet and the reflective surface and being parallel to the substrate each of which define an angle of 70° to 89°, optionally 84° with both the facet and the reflective surface in a plane parallel to the substrate. Thus, there are a plurality of pairs of imaginary lines that extend within the facet and the reflective surface which are not parallel to each other. This embodiment relates to angle of 1° and 20°, for example 6° between the facet and the reflective surface. The facet and the reflective surface are not "parallel" to each other. In the other embodiment, where the normal to the facet defines an angle of 90° with the reflective surface, the facet is parallel to a plane perpendicular to the direction of propagation in the waveguide and thus also parallel to a vertical projection of the reflective surface.

The angle between the direction of extension of the waveguide and the reflective surface may reduce amount of light that is back reflected into the waveguide. For example, in case of an angle of 0° between the normal of the facet of the reflective surface, a light reflected at the interface between the out-coupler unit and the surrounding air would be reflected back into the waveguide. However, due to the angle provided between the facet and the reflective surface, the light reflected at this interface is not reflected back into the waveguide.

Such an arrangement of reflective surface with regard to the facet may be used to reduce back reflection at the facet, i.e. at the interface between the waveguide and its surroundings at the facet. The facet may be inclined with respect to a plane perpendicular to the direction of propagation in the waveguide and thus also inclined by the same angle with respect to a vertical projection of the reflective surface. The reflective surface providing reflection by total internal reflection may be angled with regard to the facet.

Waveguides on optical arrays normally extend in straight directions, for example at 0° and 90° in a top view on the optical array. For example, the reflective surface may be arranged at 90° in a top view. In this case, the waveguide may extend in the 0° direction in a top view. If the facet as the above-described angle with regard to the reflective surface, there may be a bent section of the waveguide which provides a transition between 0° extension section of the waveguide and the facet. Thus, the waveguide may include a bend or bending. This bend may be a Euler bend since Euler bends are known for minimizing transmission losses in bent sections of the waveguide. A Euler bend is a bend whose curvature changes linearly with its curve length. In other words, the waveguide includes a Euler bend for facilitating an angle of the facet with respect to the reflective surface.

In case that there is a filler portion arranged between the facet and the reflection layer, an anti-reflection coating may be arranged on a top surface of the filler portion. The top surface of the filler portion may define an interface between the filler portion and the free space. The top surface of the filler portion may be that surface of the filler portion at which the light is coupled out into the free space. Due to the refractive index difference between the filler portion and air, reflection of the propagating electromagnetic radiation occurs. The anti-reflection coating is provided for reducing the refractive index difference and, thus, the reflection at the top surface of the filler portion.

In an optional embodiment, the top surface of the filler portion and the cladding portion form a flat surface, i.e. a surface free of steps, recesses, protrusions or the like. Further optionally, the anti-reflection coating covers the filler portion and, optionally, the cladding portion. However, the anti-reflection coating does not cover the complete cladding portion, but only a small section adjacent to the filler portion. For example, this ensures during the deposition of the anti-reflection coating that the anti-reflection coating covers the complete top surface of the filler portion. Thus, the anti-reflection coating can be selectively applied to the filler portion. However, it is also possible to apply the anti-reflection coating to the top surface of the optical out-coupler which exhibits a flat surface.

The anti-reflection coating may include a first top layer that is arranged on the top surface of the filler portion. The first top layer comprises a material having a refractive index that is smaller than the refractive index of the filler portion and that is greater than the refractive index of air. The material of the first top layer has a refractive index that is intermediate to the refractive index of the filler portion and the refractive index of air. In an optional embodiment, the first top layer comprises silicon nitride.

The first top layer may have a thickness of $\lambda/4$, wherein $\lambda$ is the wavelength of the electromagnetic radiation propagating within the filler portion and reflected by the reflective surface. In case that the electromagnetic radiation propagating within the filler portion and reflected by the reflective surface covers a wavelength band (there are a plurality of wavelengths of radiation), the wavelength $\lambda$ is a wavelength within the wavelength band. For example, wavelength $\lambda$ is the median or average wavelength of the wavelength band. Alternatively, the wavelength $\lambda$ can be the minimum or maximum of the wavelength band.

The effect of the first top layer is best for electromagnetically radiation having a wavelength close or identical to the wavelength $\lambda$. The more the wavelength of the electromagnetic radiation differs from the wavelength $\lambda$, the less pronounced is the effect of the first top layer. This is a common feature of an anti-reflection coating.

In case the electromagnetic radiation propagating through the filler portion (the out-coupled electromagnetic radiation) has a wavelength between 1.2 µm and 2.4 µm, the thickness of the first top layer may be between 200 nm and 400 nm, optionally 260 nm. This range especially applies if amorphous silicon is used for the filler portion and silicon nitride is used for the material of the first top layer.

The anti-reflection coating may further include a second top layer which is arranged on the first top layer. The first top layer is arranged between the filler portion and the second top layer. The outer surface of the second top layer (the surface that is not in contact with the first top layer) provides the interface to the free space.

The first top layer and/or the second top layer may have a constant thickness. The first top layer and/or the second top layer may completely cover the top surface of the filler portion. In addition, the first top layer and/or the second top layer may extend onto the waveguide, the reflection layer, the cladding portion and/or the supporting material portion.

The first top layer and/or the second top layer may be made from materials that are suitably chosen to reduce the back reflection at the filler portion/air interface. In particular, the materials of the filler portion, the first top layer, and the second top layer are chosen with respect to each other such that the back reflection at the filler portion/air interface is minimised. In addition, the thicknesses of the first top layer and a second top layer are appropriately set regarding the chosen materials and the wavelength propagating within the first filler portion.

The material of the second top layer may have a refractive index that is smaller than the refractive index of the material of the first top layer. The refractive index decreases from the filler portion via the first top layer to the second top layer and into the air. The thickness of the first top layer and/or the second top player is chosen depending on the electromagnetic radiation to be propagated within the filler portion. For example, the first top layer and/or the second top layer have a thickness of $\lambda/4$, wherein $\lambda$, is a wavelength in a wavelength range of electromagnetic radiation passing through the first top layer and the second top layer. The characteristics and/or features of the thickness of the first top layer as discussed above equally apply for the thickness of the second top layer.

In an optional embodiment, the first top layer comprises silicon nitride and has a thickness between 100 nm and 200 nm, optionally 160 nm, and/or the second top layer comprises silicon oxide and has a thickness between 100 nm and 200 nm, optionally 150 nm.

An alternative to the filler portion is to leave the space between the facet and the reflective surface empty i.e., to provide a free space between the facet and the reflective surface. This free space is usually filled with air so that the refractive index between the facet and a reflective surface is equal to 1. This embodiment may be described as providing air between the facet and the reflective surface. This embodiment has the advantage that no interface between the filler portion and the surrounding exists which induce reflection of the electromagnetic radiation at this interface. Thus, there is no need to provide the anti-reflection coating.

As there is no potential source of back reflection due to the lack of the filler portion, the reflective surface can be inclined with respect to the normal to the top surface by 52° to 57°, optionally by 54° to 55°.

Further, the free space allows to provide the reflective surface by the side surface of the supporting material portion. This embodiment obviates the need to provide a separate reflection layer. The level of reflection between free space (i.e., air) and the supporting material portion is high due to the substantial difference between refractive index of air and the material of the supporting material portion. The level of reflection can be increased to 100% (corresponding to total internal reflection) if the angle of the reflective surface or the angle of the side surface of the supporting portion is between 52° to 57°. For example, the supporting material portion and the waveguide can made from the same material such as silicon. The optical out-coupler unit be manufactured using silicon on insulator (SOI) technology. The waveguide and the supporting material portion may correspond to the silicon on the insulator.

In a different embodiment, the reflection layer is provided on the side surface of the supporting material portion. For example, reflection layer extends over the whole area of the side surface which is opposite to the facet. The reflection layer may be a continuous layer on the side surface of the supporting material portion.

Since the free space is filled with air and, thus, includes a low refractive index, the refractive index mismatch between the waveguide (facet) and the free space can be reduced by providing an intermediate layer which covers the facet. The refractive index of the material of intermediate layer is between the refractive index of the waveguide and the refractive index of air. The intermediate layer may cover the complete facet. The intermediate layer may be a layer of constant thickness. The material of the intermediate layer may be silicon nitride (SiN). The intermediate layer may extend onto a top surface of the waveguide, the cladding portion, and/or a top surface of the substrate. This may be done to ensure that the intermediate layer covers the complete facet.

The substrate may include an upper substrate layer and the lower substrate layer. The upper substrate layer may include buried oxide (BOX) and lower substrate layer may include silicon providing the silicon on insulator configuration of the optical out-coupler unit. The upper substrate layer may be an insulating layer which separates/insulates the waveguide and/or supporting material portion from the lower substrate layer. Other insulating materials for the upper substrate layer are possible. The waveguide and/or the supporting material portion may have a height of 3 µm as measured from the top surface of the substrate.

The upper substrate layer may include an opening. This means that the upper substrate layer is completely removed over a certain area, for example between the facet and the side surface of the supporting material portion. This may be achieved by etching the upper substrate layer between the facet and the side surface of the supporting material portion. This etching may also remove parts of the lower substrate layer in the same area providing a recess in the lower substrate layer. In other words, a recess in the lower substrate layer corresponds with the opening in the upper substrate layer. The thickness of the lower substrate layer is smaller inside the recesses compared to the thickness of the lower substrate layer outside the recess.

The intermediate layer and/or the reflection layer may extend over side surfaces of the opening and/or the recess. Further, it is possible that the intermediate layer and/or the reflection layer extend onto a bottom surface of the recess, i.e., over the lower substrate layer. Still further, it is possible that the intermediate layer and/or the reflection layer extend over top surfaces of the waveguide and/or the supporting material portion, respectively. These scenarios may ensure that the complete facet and/or the complete side surface of the supporting material portion are covered with the intermediate layer and/or the reflection layer, respectively. The provision of the opening and/or the recess can help to prevent a situation in which the intermediate layer and/or the reflection layer cover parts of the top surface of the upper substrate layer. In this case, the intermediate layer would not have a constant thickness over the facet and/or the reflection layer would not have a constant thickness of the side surface of the supporting material portion. Thus, in general, the opening and the recess help to provide the intermediate layer and/or the reflection layer to cover the complete facet and/or the complete side surface, respectively, and to provide a constant thickness.

The waveguide may be manufactured by providing waveguide cavities in a layer of material which is arranged on the substrate and forms a waveguide substrate. For example, a continuous layer of material can be arranged on the substrate such as the upper substrate layer. This layer of material may be crystalline silicon and can be considered a waveguide substrate. Two waveguide cavities are provided in this waveguide substrate which extend parallel to each other. This means that a distance between the two waveguide cavities is constant along the direction of extension of the waveguide cavities. The distance between the two waveguide cavities corresponds to the width of the waveguide. This allows a simple production of the optical out-coupler unit as a photonic integrated chip (PIC).

Due to the parallel extension of the waveguide cavities, the width of the waveguide is constant along its direction of extension. The waveguide cavities may provide a free space within the layer of material on the substrate (i.e., within the waveguide substrate). Alternatively, the waveguide cavities may be filled with a material of low refractive index, i.e., a material having a refractive index close to the refractive index of air. This facilitates total internal reflection at the interface between the waveguide and the waveguide cavity.

The waveguide cavities may be an elongated recess in waveguide substrate. The waveguide cavities may extend through the waveguide substrate in a thickness direction (z-direction) and end at or in the substrate. In other words, a bottom surface of the waveguide cavity is formed by the substrate. This configuration provides a strip waveguide. Alternatively, a bottom surface of the waveguide cavity is formed by the waveguide substrate, i.e. the waveguide cavities do not extend completely through the layer of material and end before the substrate when seen from top. This configuration provides or a rib/ridge waveguide.

The layer of material on substrate or the waveguide substrate has a side surface which faces the reflective surface. This side surface of the layer of material or a section of the side surface of the waveguide substrate form the facet. The side surface of the layer of material may be in contact with the filler portion or faces a free space if no filler portion is provided. The waveguide cavities can be spaced apart from the side surface of the waveguide substrate. This forms a T-bar since there is a portion of the waveguide substrate between the end of the waveguide cavities and the facet. The distance of the facet to the end of the waveguide cavity defines the width of the T-bar. Alternatively, the waveguide cavities end at the facet such that no T-bar is provided. In this configuration, the waveguide cavities can contact the filler portion.

The filler portion may also include two parallelly extending recesses or filler cavities which form a second waveguide. The same considerations, optional features, and/or characteristics as discussed in conjunction with the waveguide cavities equally apply to the filler cavities within the filler portion. In other words, the filler portion corresponds to the waveguide substrate and the waveguide cavity corresponds to the filler cavity. For example, a bottom surface of the filler cavity is provided by the substrate forming a strip waveguide in the filler portion. This configuration is optionally provided if a strip waveguide is provided in the waveguide substrate.

The second waveguide and the waveguide in the waveguide substrate may be arranged in line and/or may have the same width. This means that the distance between the two waveguide cavities corresponds to the distance between the two filler cavities. Further, a line of extension of the waveguide coincides with a line of extension of the second waveguide. In other words, the second waveguide is not laterally offset with respect to the waveguide. The thickness of the waveguide substrate and the thickness of the filler portion may be the same so that the waveguide and the second waveguide may have the same height.

The second waveguide may include a T-bar at an end facing the facet and/or at an end facing the reflective surface. In other words, the second waveguide may include two T-bars. To this end, the filler cavities may be spaced apart from the facet such that there is a portion of the filler portion between an end of the filler cavities and the facet. Similarly, the filler cavities may be spaced apart from the reflective surface, in particular from a point where the reflective surface contacts the substrate, so that a portion of the filler portion is provided between the filler cavities and the reflective surface.

The provision of the second waveguide allows to significantly reduce the distance between the reflective surface and the end of the second waveguide compared to the distance between the reflective surface and the waveguide or facet. This distance may be measured as described above. For example, the distance between the facet and the reflective surface may be 20 μm±5 μm, whereas the distance between the reflective surface and the second waveguide (the T-bar of the second waveguide) is 2 μm±0.5 μm. The material of the filler portion may be amorphous silicon whereas the waveguide substrate may be crystalline silicon. The provision of the second waveguide reduces loss or back reflection.

The waveguide may be inclined to the reflective surface, optionally between 10°±2°. In other words, a normal to the facet defines an angle $\theta$ of 78° to 82°, optionally 80°, with the reflective surface. The angle $\theta$ is measured in a plane parallel to the substrate. Above considerations with regard to the angle $\theta$ equally apply. In this case, the direction of extension of the waveguide and/or of the waveguide cavities define the angle $\theta$ with the reflective surface. Further, the above-described optional features, advantages and/or characteristics of this inclined configuration equally apply. The angle $\theta$ may be 90° which correspond to a configuration in which the waveguide is not inclined with respect to the reflective surface.

The second waveguide may be straight, i.e., free of bends. In this case, the second waveguide also defines the angle $\theta$ with the reflective surface. Alternatively, the second waveguide includes a bend such as Euler bend. To this end, a first end surface of the second waveguide (this may correspond to the side surface of the T-bar) which faces the facet is parallel to the facet. Further, a normal to a second end surface of the second waveguide which faces the reflective surface is orthogonal to the reflective surface. A plurality of lines extending through the second end surface is parallel to a plurality of lines extending to the reflective surface. This provides an arrangement similar to the case where the angle $\theta$ is 90°. In other words, the bent second waveguide provides a transition between the inclined waveguide (at the angle $\theta$) and the reflective surface.

The optical out-coupler unit may be manufactured as follows: a waveguide (optionally without the cladding portion) is provided. For example, the waveguide applied to the substrate using common manufacturing techniques. At the location where electromagnetic radiation is intended to be out-coupled from the waveguide, a trench is provided within the waveguide. The trench may extend through the waveguide and can be manufactured by etching the waveguide. The trench may correspond to the space between the facet and the reflection layer. Thus, the trench may have a side surface that is perpendicular to the substrate (forming the facet) while another side surface of the trench has an angle of inclination corresponding to the angle of the reflective surface (forming the side surface of the supporting material portion). The trench may extend into the upper substrate layer and the lower substrate layer forming the opening and the recess, respectively. As a next step, the reflection layer may be applied (deposited) to the inclined surface of the trench in order to form the reflective surface. The reflection layer may be additionally applied (deposited) to the top surface of the supporting material portion. During this process, the cladding portion may be applied if the cladding portion and the reflection layer are made from the same material. The height of the cladding portion and the height of the section of the reflection layer which extends beyond the inclined surface of the trench may have a height corresponding to the height of the rib. Further, the intermediate layer may be applied (deposited) onto the facet. The trench may then be filled with the filler portion, for example using a depositing technique. If necessary, the filler portion is finished to have a height forming a flat surface with the rib, the cladding portion, and/or the section of the reflection layer arranged on the supporting material portion. As an optional last step, the anti-reflection coating is provided on the flat surface.

The side surface may be etched using tetramethylammonium hydroxide (TMAH). The side surface may form a 1,1,1 plane (Miller index) wherein the supporting material portion may have an orientation of 1,0,0. Further cutting may be required for providing the desired angle α. The supporting material portion and the waveguide substrate may be a continuous layer of material prior to the provision of the filler portion and the waveguide cavity. Thus, the cavity for the filler portion and the waveguide cavity may be provided by etching this continuous layer which provides the waveguide and the supporting material portion.

FIG. 1 discloses a first embodiment of an optical out-coupler unit 10 which comprises a substrate 12, a waveguide 14, a reflection layer 16, a filler portion 18, an anti-reflection coating 20, and/or a supporting material portion 22. The optical out-coupler unit 10 is provided for out-coupling electromagnetic radiation, for example in the visible spectrum or in the infrared spectrum (e.g. having a wavelength between 1 μm and 2 μm), from a waveguide 14 into the free space.

The waveguide 14 includes a base section 24 and a ridge or rib 26 arranged on the base section 24. The waveguide 14 is configured to propagate electromagnetic radiation. The waveguide 14 is made from an optically transparent material, for example a dielectric material such as silicon. The waveguide 14 depicted in FIG. 1 can be an end section of a waveguide not shown in FIG. 1. In other words, FIG. 1 solely shows an end of a waveguide 14 whereby this section is part of the optical out-coupler unit 10.

The waveguide 14 is arranged on the substrate 12 which may include one or more layers. In the embodiment depicted in FIG. 1, the substrate 12 includes two layers: an upper substrate layer 28 which is in contact with the waveguide 14 and defines a planar top surface of the substrate 12. The upper substrate layer 28 may be made from silicon oxide. The substrate 12 may also include a lower substrate layer 30 which is arranged below the upper substrate layer 28. The lower substrate layer 30 may be made from silicon or other suitable materials. The substrate 12 may be a waiver on which the other components of the optical out-coupler unit 10 can be arranged on, for example using various deposition techniques.

The supporting material portion 22 is arranged on the substrate 12, in particular on the top surface of the upper substrate layer 28. The supporting material portion 22 includes a side surface 32 which is inclined to the top surface of the substrate 12. The side surface 32 may be a planar surface which extends perpendicular to the direction of extension of the waveguide 14. As better visible in FIG. 1b, the side surface 32 of the supporting material portion 22 is spaced apart from a facet 34 of the waveguide 14 and faces the facet 34. The supporting material portion 22 can be made from various materials and is provided for supporting the reflection layer 16.

The reflection layer 16 may be arranged on the side surface 32 of the supporting material portion 22. The reflection layer 16 therefore also faces the facet 34 and is arranged spaced apart from the facet 34 by a distance d. The distance d is measured at the level of the top surface of the substrate 12. The distance d corresponds to the distance between the point where the facet 34 is in contact with the top surface of the substrate 12 and the point where a reflective surface 36 of the reflection layer 16 is in contact with the top surface of the substrate 12.

The reflection layer 16 may have a (constant) thickness of 250 nm and more, such as 300 nm. As depicted in FIG. 1, the reflection layer 16 may extend beyond the side surface 32 of the supporting material portion 22 onto a top surface of the supporting material portion 22. The reflection layer 16 may include a top surface or upper surface which extends parallel to the top surface of the substrate 12.

The surface of the reflection layer 16 that faces the facet 34 defines the reflective surface 36. The reflective surface 36 is arranged perpendicular to the facet 34 in the embodiment depicted in FIG. 1. The reflective surface 36 is inclined with respect to the normal to the top surface of a substrate 12 by an angle α of more than 45°, in particular 48° or 49°. In words, the reflective surface 36 is inclined with respect to the top surface of a substrate 12 by an angle of 90°-α. In case that the reflection layer 16 has a constant thickness, the side surface 32 of the supporting material portion 22 may be inclined to the normal to the top surface of a substrate 12 by the same angle α.

The facet 34 may be a distal end surface of the waveguide 14 at which the electromagnetic radiation propagating within the waveguide 14 exits the waveguide 14. The facet 34 may be planar and is arranged perpendicular to the top surface of the substrate 12. In addition, the facet 34 is arranged "parallel" to the reflective surface 36 (see FIG. 1d). This means that a normal to the facet 34 defines an angle θ of 90° with the reflective surface 36. In other words, radiation propagating in the waveguide 14 exits the waveguide 14 perpendicular to the facet 34 and impinges on the reflective surface 36 perpendicular to the reflective surface 36 measured in a plane parallel to the substrate 12.

The space between the waveguide 14 (the facet 34) and the reflection layer 16 is filled with the filler portion 18 in the embodiment depicted in FIG. 1. The filler portion 18 may completely fill the space between the facet 34 and the reflection layer 16. The filler portion 18 has a top surface which may be flush with a top (or upper) surface of a cladding portion 40 and/or the top surface of the reflection layer 16. Thus, the cladding portion 40, the reflection layer 16, and/or the filler portion 18 may define a common and planar top surface which extends parallel to the top surface of the substrate 12.

Figure 1B:
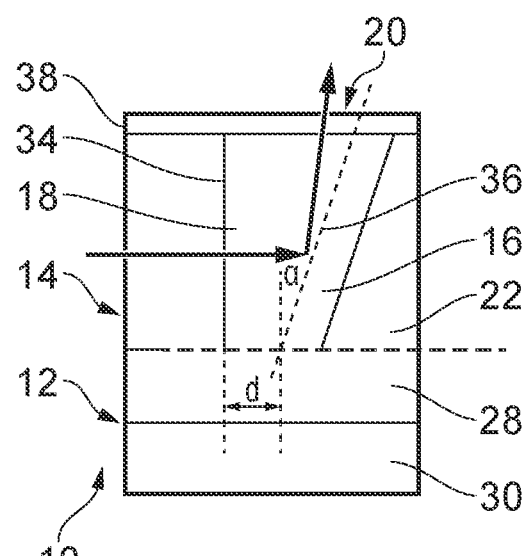
Figure 1C:
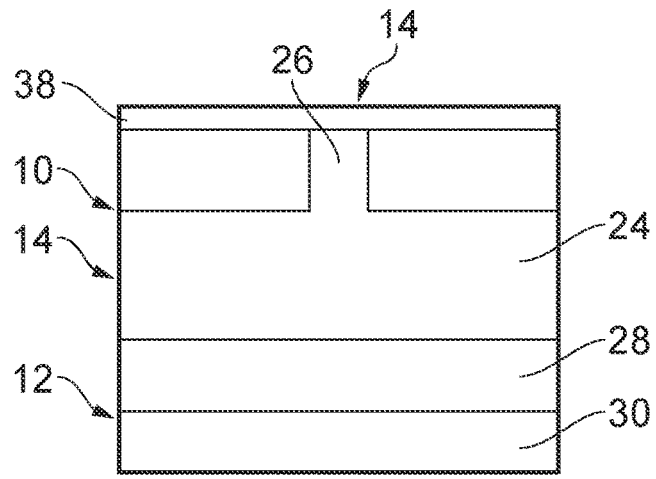
Figure 1D:
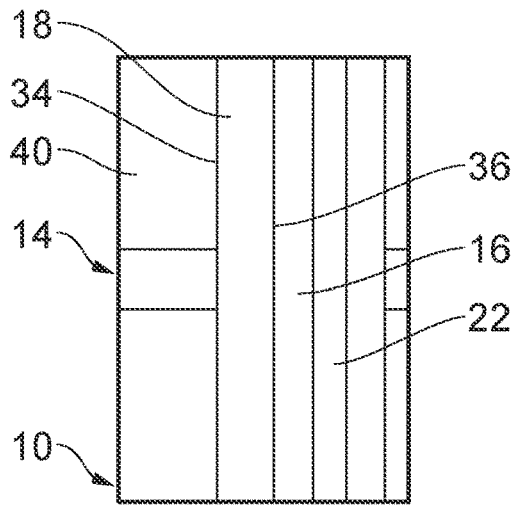

The filler portion 18 may comprise a material whose refractive index is lower than the refractive index of the material of the reflection layer 16. In particular, the refractive index contrast between the filler portion 18 and the reflection layer 16 is such that total internal reflection occurs at the reflective surface 36. In detail, electromagnetic radiation propagating in the waveguide 14 and exiting the waveguide 16 at the facet 34 impinges on the reflective surface 36 and is reflected by total internal reflection. This is depicted in FIG. 1b by the yellow arrows. Please note that the electromagnetic radiation reflected at the reflective surface 36 is refracted at the top surface of the filler portion 18 which might be an interface with the anti-reflection coating 20 and at an outer surface of the reflection coating 20 which will be discussed in the following. However, these refractions are not depicted by the yellow arrows in FIG. 1b.

The filler portion 18 may be made from amorphous silicon while the reflection layer 16 is made from silicon oxide. However, different materials for the filler portion 18 and the reflection layer 16 can be chosen as long as they give raise to total internal reflection at the reflective surface 36.

The filler portion 18 may be covered by the anti-reflection coating 20 as depicted in FIG. 1. The anti-reflection coating 20 includes a first top layer 38 in the embodiment of FIG. 1. The anti-reflection coating 20 is provided to reduce the refractive index contrast between the filler portion 18 and the free space (e.g. air). The anti-reflection coating 20 and, in particular, the first top layer 38 have a refractive index that is smaller than the refractive index of the filler portion 18 but greater than the refractive index of the free space. Thereby, the proportion of electromagnetic radiation which is reflected at the interface between the filler portion 18 and the first top layer 38 is reduced.

The anti-reflection coating 20 and, in particular, the first top layer 38 may also cover the waveguide 14 (a top surface of the cladding portion 40) and a top surface of the reflection layer 16. However, the anti-reflection coating 20 may only cover a section of the waveguide 14 and the cladding portion 40 that is directly adjacent to the filler portion 18. FIGS. 1a and 1b show only this section close to the filler portion 18 so that the cladding portion 40 appears to be completely covered with the anti-reflection coating 20 although the non-shown sections of the cladding portion 40 are not covered with the anti-reflection coating 20. In the embodiment depicted in FIG. 1, the base section 24 and the rib 26 of the waveguide 14 are covered with the cladding portion 40 such that a top surface of the cladding portion 40 is planar and coincides with the top surface of the filler portion 18, and/or the reflection layer 16. The top surface of the cladding portion of 40 may extend parallel to the top surface of the substrate 12. A thin layer of the cladding portion 40 is arranged on the rib 26 although not visible in FIGS. 1a and 1b. Thus, the anti-reflection coating 20 and, in particular, the first top layer 38 may cover the cladding portion 40, the reflection layer 16, and/or the filler portion 18. The cladding portion 40 may be made from silicon oxide.

The first top layer 38 may have a constant thickness which depends on the wavelength of the electromagnetic radiation propagating therethrough and the materials chosen for the filler portion 18 and the first top layer 38. In particular, the thickness of the first top layer 38 is equal to a quarter of the wavelength of the electromagnetic radiation propagating through the first top layer 38. For example, the first top layer 38 has a thickness between 100 nm and 300 nm and, in particular, 183 nm±25 nm.

Figure 2:
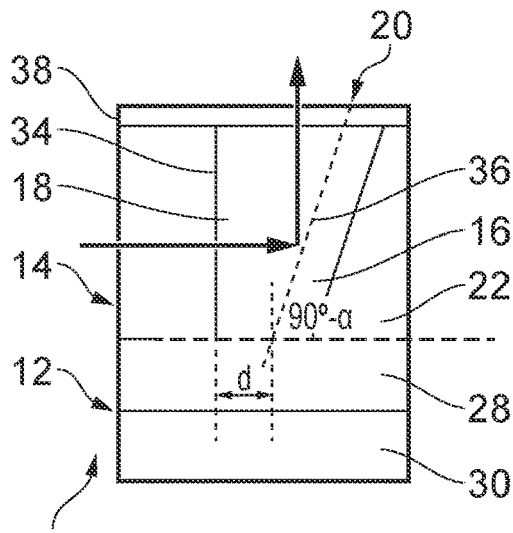
FIG. 2 is a cross-sectional view in a y-z-plane of a second embodiment of the optical out-coupler unit.

The optical out-coupler unit 10 depicted in FIG. 2 corresponds to the optical out-coupler unit 10 depicted in FIG. 1 except for the following differences. The angle α of the reflective surface 36 with regard to the normal to the top surface of the substrate 12 is 45°. In addition, the reflection layer 16 does not extend onto a top surface of the supporting material portion 22 but solely along the side surface 32 of the supporting material portion 22. The anti-reflection coating 20 is arranged on the top surface of the supporting material portion 22 and on a side surface of the reflection layer 16. The waveguide 14 may be a strip waveguide and no cladding portion 40 is present. The anti-reflection coating 20 is directly applied to the waveguide 14.

Figure 3:
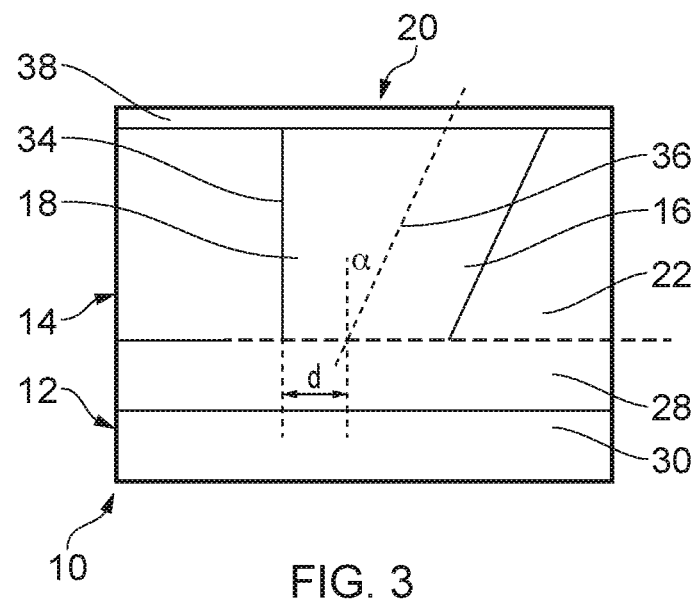
FIG. 3 is a cross-sectional view in a y-z-plane of a third embodiment of the optical out-coupler unit.

The optical out-coupler unit 10 depicted in FIG. 3 corresponds to the optical out-coupler unit 10 depicted in FIG. 2 except for the following difference. The angle α of the reflection layer 16 with respect to the normal to the top surface of the substrate 12 is more than 45° i.e. similar to the embodiment depicted in FIG. 1.

Figure 4:
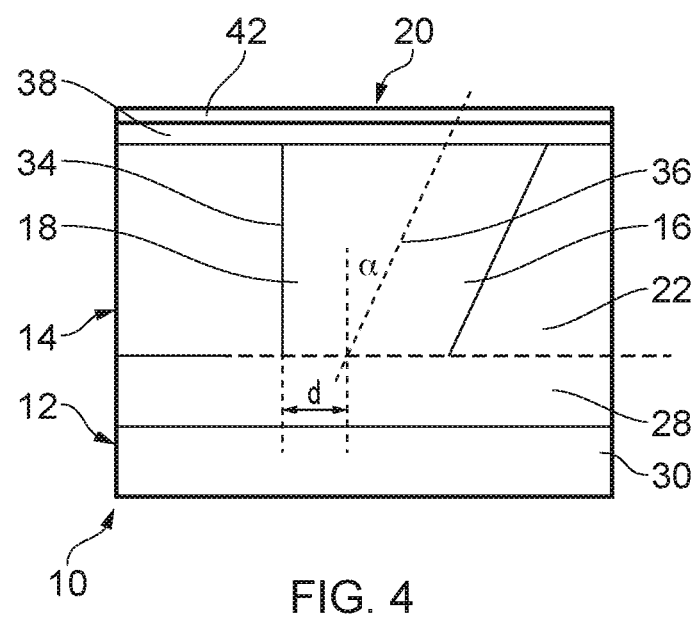
FIG. 4 is a cross-sectional view in a y-z-plane of a fourth embodiment of the optical out-coupler unit.

The optical out-coupler unit 10 depicted in FIG. 4 corresponds to the optical out-coupler unit 10 depicted in FIG. 3 except for the following differences. The anti-reflection coating 20 further includes a second top layer 42 which is arranged on the first top layer 38. The refractive index of the material of the second top layer 42 is smaller than the refractive index of the material of the first top layer 38 but greater than the refractive index of the free space (e.g. air).

The thickness of the first top layer 38 and of the second top layer 42 may depend on the wavelength of the electromagnetic radiation propagating through the anti-reflection coating 20 and/or the materials used for the first top layer 38 and the second top player 42. For example, the thickness of the first top layer 38 and of the second top layer 42 may be a quarter the wavelength propagating through the anti-reflection coating 20. Optionally, the first top layer 38 is made from silicon nitride and has a thickness between 100 nm and 200 nm, optionally 160 nm. The second top player 42 may comprise silicon oxide and has a thickness between 100 nm and 200 nm, optionally 150 nm. The provision of the second top layer 42 on top of the first top player 38 increases the anti-reflection capabilities of the anti-reflection coating 20.

Technical properties, the functioning and/or variations of the out-coupler unit 10, especially the embodiments depicted in FIGS. 1 to 4, are discussed in the following and with reference to FIGS. 5 to 25.

Figure 5:
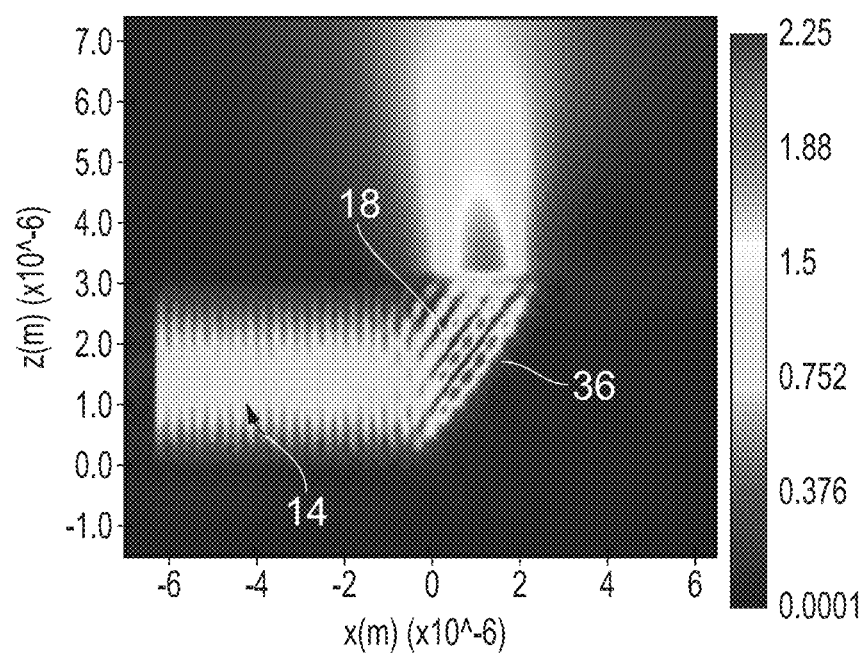
FIG. 5 is a simulation of the intensity distribution along a cross-sectional view in a y-z-plane of the embodiment of FIG. 2.

FIG. 5 shows a simulation of the intensity distribution of the electromagnetic radiation along its propagation from the waveguide 14 through the filler portion 18 (via a reflection at the reflective surface 36) and into the free space for the out-coupler unit 10 depicted in FIG. 2 (having an angle α of 45°). It is apparent that electromagnetic radiation coupled into the free space has a low numerical aperture.

Figure 6:
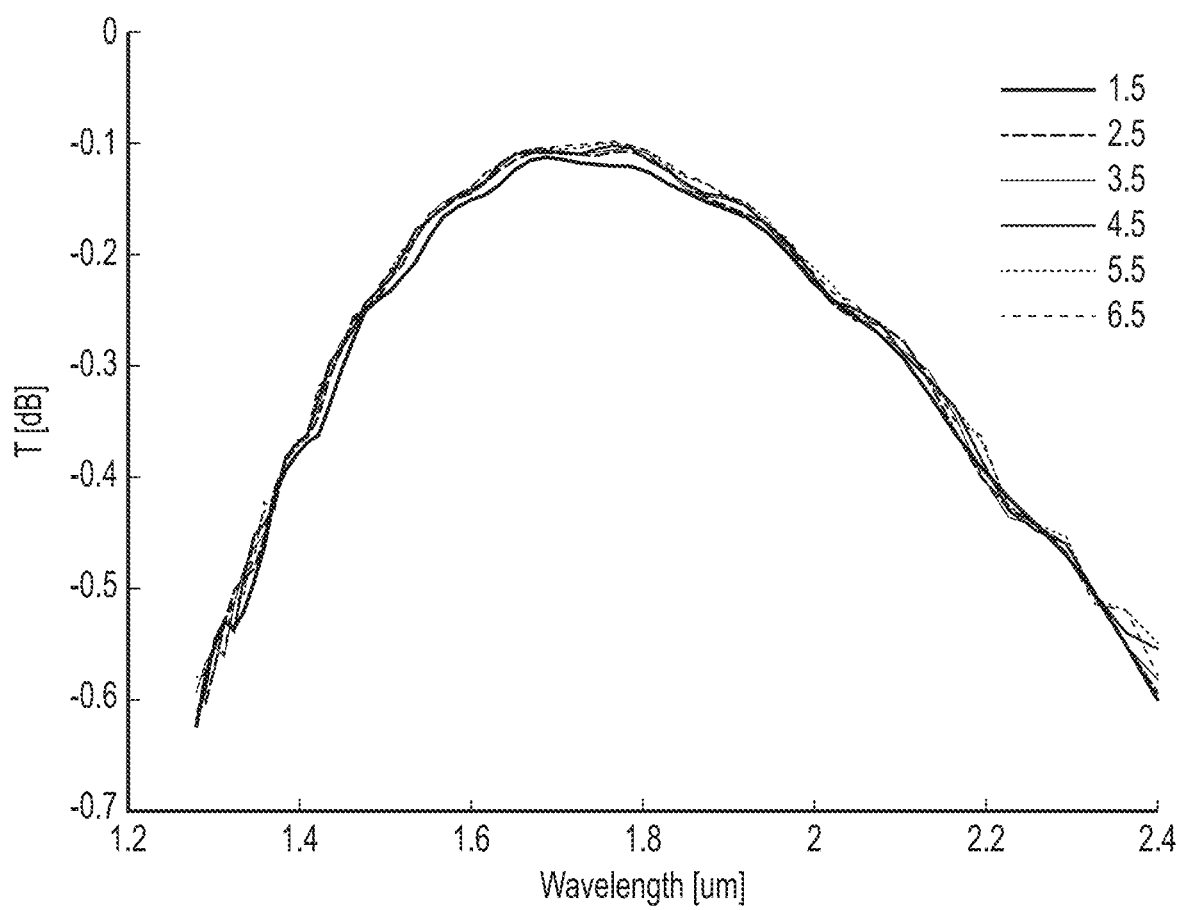
FIG. 6 is a diagram showing the transmission of the optical out-coupler unit of FIG. 2.

FIG. 6 shows the wavelength dependent transmission of the electromagnetic radiation of the out-coupler unit 10 depicted in FIG. 2 (having an angle α of 45°). The transmission gives the proportion of the intensity of the electromagnetic radiation which is emitted into the free space. It is apparent that the transmission is wavelength dependent. However, the transmission does not depend on the distance d of the reflection layer 16 to the facet 34.

Figure 7:
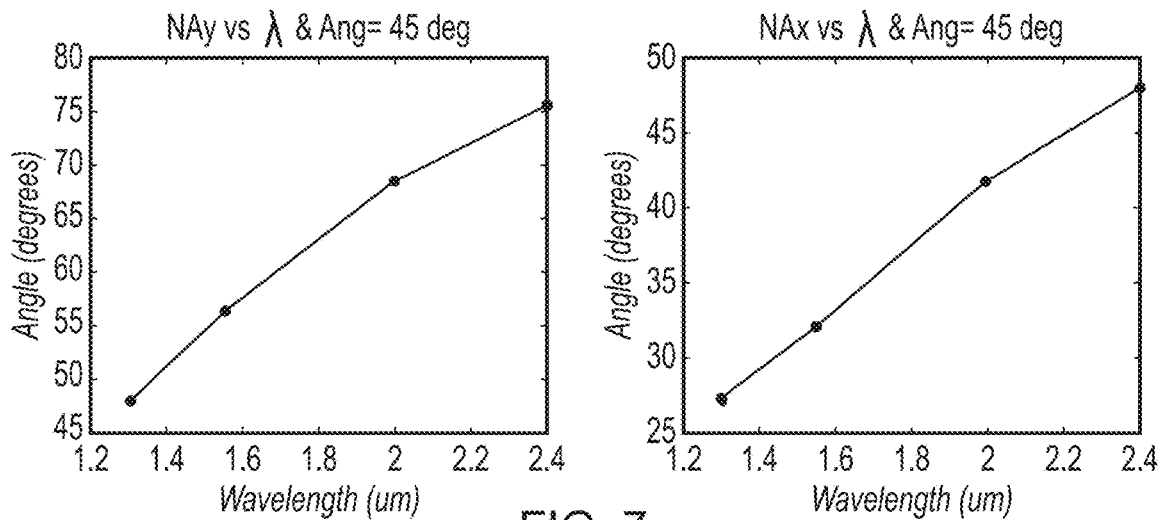
FIG. 7 includes diagrams showing two times the numerical aperture along the y-direction (left) and the x-direction (right) of a beam exiting the optical out-coupler unit of FIG. 2.
Figure 8:
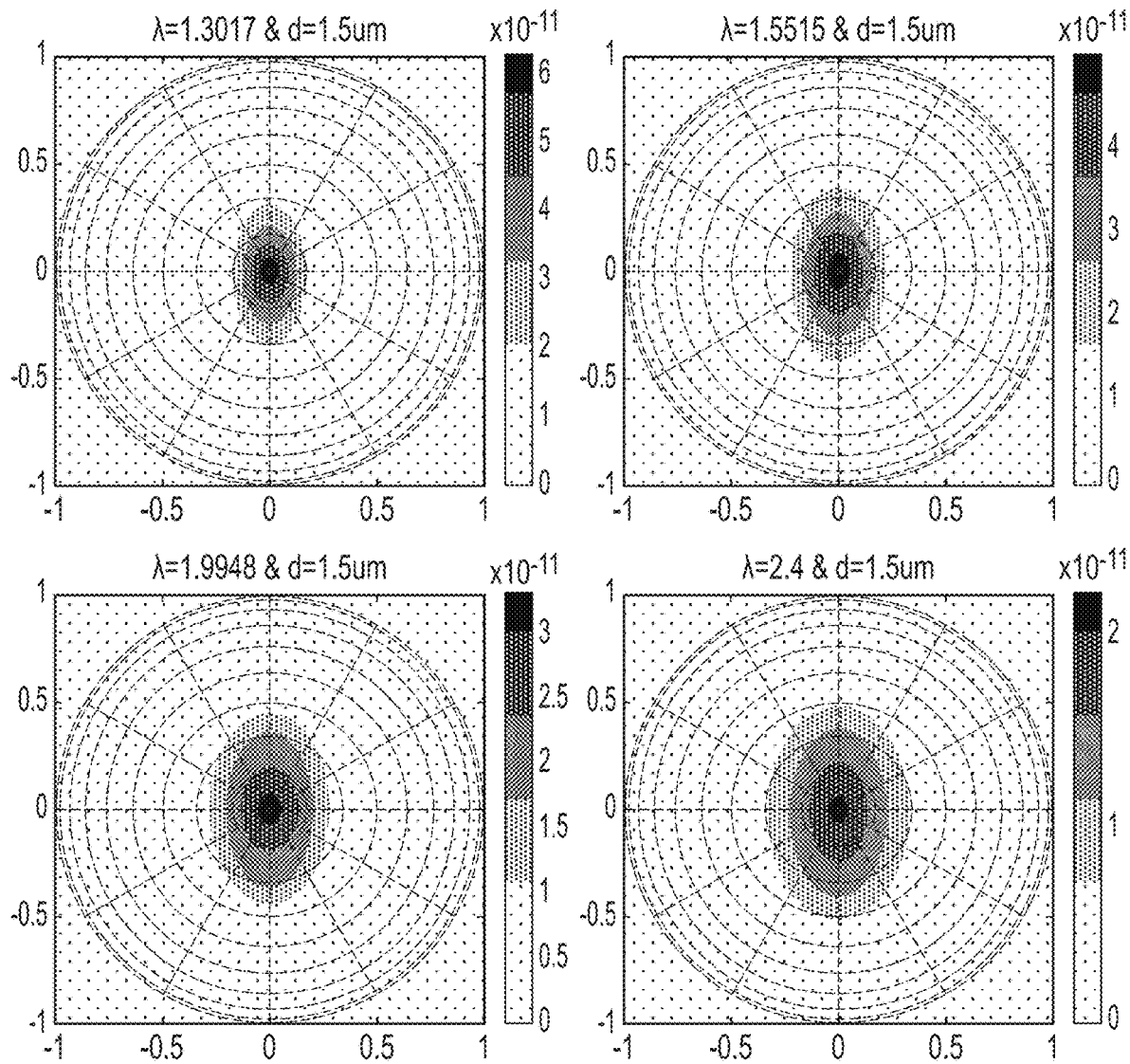
FIG. 8 includes diagrams showing the intensity distribution in a x-y-plane of a beam for various wavelengths exiting the optical out-coupler unit of FIG. 2 having a distance d=1.5 µm.

FIGS. 7 and 8 characterise the beam profile of the electromagnetic radiation emitted into the free space. The left diagram of FIG. 7 shows the wavelength dependent numerical aperture along the y-direction while the right diagram of FIG. 7 shows the wavelength dependent numerical aperture along the x-direction. Simulations of intensity of the electromagnetic radiation as seen when looking onto the optical out couple unit for various wavelengths are depicted in FIG. 8. a sufficiently homogeneous intensity distribution. The beam profile of the electromagnetic radiation exiting the out-coupler unit is fairly symmetrical, in particular at higher wavelengths, while the beam profile is narrower at lower wavelengths. At angles α of more than 45°, the beam profile is inclined to the x-y-plane resulting in the uneven intensity profile. The inclination of the intensity profile is wavelength dependent. Similarly, the numerical aperture increases with increasing wavelength in both the x-direction and the y-direction for angles α of more than 45°.

Figure 9:
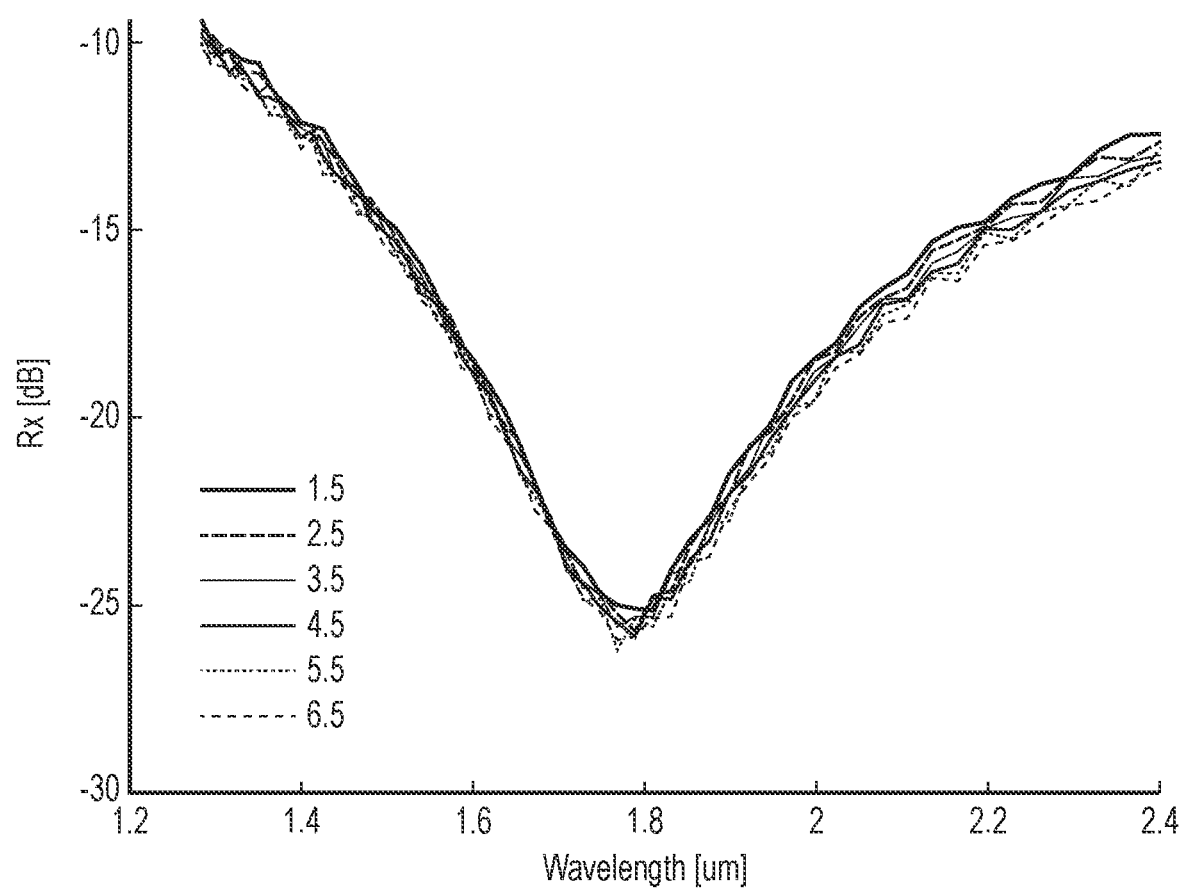
FIG. 9 is a diagram showing the reflection of a beam at a facet of the optical out-coupler unit of FIG. 2 across different values of the distance d.

FIG. 9 shows the wavelength dependent reflection of the electromagnetic radiation back into the waveguide 14 at the facet 34 for the out-coupler unit 10 depicted in FIG. 2 (having an angle α of 45°). At lower and higher wavelengths of the depicted wavelength band, the reflection is higher. This reflection can be reduced by increasing the angle α to more than 45° as will be discussed in conjunction with FIGS. 10 to 14. The reflection is also not significantly dependent on the distance d between the reflection layer 16 and the facet 34.

Figure 10:
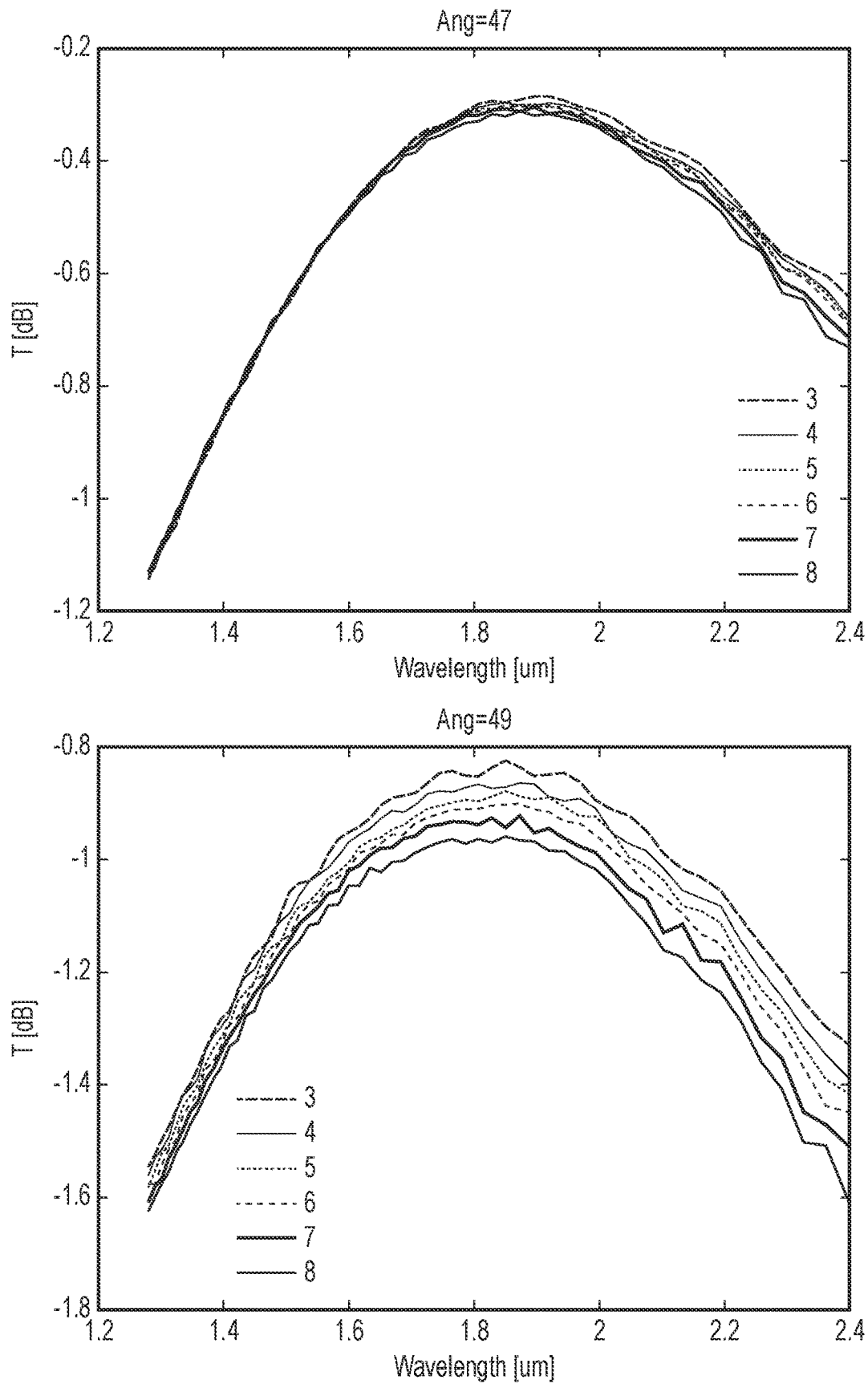
FIG. 10 includes diagrams showing the transmission of the optical out-coupler unit of FIG. 1 for various angles of a reflection layer with respect to a top surface of a substrate whereby different colors refer to different distances d.
Figure 10:
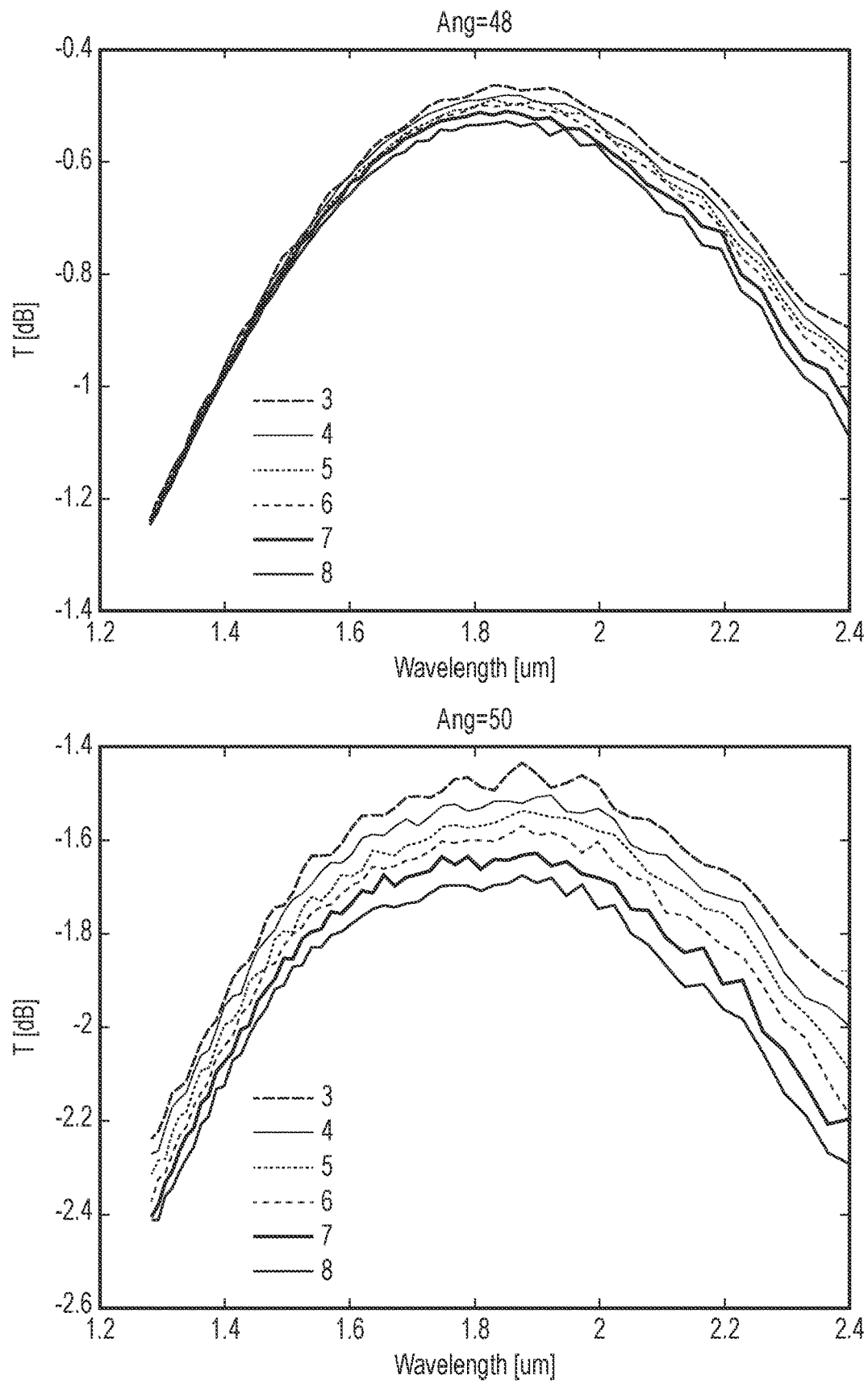

FIG. 10 shows the wavelength dependent transmission for various angles α. The diagrams of FIG. 10 thus correspond to the diagram of FIG. 6. The diagrams of FIG. 10 indicate that the transmission ratio decreases with increasing angle α. Furthermore, with increasing angle α, the transmission depends more on the distance d.

Figure 11:
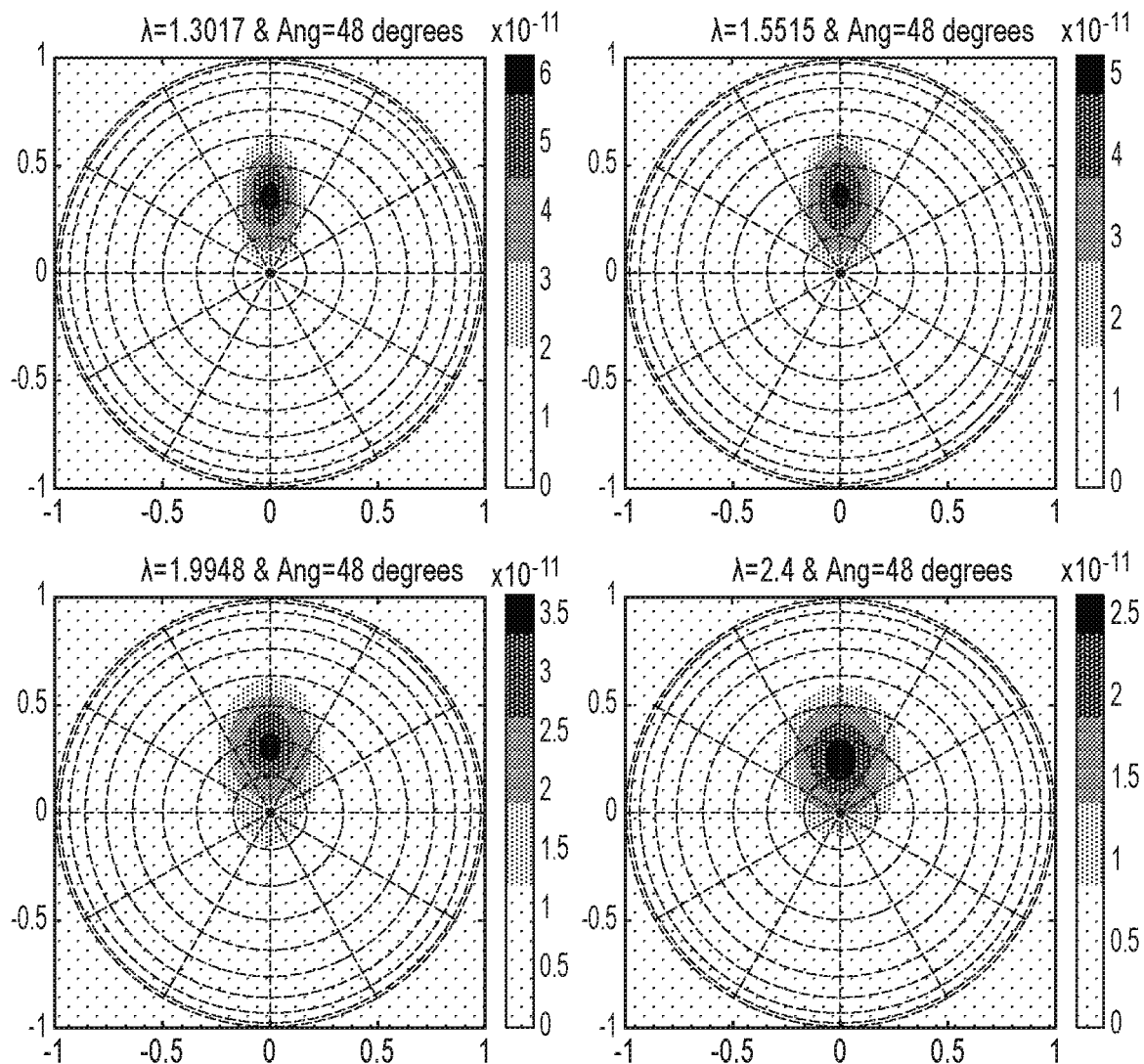
FIG. 11 includes diagrams showing the intensity distribution in a x-y-plane of a beam for various wavelengths exiting the optical out-coupler unit of FIG. 1 for an angle of a reflection layer equal to 48°.
Figure 12:
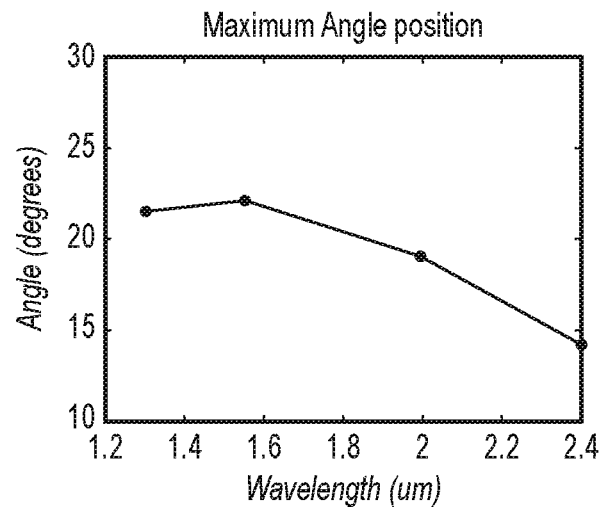
FIG. 12 is a diagram showing the direction of a beam exiting the optical out-coupler unit of FIG. 1 for an angle of 48° of the reflection layer with respect to a normal to the top surface of the substrate.

FIG. 11 shows the intensity distribution of the electromagnetic radiation emitted into the free space for various wavelengths at an angle α of 48°. The diagrams of FIG. 11 thus correspond to the diagrams of FIG. 8. Due to the angle α of 48°, the beam profile is inclined to the x-y-plane resulting in the uneven intensity profile. It is further apparent that the inclination of the intensity profile is wavelength dependent which is also apparent from FIG. 12 which indicates the angle of the direction of the maximum intensity of the electromagnetic radiation emitted into the free space.

Figure 13:
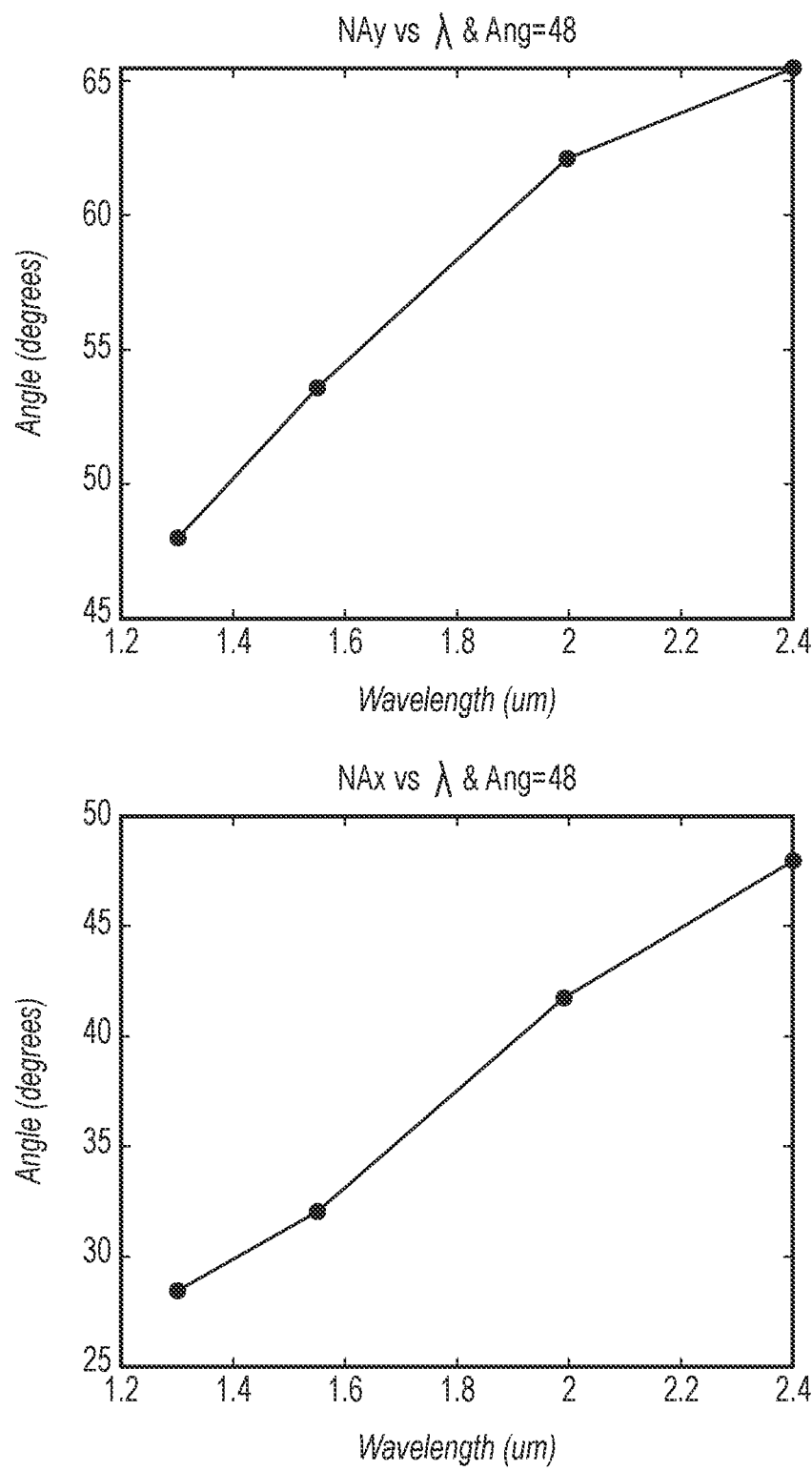
FIG. 13 includes diagrams showing two times the numerical aperture along the y-direction (top) and the x-direction (bottom) of a beam exiting the optical out-coupler unit of FIG. 1.

The diagrams of FIG. 13 show the numerical aperture along the y-direction (top diagram) and the x-direction (bottom diagram) The diagrams of FIG. 13 thus correspond to the diagrams of FIG. 7. The numerical aperture increases with increasing wavelength in both the x-direction and the y-direction.

Figure 14:
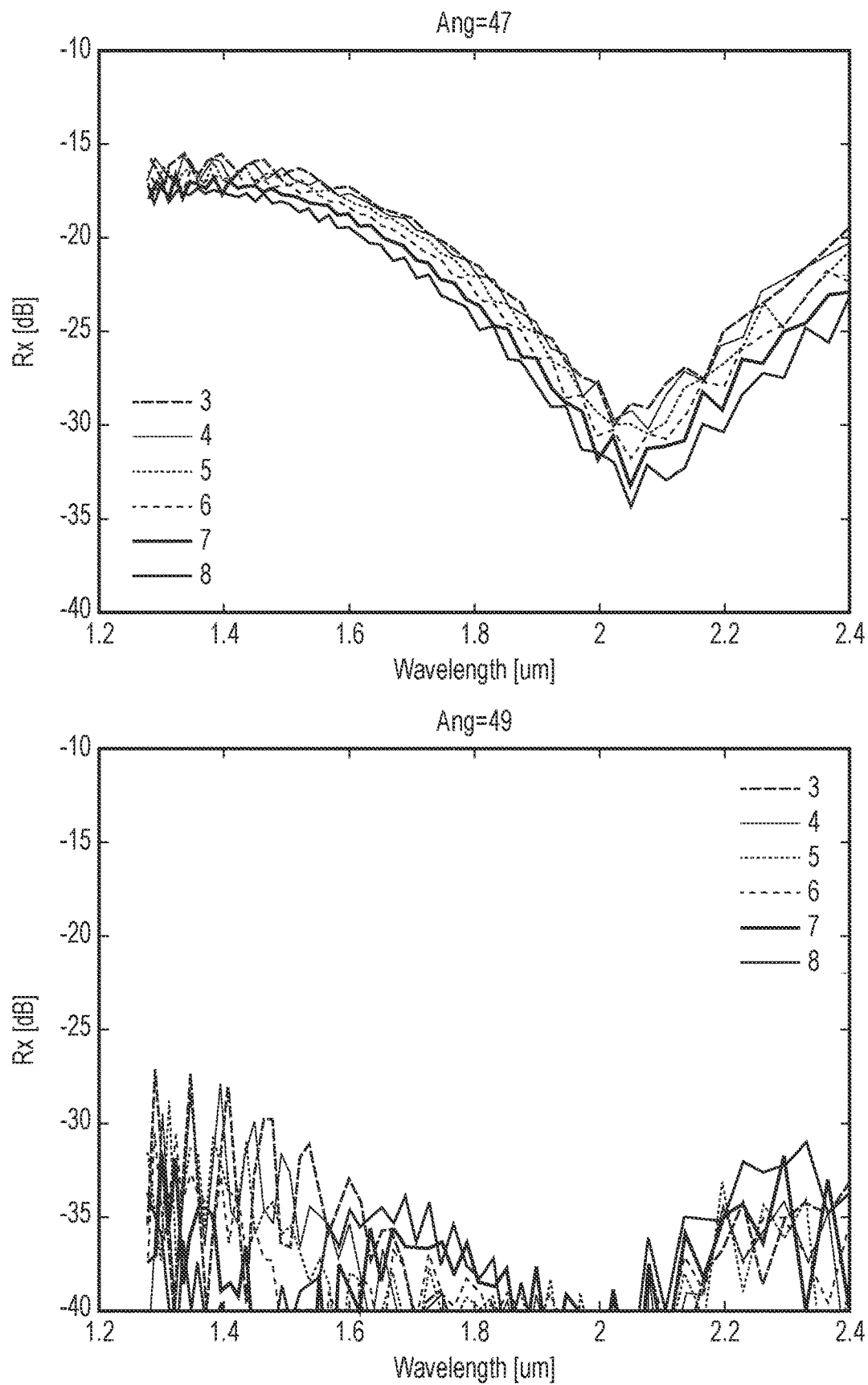
FIG. 14 includes diagrams showing the reflection of a beam at the facet of the optical out-coupler unit of FIG. 1 for various angles of the reflection layer with respect to the top surface of the substrate.
Figure 14:
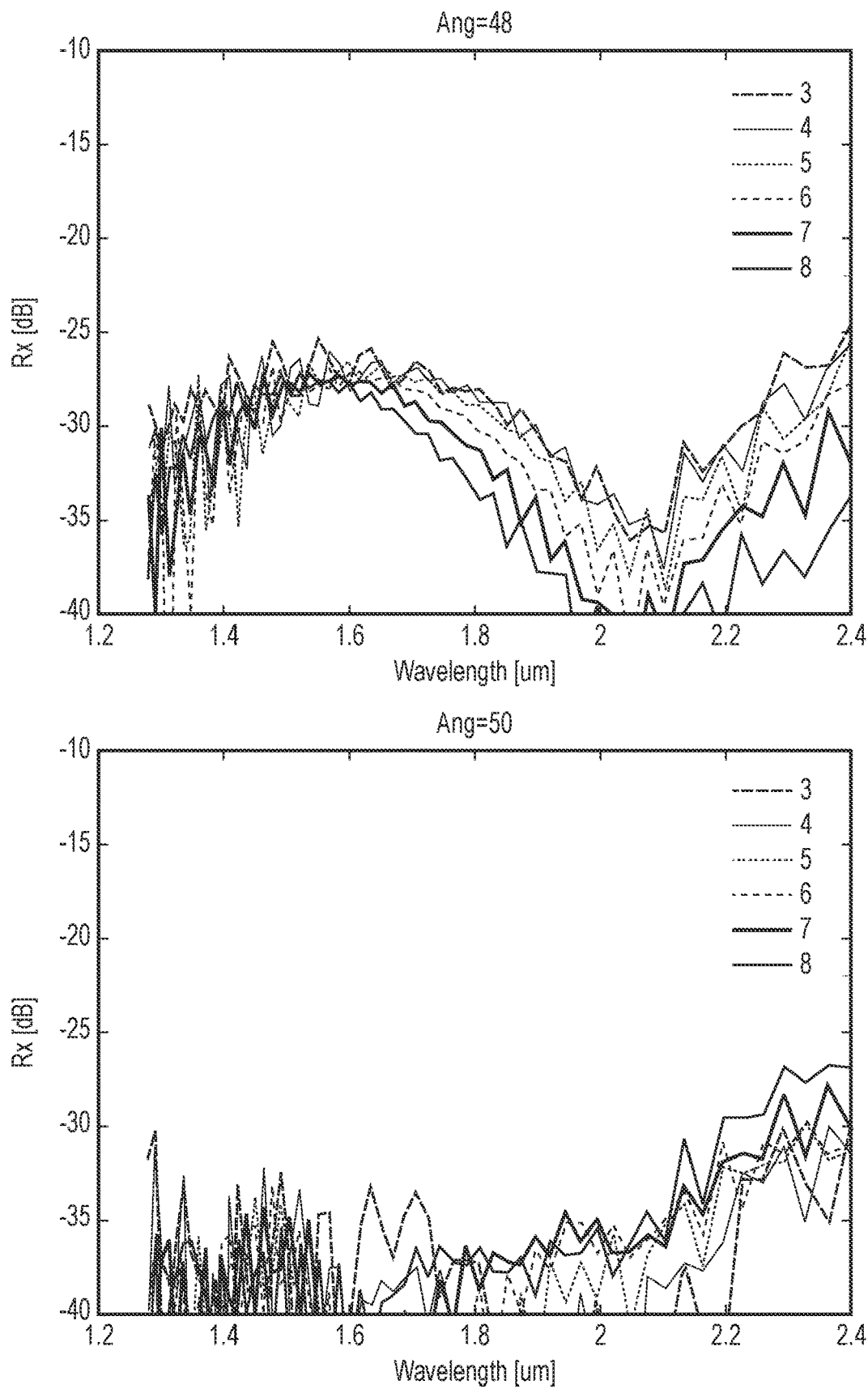

The diagrams of FIG. 14 show the reflection back into the waveguide for various angles α. The diagrams of FIG. 14 correspond to the diagram of FIG. 9. The diagrams of FIGS. 9 and 14 indicate that the reflection is reduced with increasing angle α. It is also apparent from the diagrams of FIG. 14 that the transmission is more dependent on the distance d with increasing angle α.

The diagrams regarding the transmission and the reflection indicate that the out-coupler unit 10 works best with an angle α of 48° or 49°.

Figure 15:
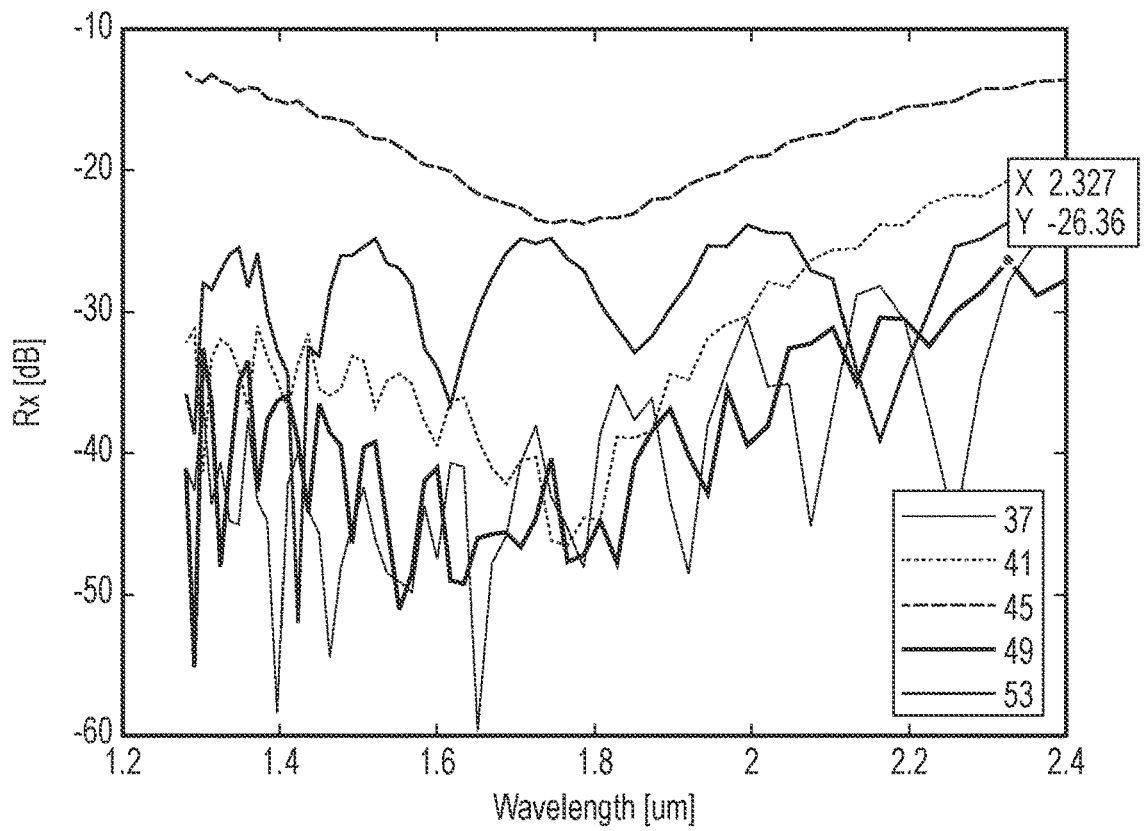
FIG. 15 includes diagrams showing the reflection and transmission of the optical out-coupler unit of FIG. 4 for various angles of the reflection layer with respect to the top surface of the substrate.
Figure 15:
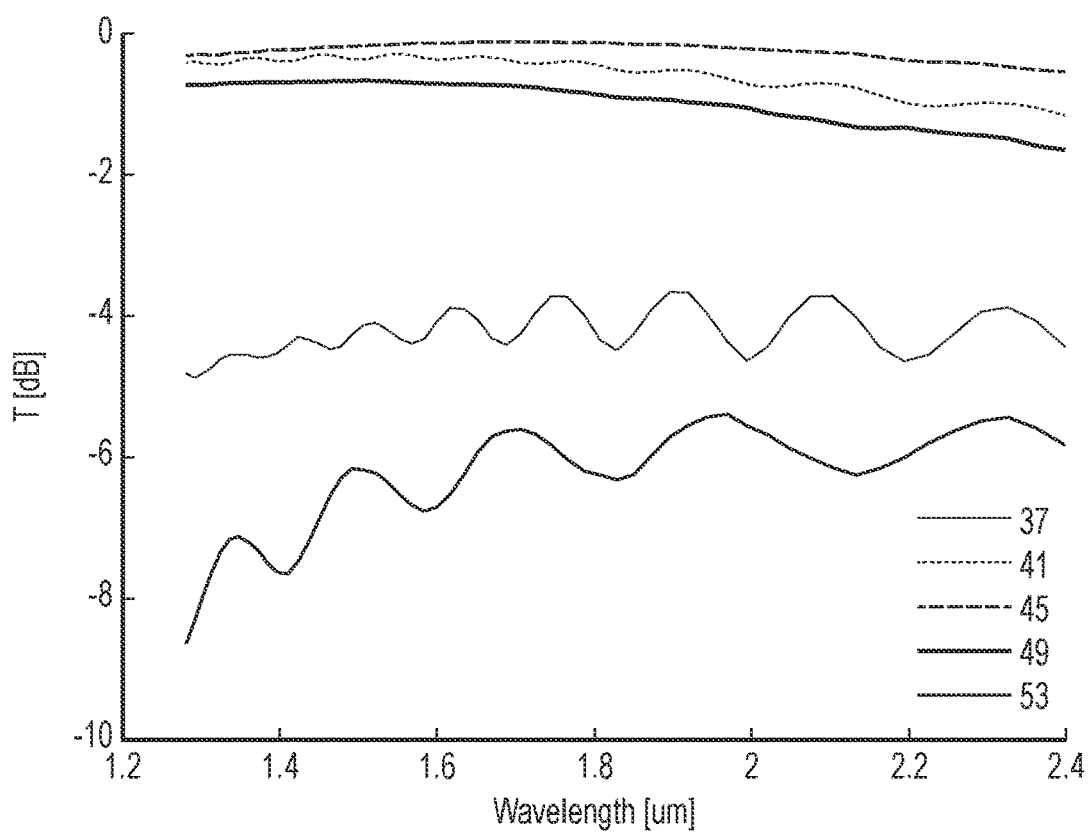

FIG. 15 shows diagrams of the wavelength dependent reflection and transmission of the out-coupler unit 10 as depicted in FIG. 4 (including a first top layer 38 made of silicon nitride and a second top layer 42 made of silicon oxide). These diagrams confirm that an optimum angle α is near 49°. Very small angles α sufficiently smaller than 45° and angles α greater than 51° exhibit a low degree of transmission.

Figure 16:
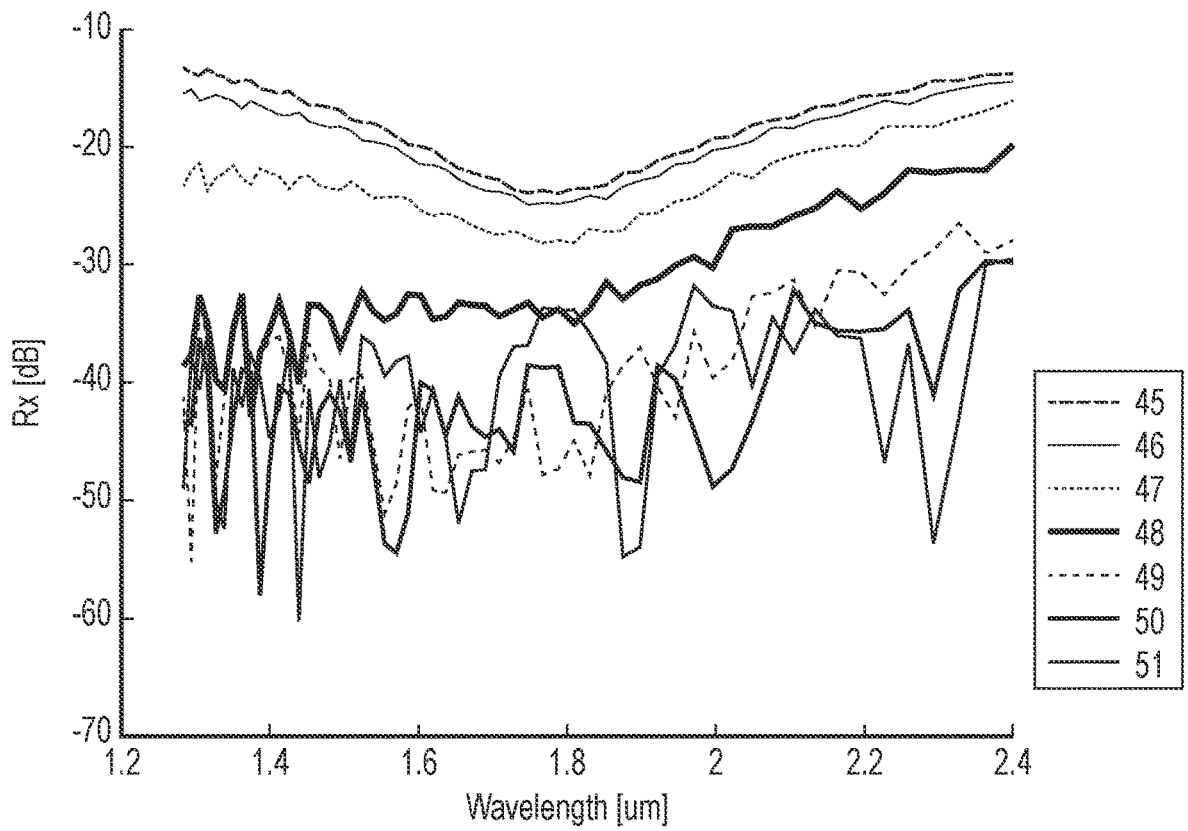
FIG. 16 includes diagrams showing the reflection and transmission of the optical out-coupler unit of FIG. 4 for various angles of the reflection layer with respect to the top surface of the substrate.
Figure 16:
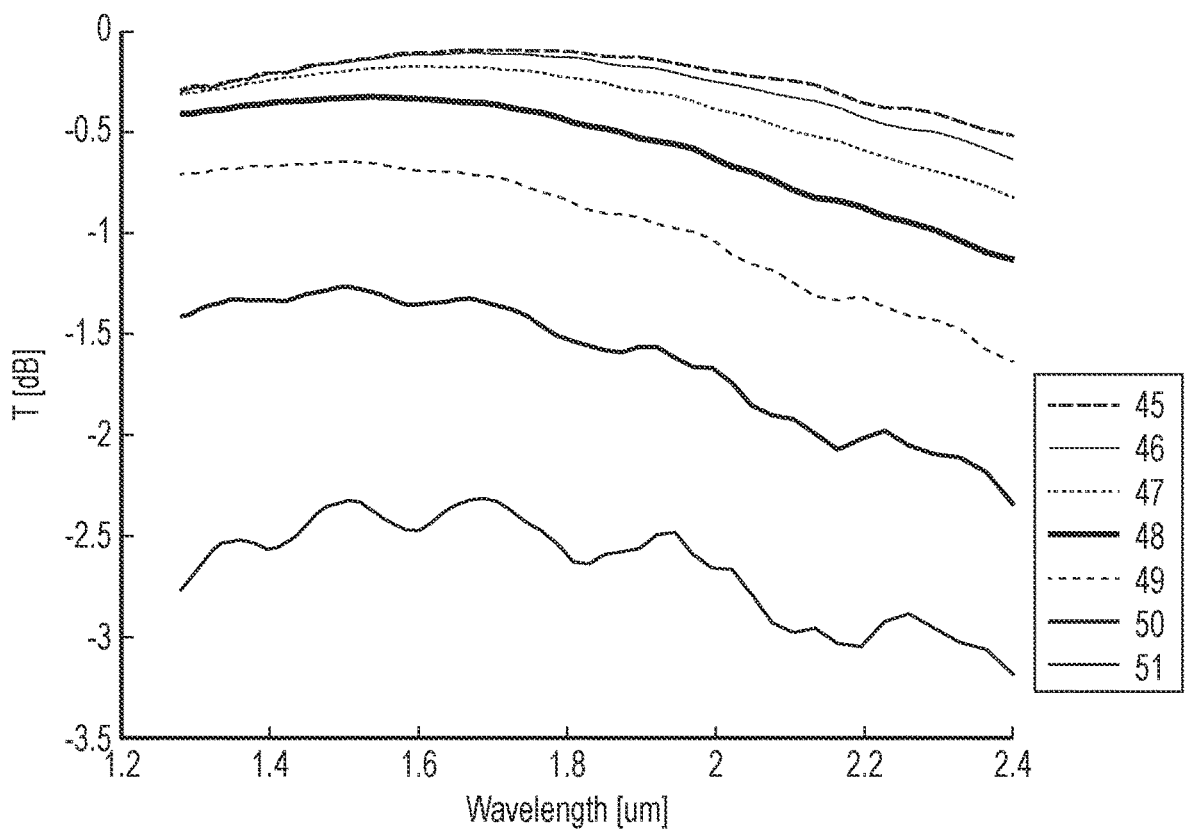

FIG. 16 shows diagrams of the wavelength dependent reflection and transmission with smaller steps between angles α. Thus, the diagrams of FIG. 16 depict a finer resolution of the dependence on the angle α compared to the diagrams of FIG. 15. The findings of FIG. 16 confirm findings of FIG. 15, in particular that an optimum angle α is near 48° or 49°.

Figure 17:
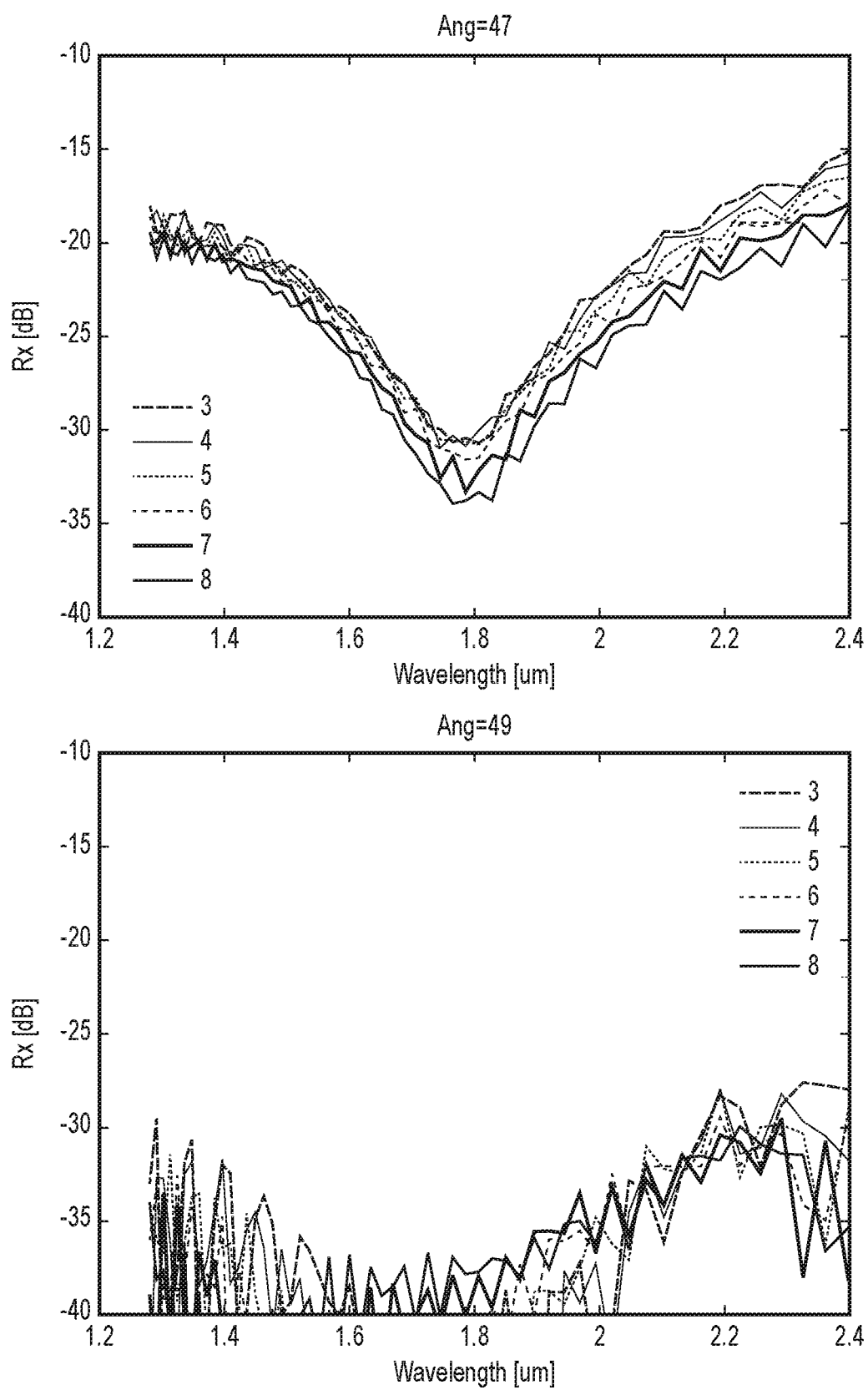
FIG. 17 includes diagrams showing the reflection of a beam at the facet of the optical out-coupler unit of FIG. 1 for various angles of the reflection layer with respect to the top surface of the substrate, wherein a first top layer has a thickness of 225 nm.
Figure 17:
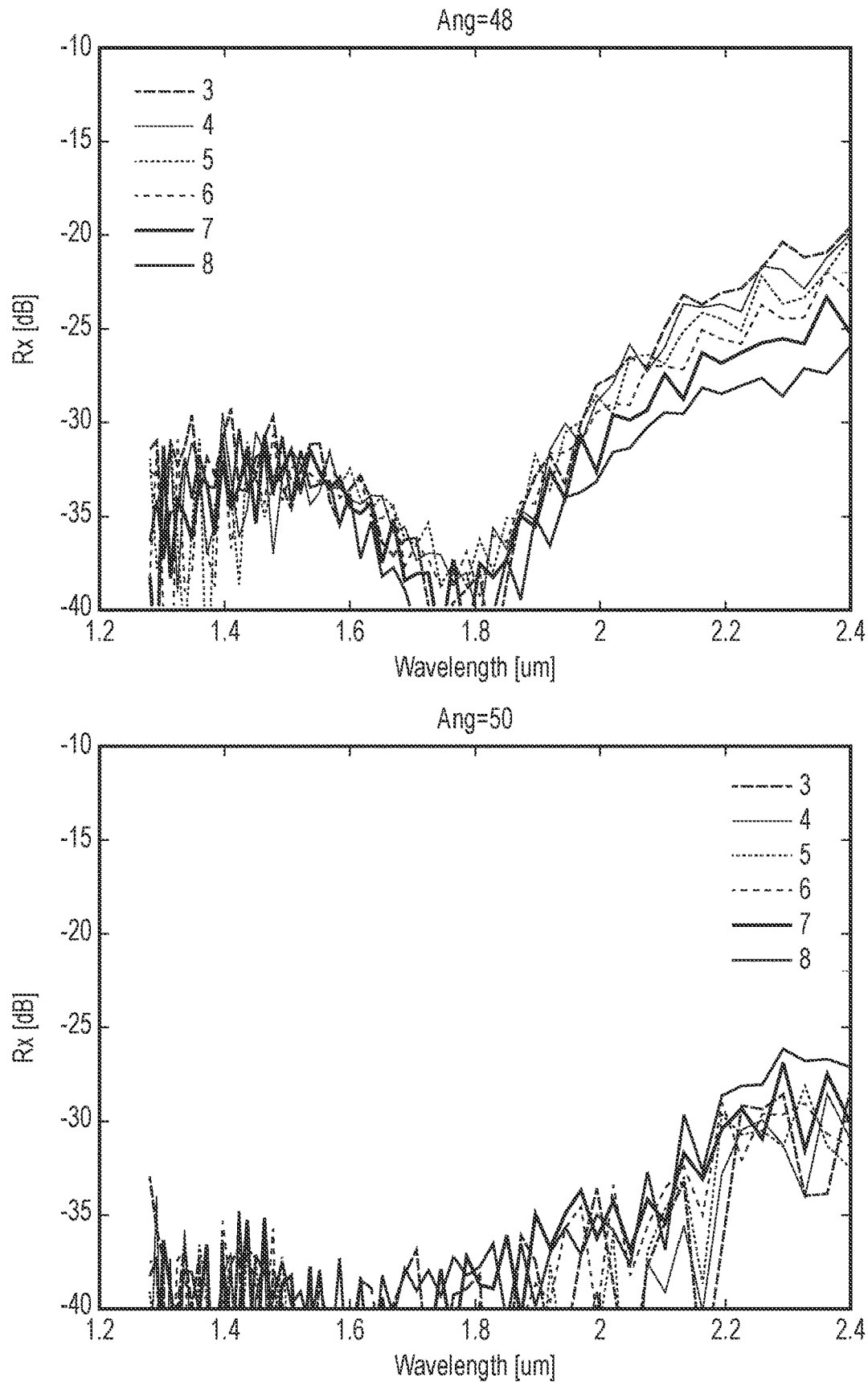
Figure 18:
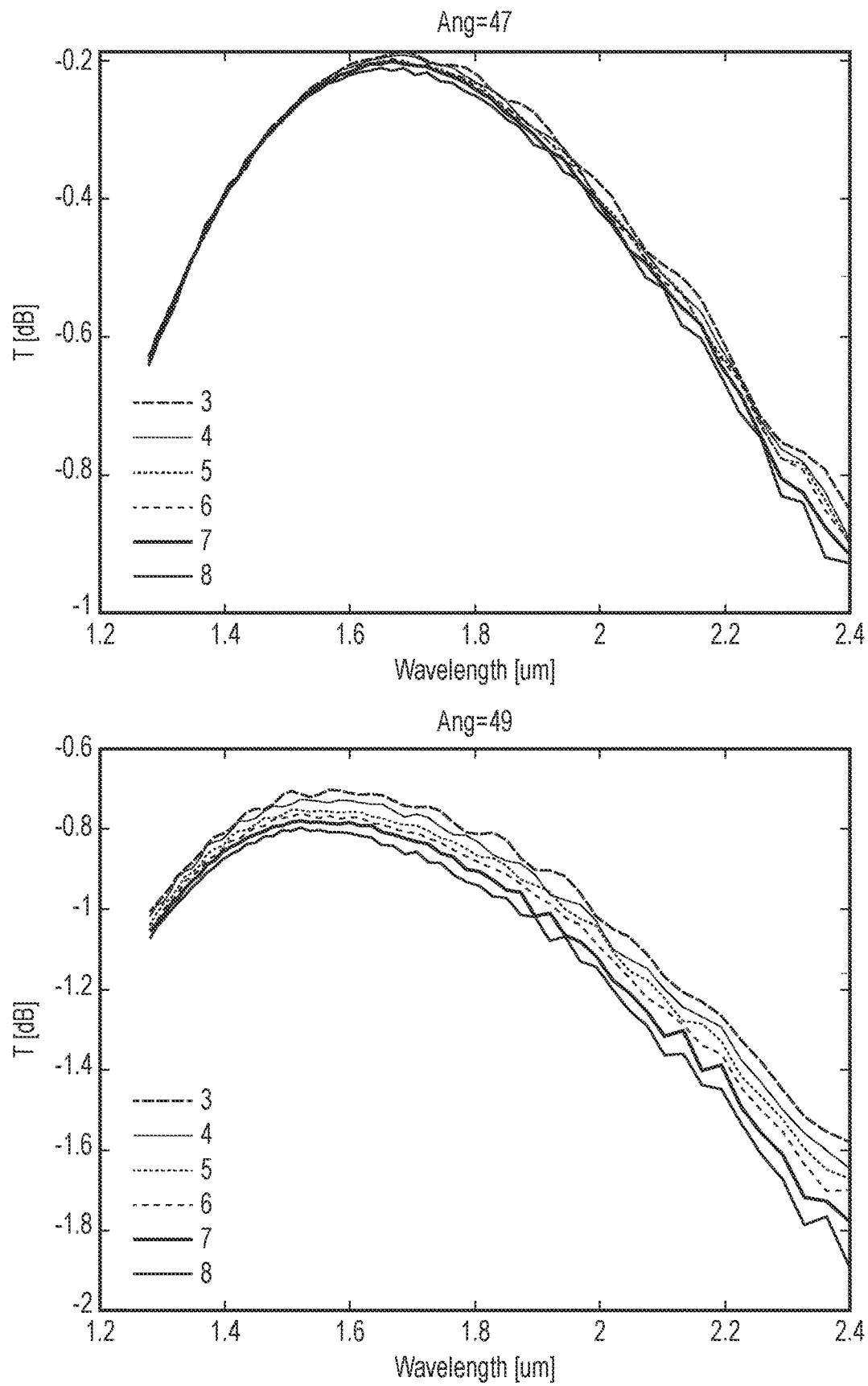
FIG. 18 includes diagrams showing the transmission of the optical out-coupler unit of FIG. 1 for various angles of the reflection layer with respect to the top surface of the substrate, wherein a first top layer has a thickness of 225 nm.
Figure 18:
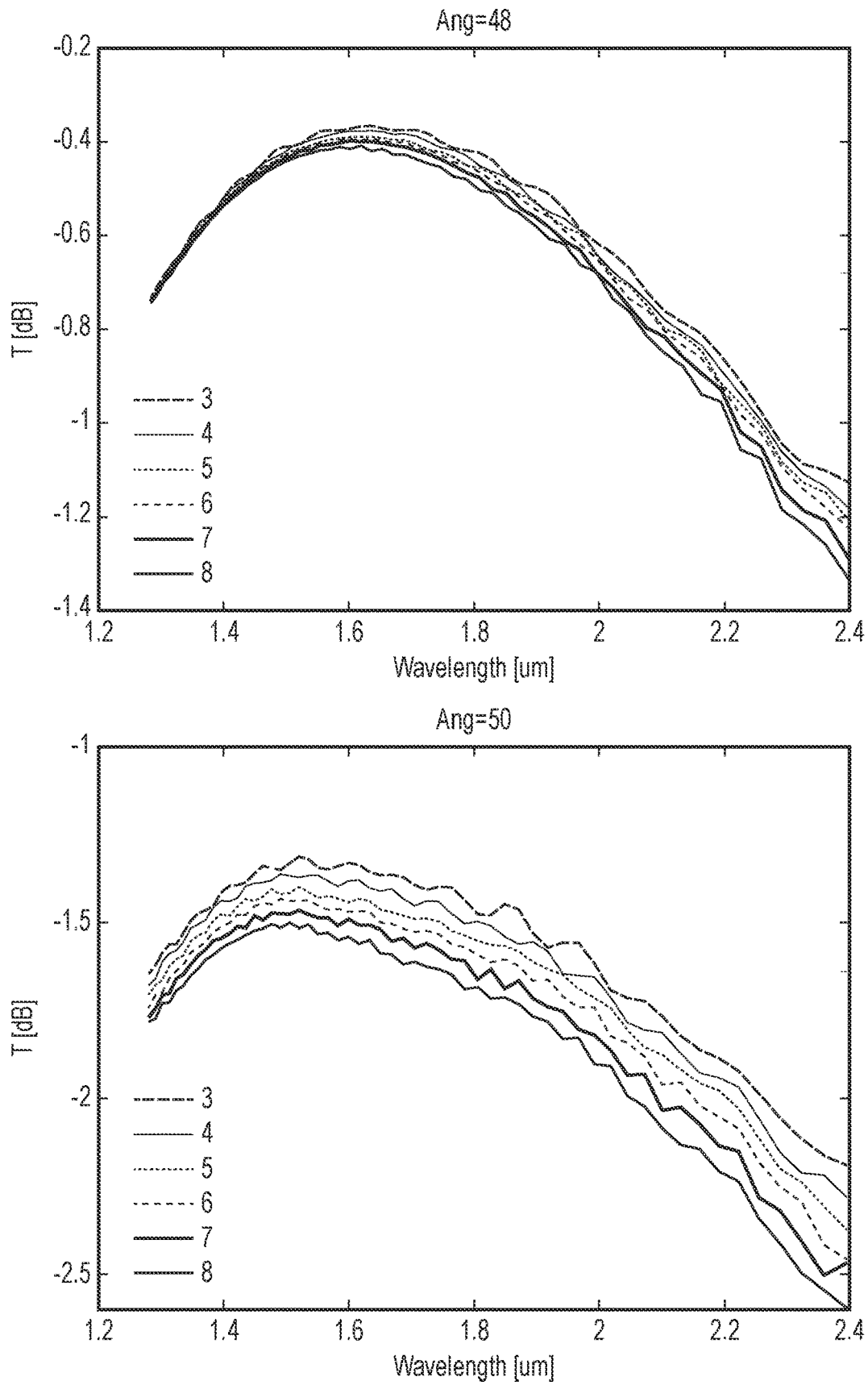
Figure 19:
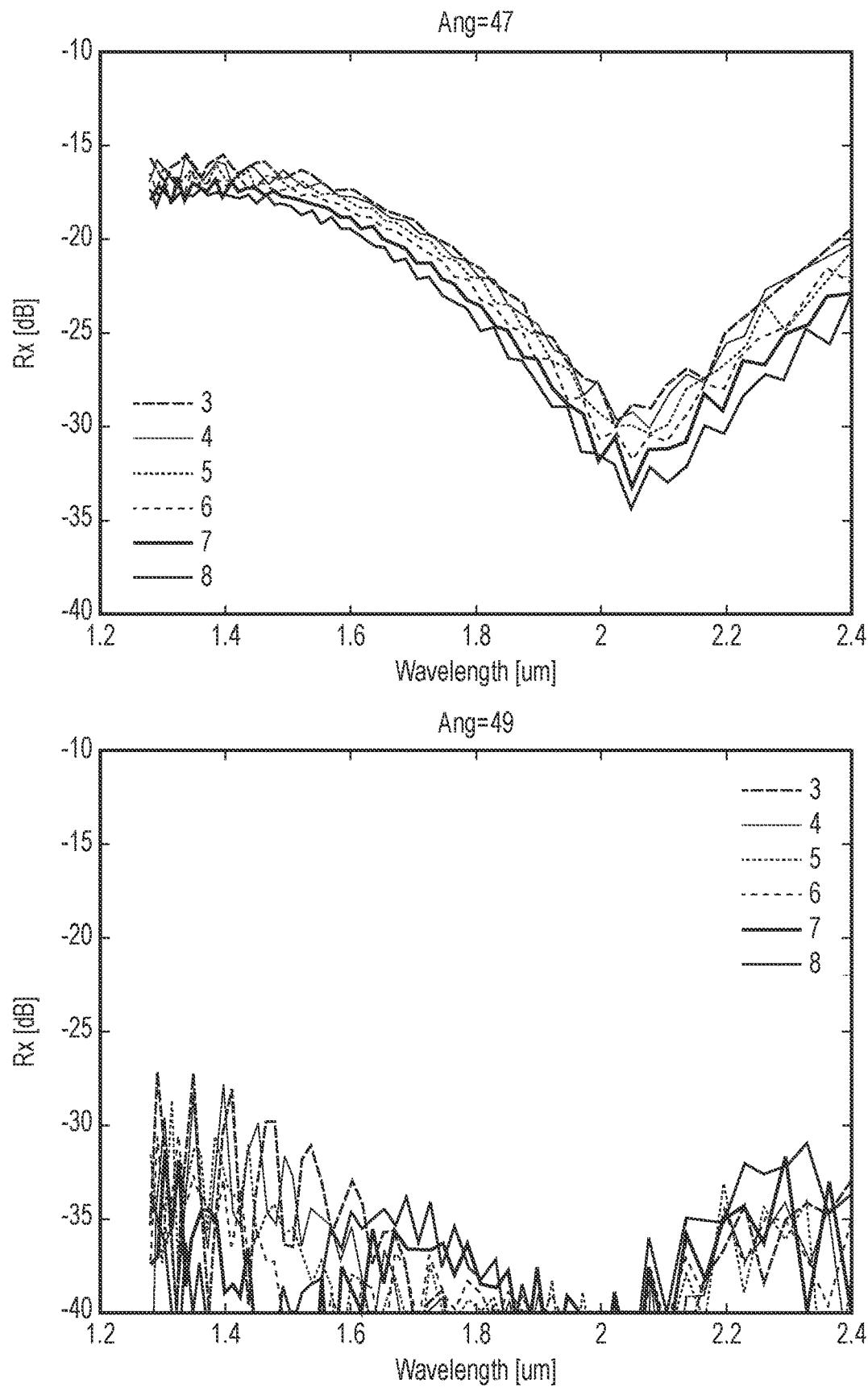
FIG. 19 includes diagrams showing the reflection of a beam at the facet of the optical out-coupler unit of FIG. 1 for various angles of the reflection layer with respect to the top surface of the substrate, wherein a first top layer has a thickness of 260 nm.
Figure 19:
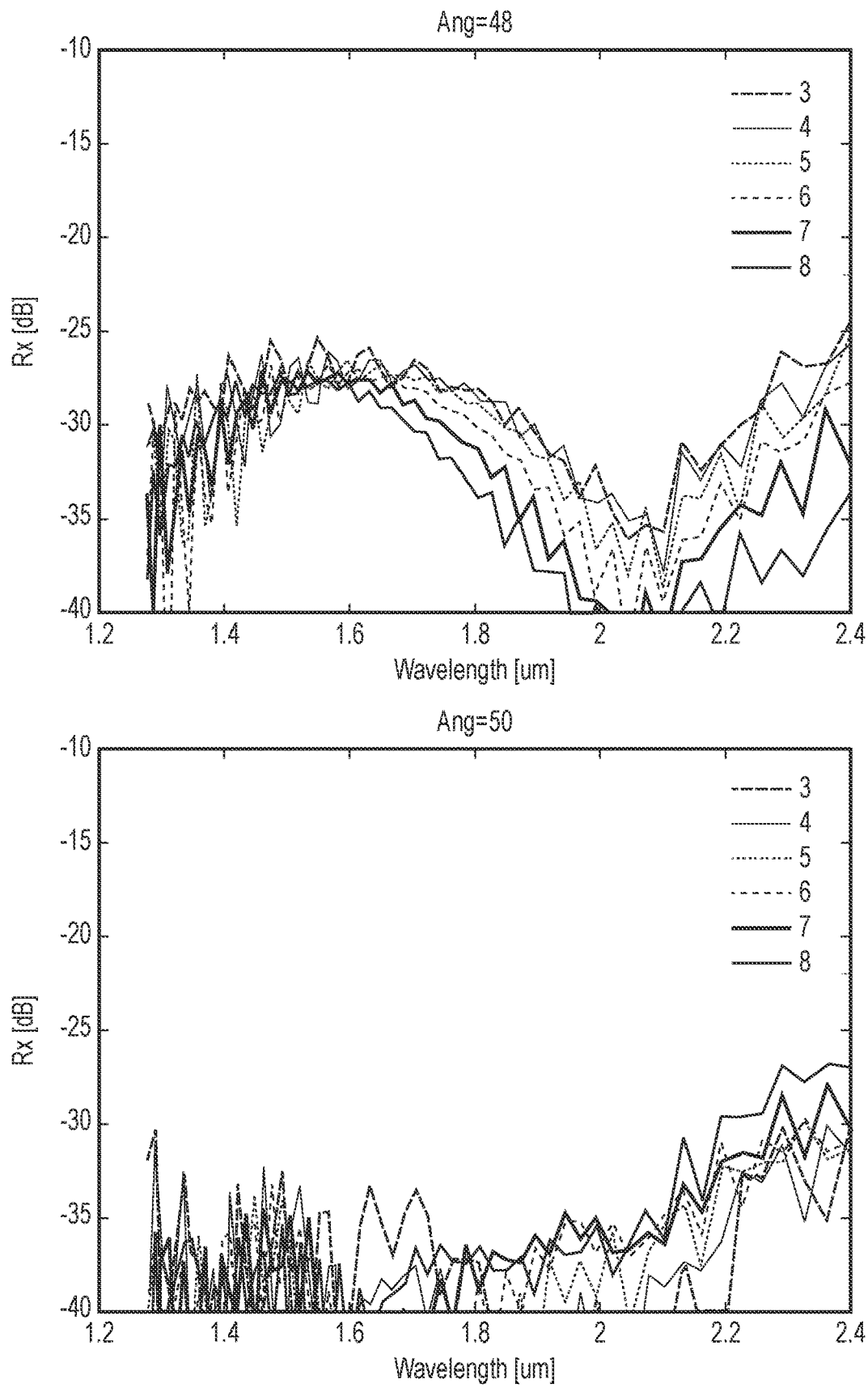
Figure 20:
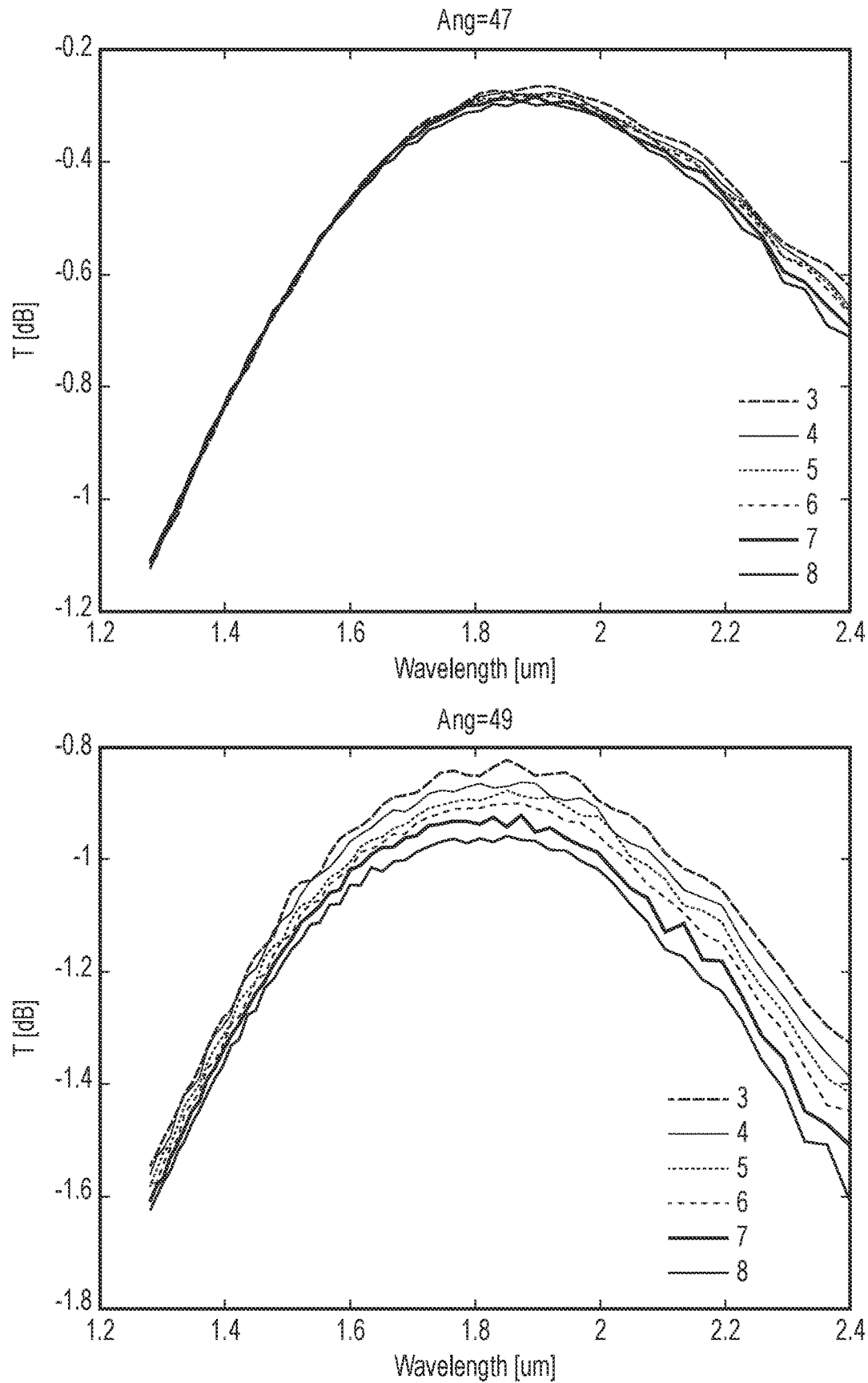
FIG. 20 includes diagrams showing the transmission of the optical out-coupler unit of FIG. 1 for various angles of the reflection layer with respect to the top surface of the substrate, wherein a first top layer has a thickness of 260 nm.
Figure 20:
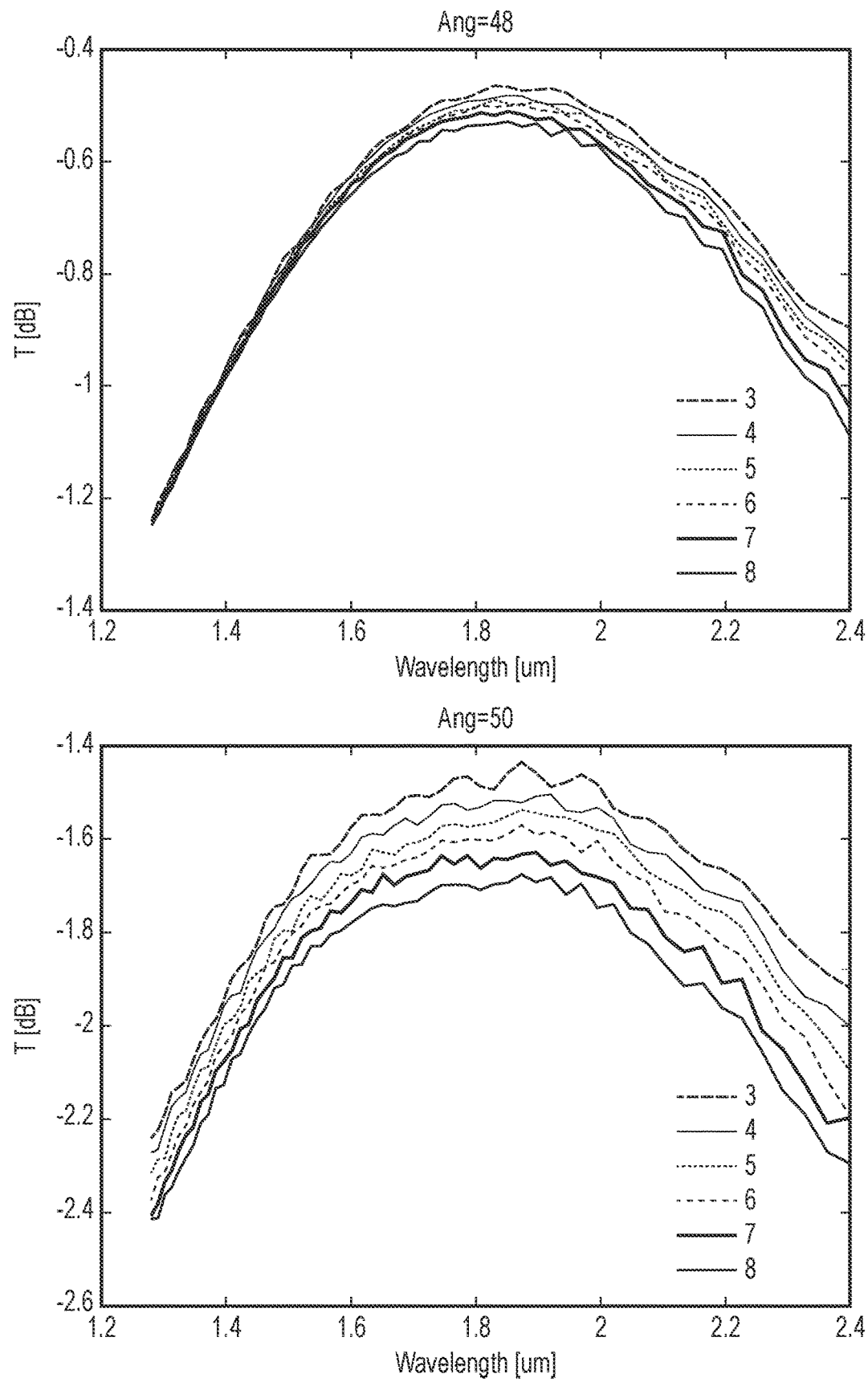
Figure 21:
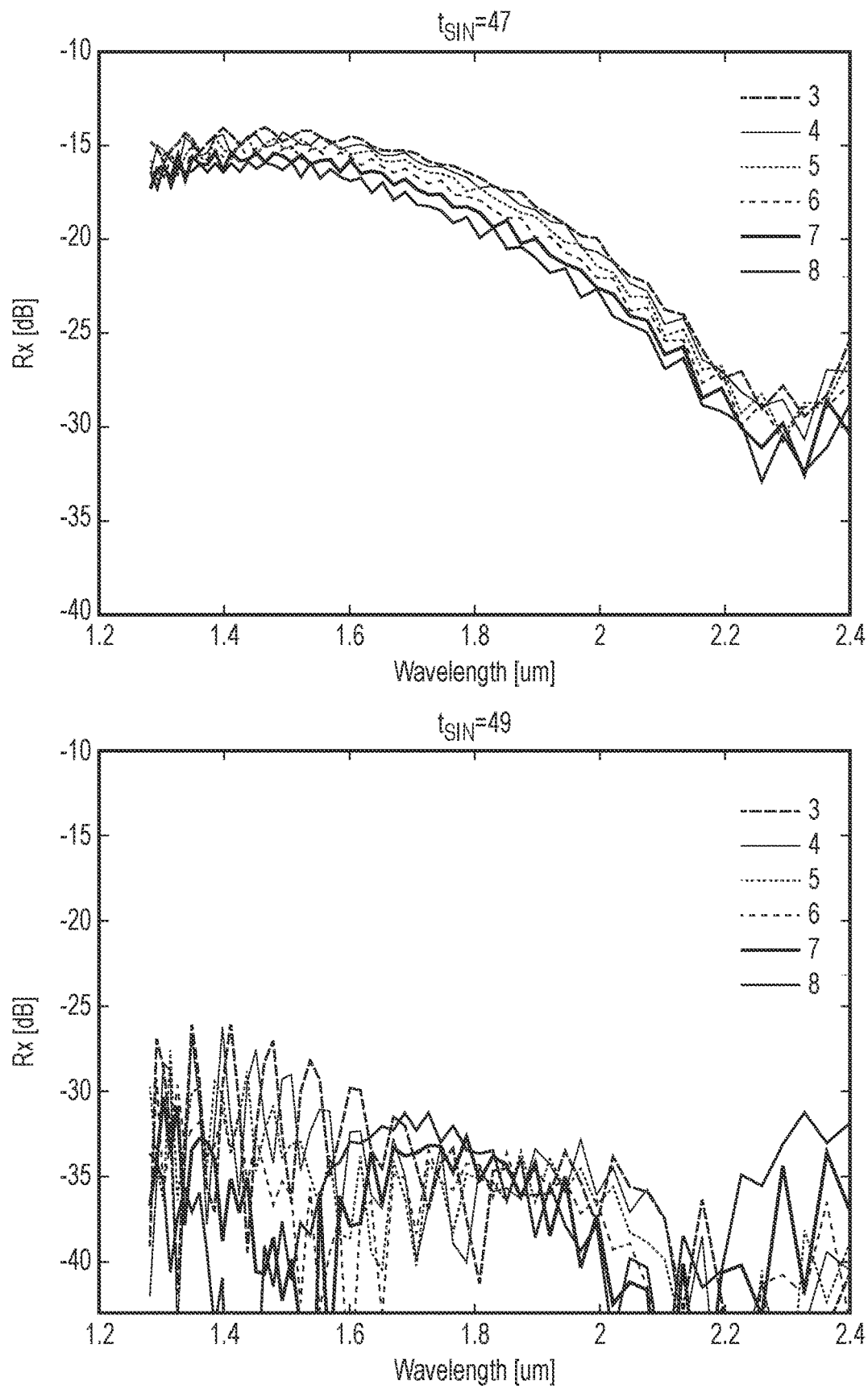
FIG. 21 includes diagrams showing the reflection of a beam at the facet of the optical out-coupler unit of FIG. 1 for various angles of the reflection layer with respect to the top surface of the substrate, wherein a first top layer has a thickness of 290 nm.
Figure 21:
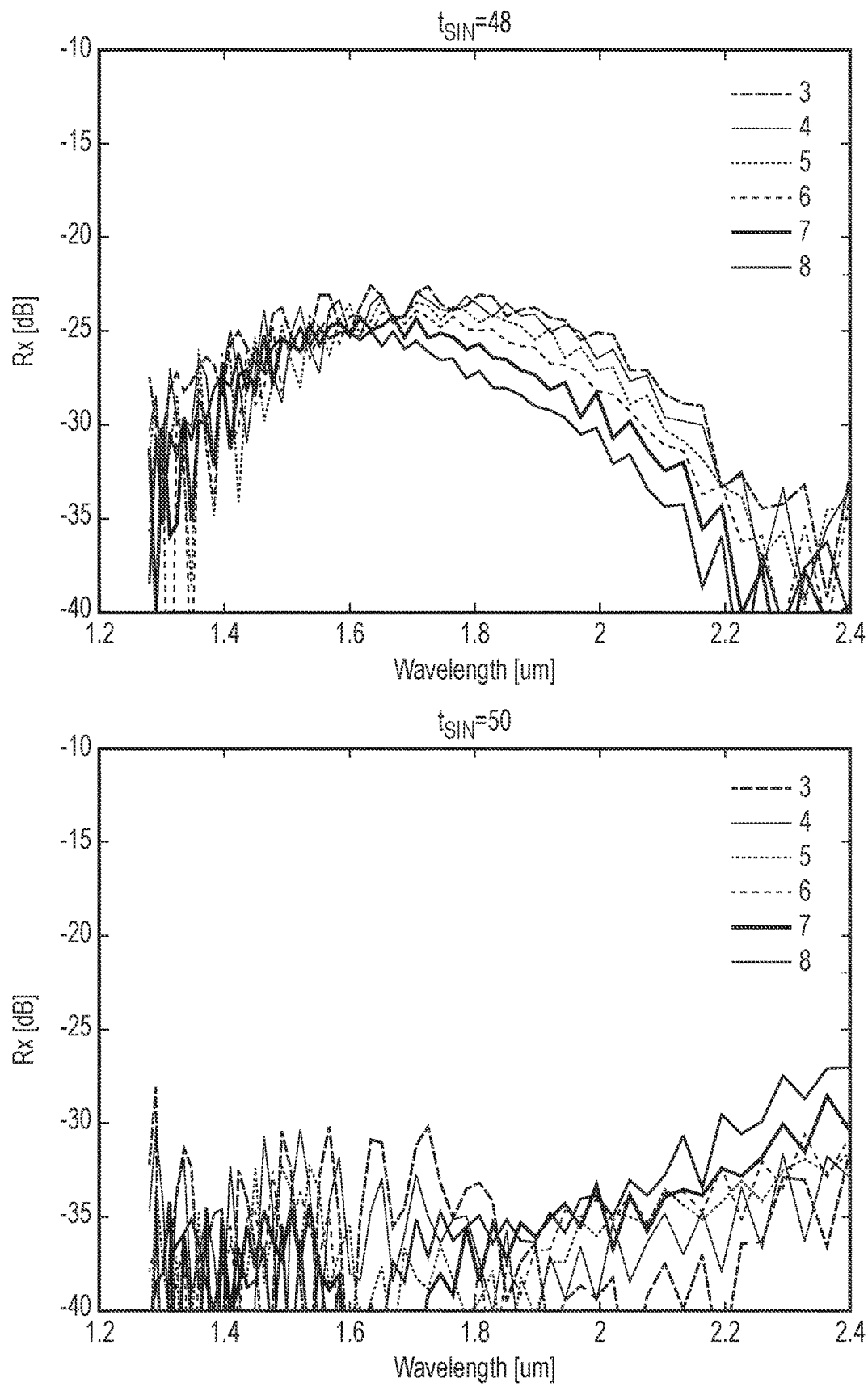
Figure 22:
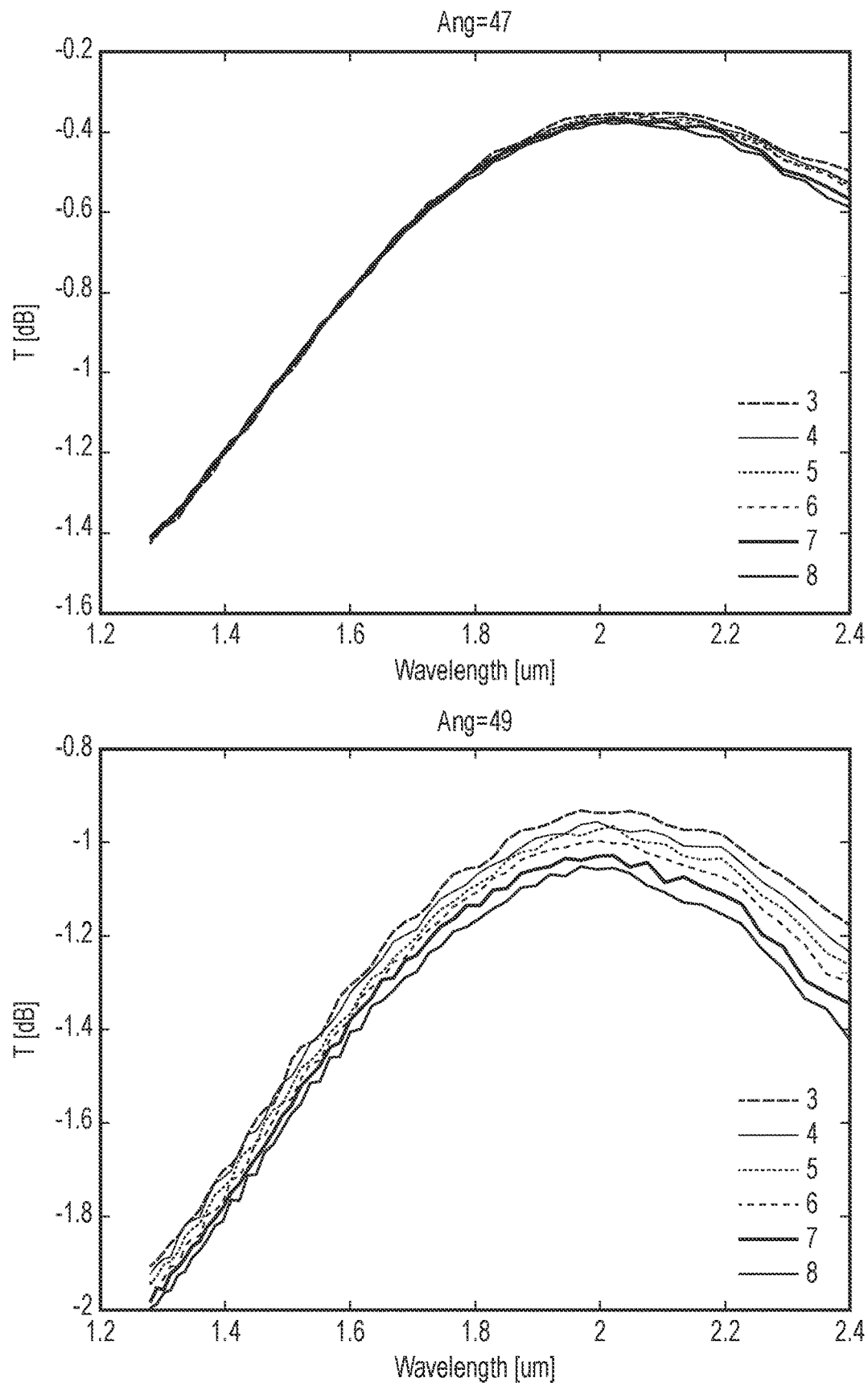
FIG. 22 includes diagrams showing the transmission of the optical out-coupler unit of FIG. 1 for various angles of the reflection layer with respect to the top surface of the substrate, wherein a first top layer has a thickness of 290 nm.
Figure 22:
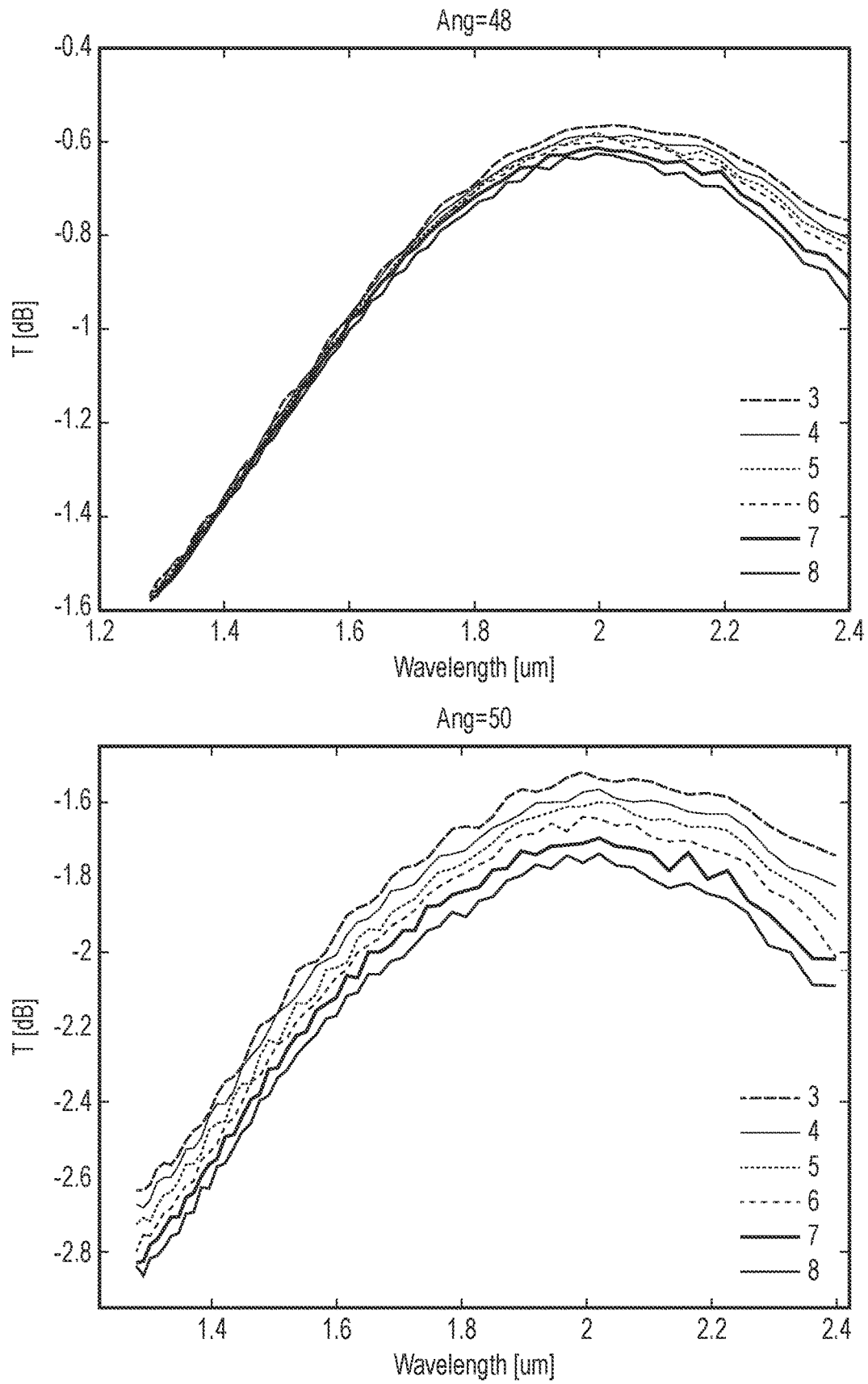

FIGS. 18 to 22 depict diagrams for the out-coupler unit 10 of FIG. 1 (i.e. solely having a first top layer 38). Thereby, FIGS. 17 and 18 show the wavelength dependent reflection and transmission for a thickness of the first top layer 38 of 225 nm, FIGS. 19 and 20 show the wavelength dependent reflection and transmission for a thickness of the first top layer 38 of 260 nm, and FIGS. 21 and 22 show the wavelength dependent reflection and transmission for a thickness of the first top layer 38 of 290. The diagrams of FIGS. 17 to 22 indicate that an optimum thickness is close to 260 nm for the chosen refractive indices and wavelengths. As noted before, the optimum thickness of the first top layer 38 varies with refractive indices of the materials of the filler portion 18 and the first top layer 38 and the wavelength of the radiation propagating through the out-coupler unit 10.

Figure 23:
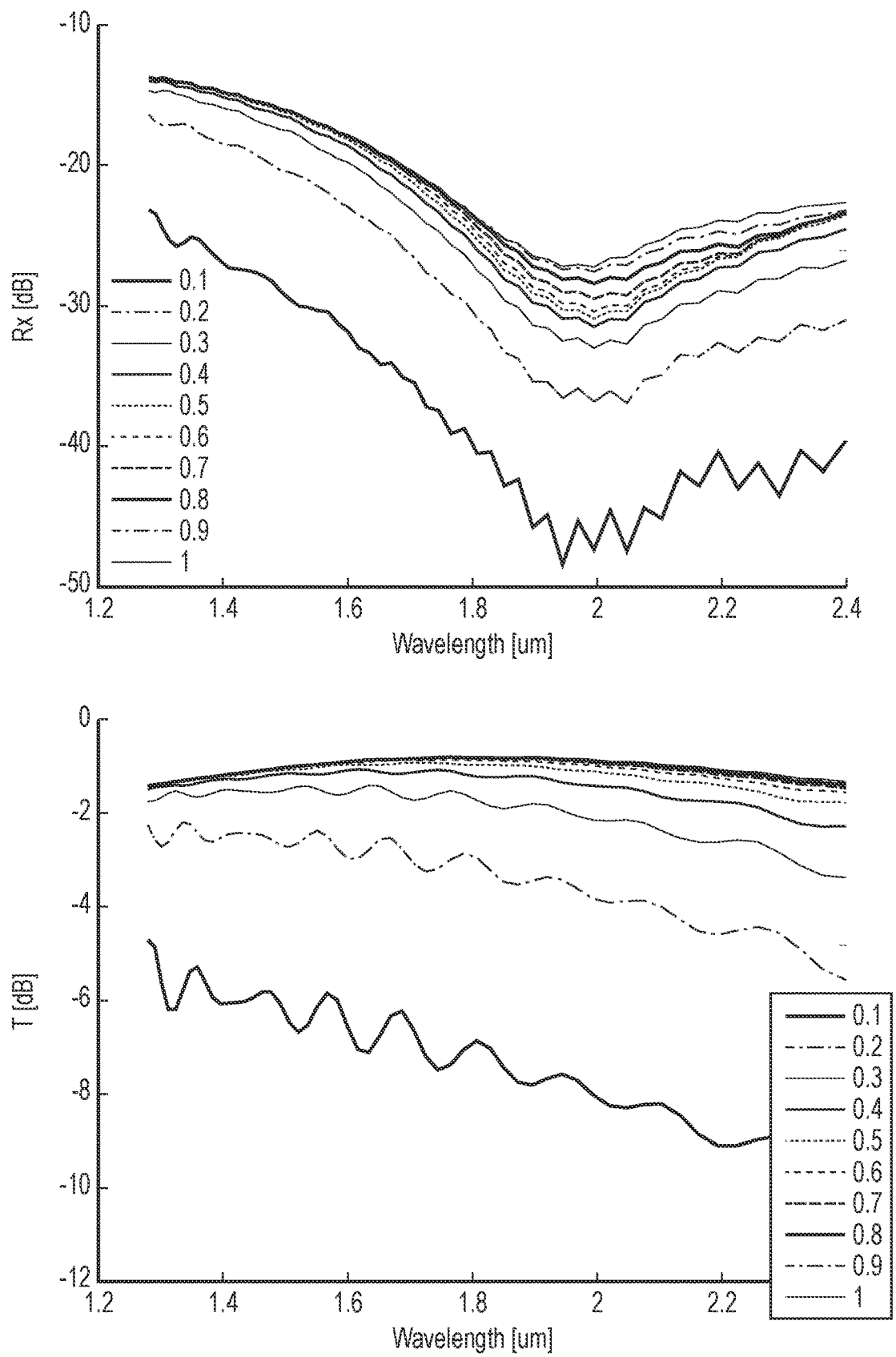
FIG. 23 includes diagrams showing the reflection and transmission of the optical out-coupler unit of FIG. 2 for various thicknesses of a reflection layer.

FIG. 23 shows diagrams depicting the wavelength dependent behaviour of the transmission and reflection whereby the thickness of the reflection layer 16 is varied from 0.1 μm to 1 μm. The diagrams of FIG. 23 refer to the embodiment of the out-coupler unit 10 depicted in FIG. 4 (having an angle α of 45°). It is apparent that the reflection and the transmission is significantly worse if the thickness of the reflection layer 16 is below 250 nm.

Figure 24:
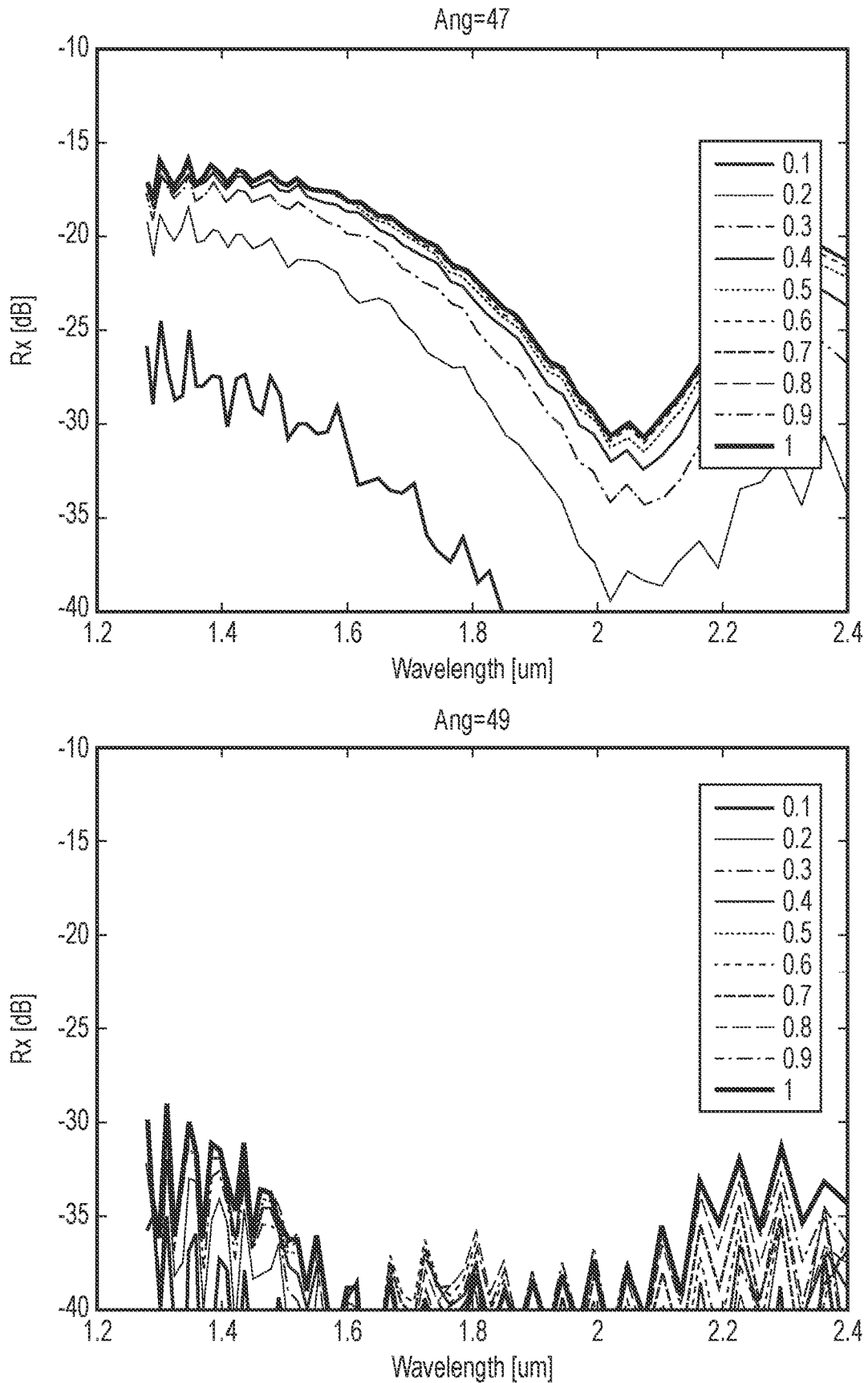
FIG. 24 includes diagrams showing the reflection of the optical out-coupler unit of FIG. 1 for various thicknesses of the reflection layer and for various angles of the reflection layer with respect to the top surface of the substrate.
Figure 24:
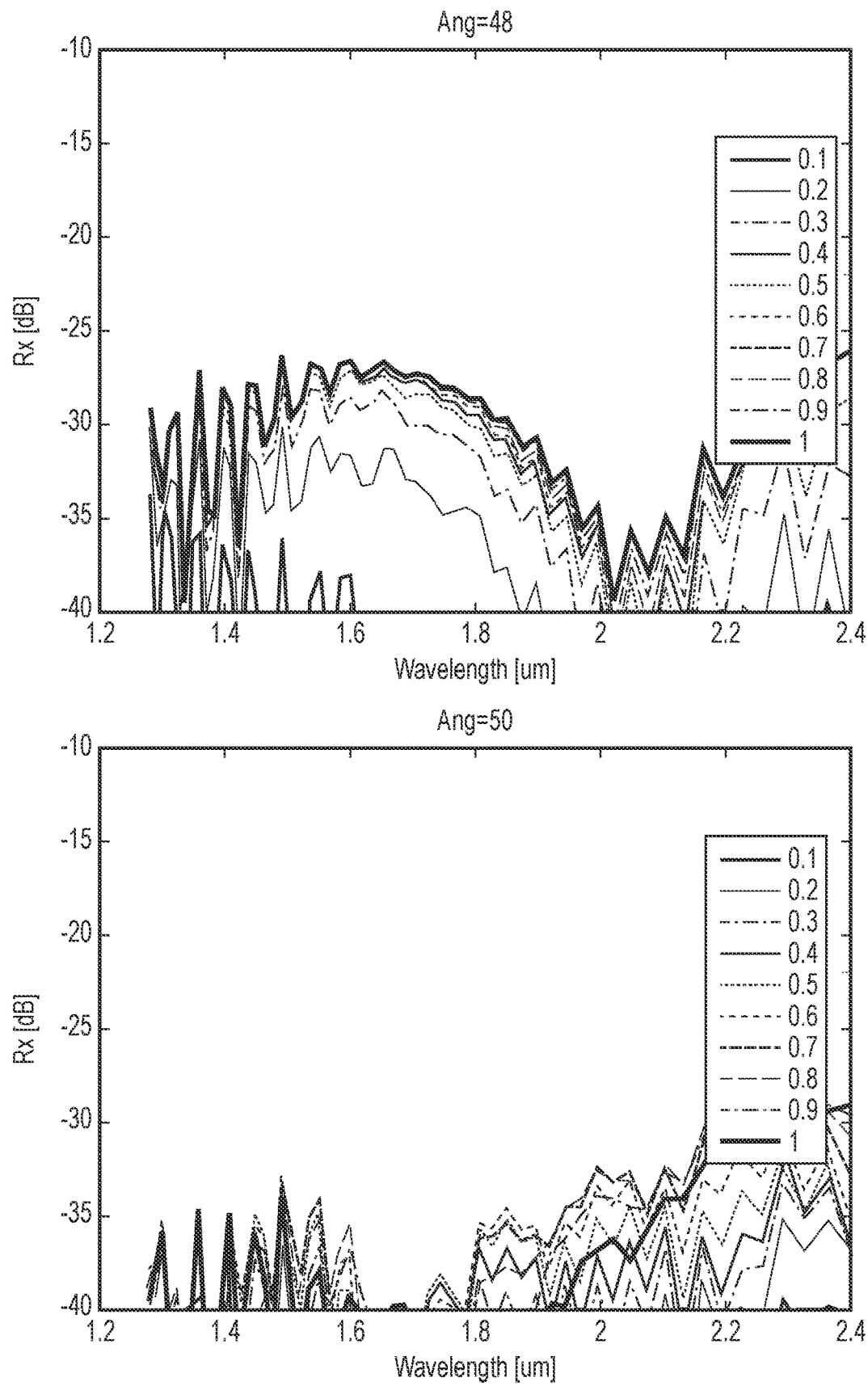
Figure 25:
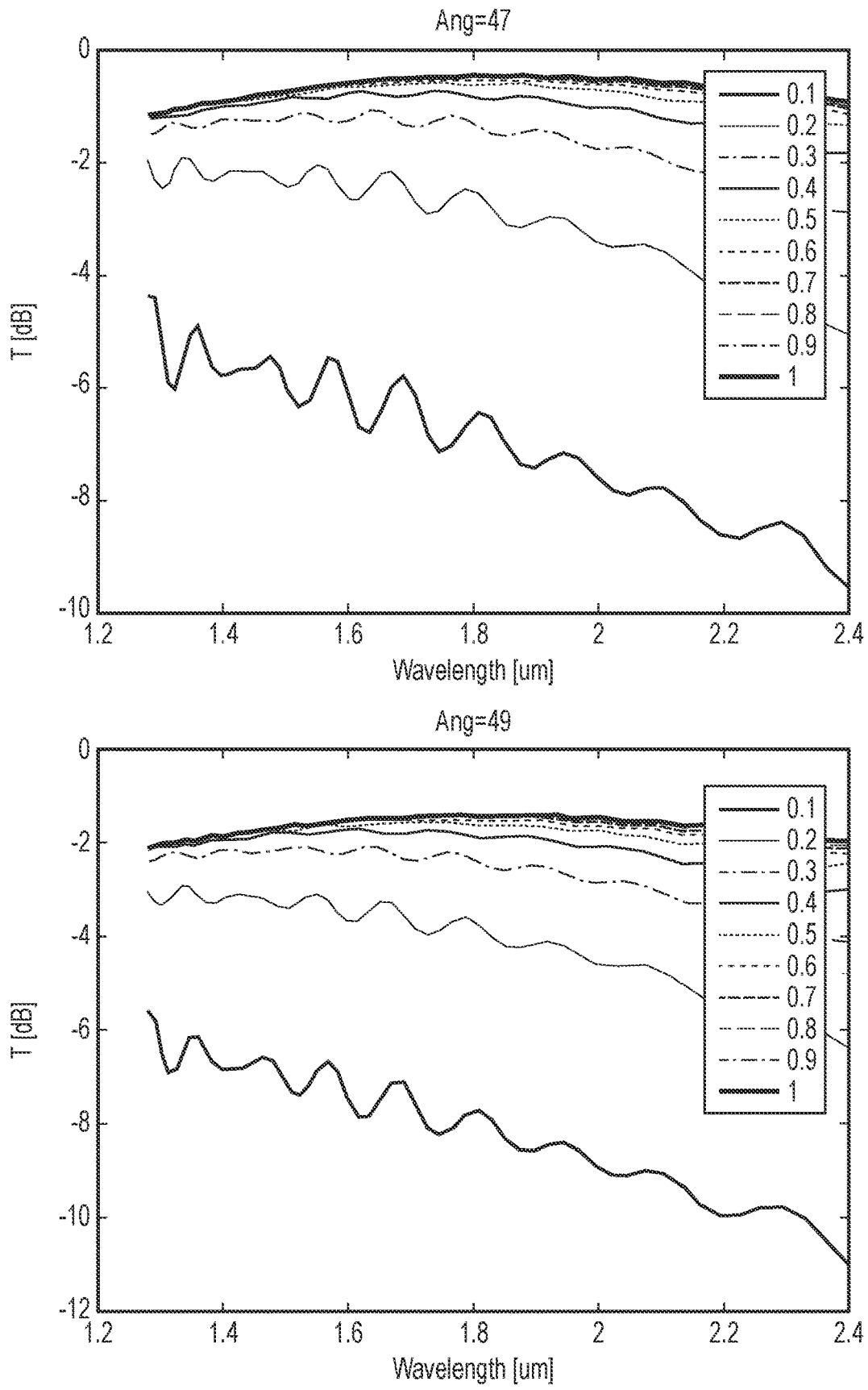
FIG. 25 includes diagrams showing the transmission of the optical out-coupler unit of FIG. 1 for various thicknesses of the reflection layer and for various angles of the reflection layer with respect to the top surface of the substrate.
Figure 25:
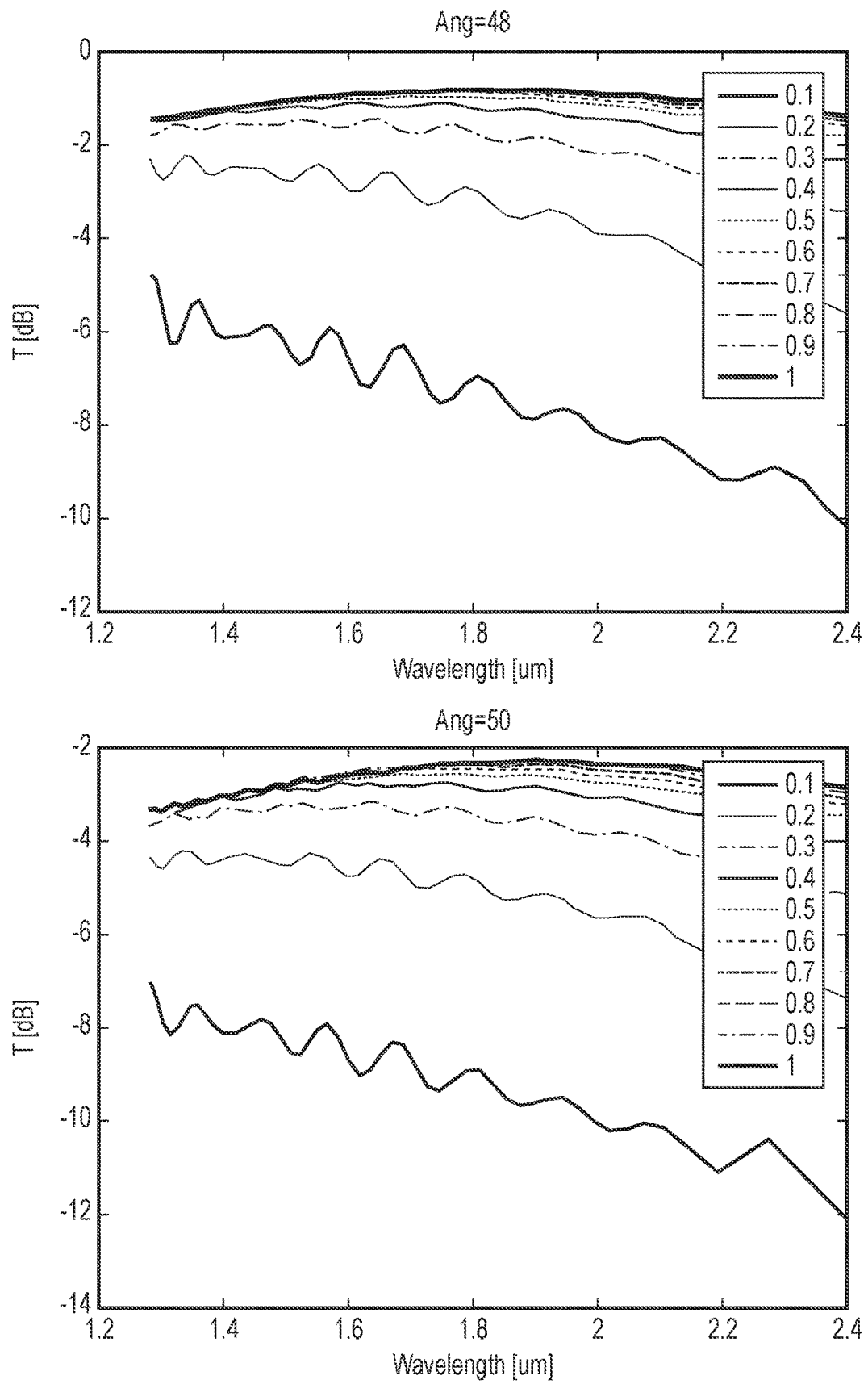

FIGS. 24 and 25 show diagrams depicting the wavelength dependent behaviour of the transmission and reflection whereby the thickness of the reflection layer 16 is varied from 0.1 μm to 1 μm. The diagrams of FIG. 23 refer to the embodiment of the out-coupler unit 10 depicted in FIG. 1 wherein the angle α is varied between 47° and 50°. FIGS. 24 and 25 confirm that the reflection and the transmission is significantly worse if the thickness of the reflection layer 16 is below 250 nm.

Figure 26:
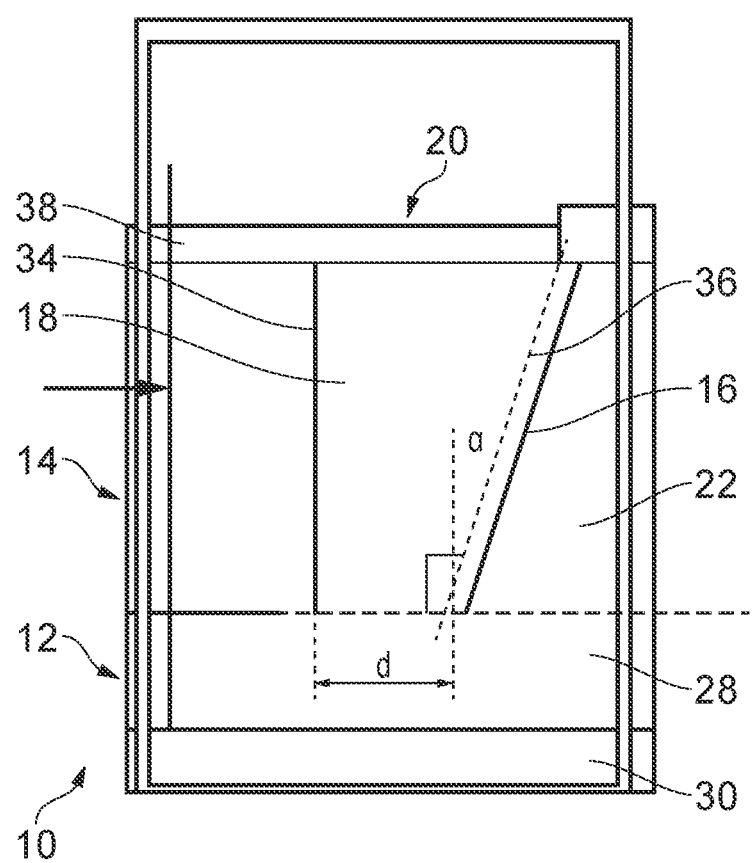
FIG. 26 is a cross-sectional view in a y-z-plane of a fifth embodiment of the optical out-coupler unit.

FIG. 26 depicts another embodiment of the optical out-coupler unit 10. The optical out-coupler unit 10 depicted in FIG. 26 corresponds to the optical out-coupler units 10 depicted in FIG. 1 for except for the following differences.

Figure 29:
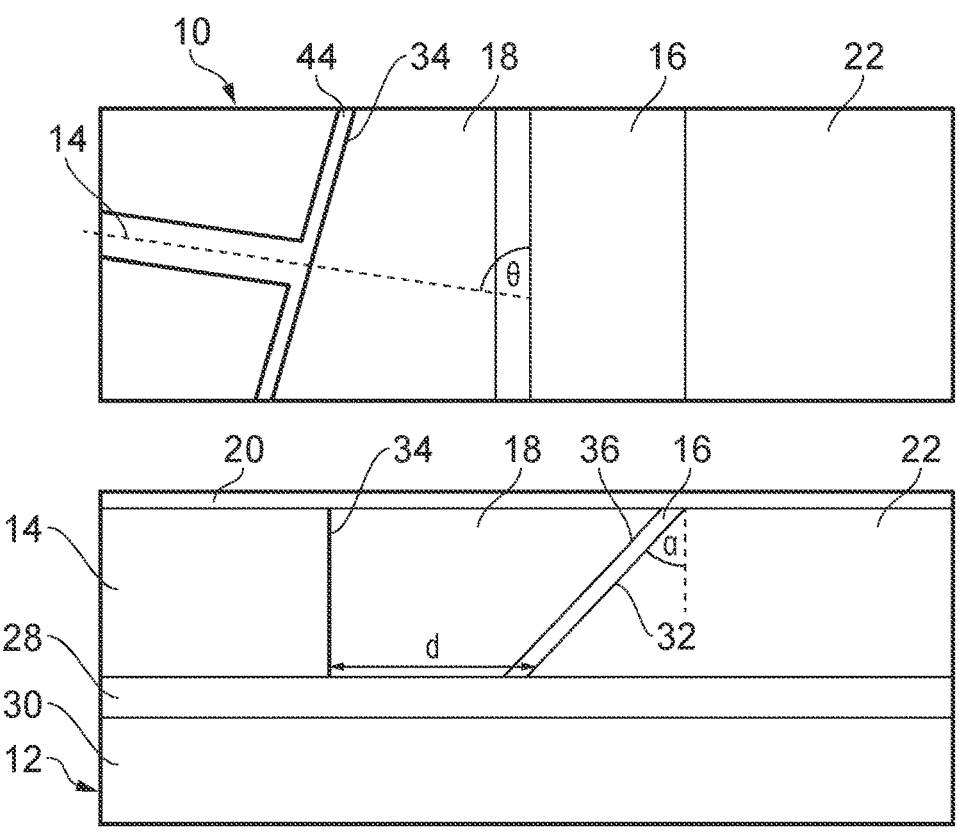
FIG. 29 shows a top view on the x-y plane (top drawing) and a corresponding cross-sectional view in a y-z-plane (bottom drawing) of a seventh embodiment of the optical out-coupler unit.
Figure 30:
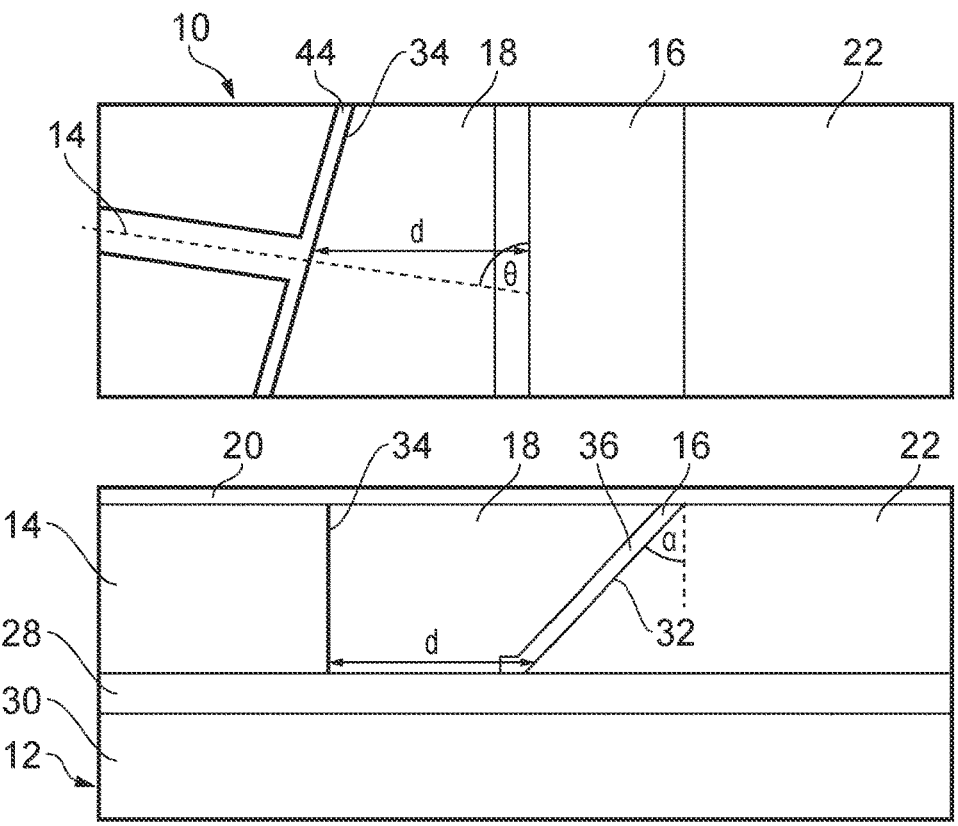
FIG. 30 shows a top view on the x-y plane (top drawing) and a corresponding cross-sectional view in a y-z-plane (bottom drawing) of an eighth embodiment of the optical out-coupler unit.

The reflection layer 16 is made from a metal material and is arranged on the side surface 32 of the supporting material portion 22. The reflection layer 16 extends onto a top surface of the supporting material portion 22. The embodiment of FIG. 4 is similar to the configuration of FIG. 1 with regard to the arrangement of the reflection layer 16. In the embodiment of FIGS. 29 and 30, the electromagnetic radiation impinging on the reflection layer 16 is not reflected by total internal reflection but by the inherent reflection properties of a metal layer. Due to the characteristics of metal, the thickness of the reflection layer 16 may be reduced down to 150 nm. The surface of the reflection layer 16 that faces the facet 34 corresponds to the reflective surface 36. The reflection layer 16 may include gold or aluminium.

The space between the facet 34 and the reflection layer 16 is completely filled with the filler portion 18 which can be amorphous silicon. As a consequence, there is no anti-reflection coating 20 arranged on the facet 34. Rather, the anti-reflection coating 20 is arranged on a top surface of the filler portion 18. The characteristics and features of the anti-reflection coating 20 of this embodiment is similar to the anti-reflection coating 20 discussed in conjunction with the embodiments depicted in FIGS. 1 to 4.

Figure 27:
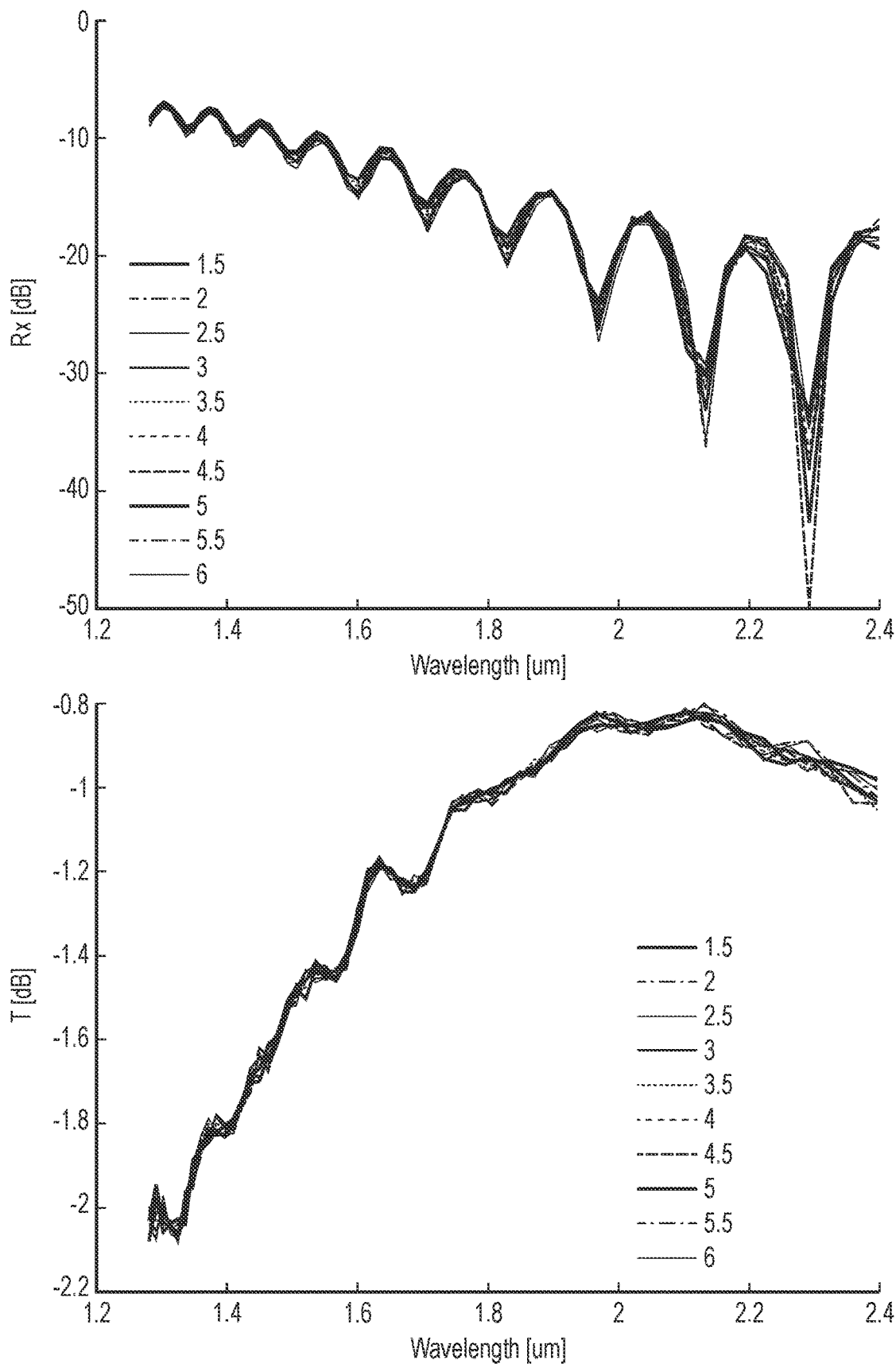
FIG. 27 includes diagrams showing the reflection and transmission of the optical out-coupler unit of FIG. 26.

FIG. 27 shows the wavelength dependent reflection and transmission for various distances d for the out-coupler unit 10 of FIG. 26. The diagrams of FIG. 27 correspond to the diagrams of FIG. 31. The diagrams exhibit little to no dependence of the transmission and the reflection on the distance d. Furthermore, the reflection exhibits oscillations which are due to the divergence of the beam exiting the waveguide 16. The transmission and reflection are improved compared to transmission and reflection of out-coupler unit 10 of FIGS. 1 to 4.

The optical out-coupler units of FIGS. 1, 2, 3, 4, and 26 may include a T-bar 44 as described in the following.

Figure 28:
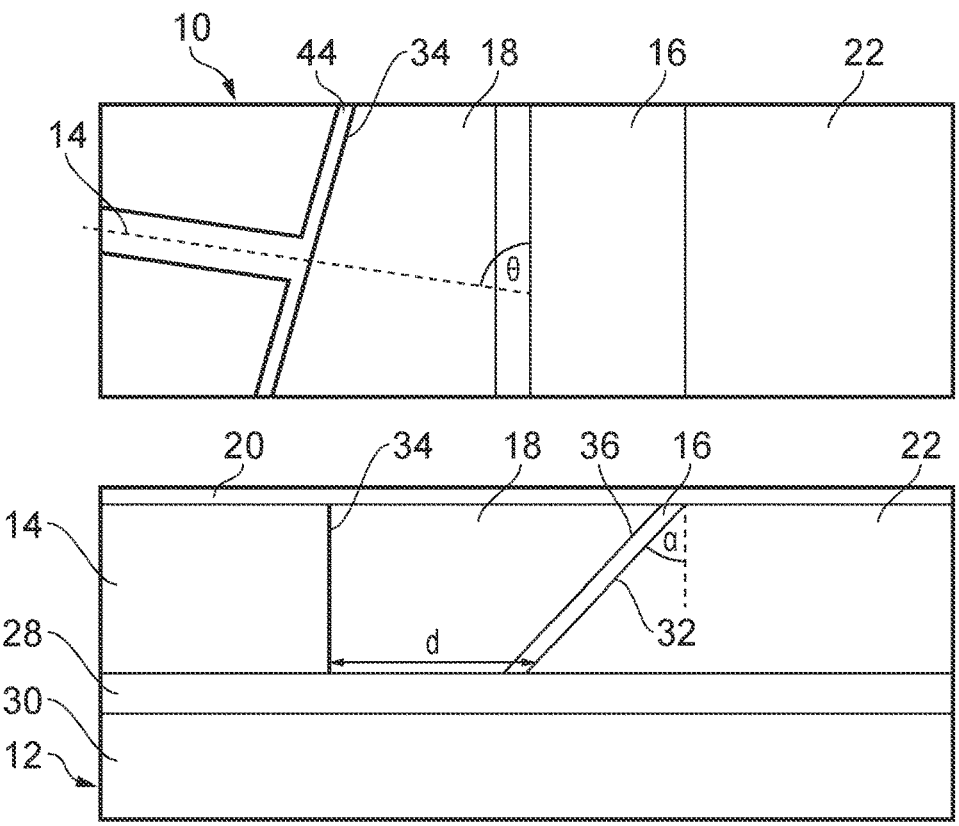
FIG. 28 shows a top view on the x-y plane (top drawing) and a corresponding cross-sectional view in a y-z-plane (bottom drawing) of a sixth embodiment of the optical out-coupler unit.

FIG. 28 shows a further embodiment of the optical out-coupler unit 10 which includes the features of the out-coupler unit 10 of FIGS. 1 to 3 except for the following differences. The waveguide 14 is inclined with respect to a normal to the reflective surface 16 and the reflection layer 16. This angle θ may be between 70° to 89° and, in the embodiment of FIG. 28, 84°. However, the angle θ may be 90° (not shown in FIG. 28). Further, the waveguide 16 includes a T-bar 44. The T-bar 44 is arranged on the end of the waveguide 14 that faces the reflective surface 36. The T-bar constitutes the facet 34. Both the T-bar 44 and the waveguide 14 are angled with respect to the normal to the reflective surface 36. The reflection layer 16 includes silicon oxide (SiO$_2$). The filler portion 18 includes amorphous silicon. The optical out-coupler unit 10 is a silicon on insulator so that the waveguide 14, the supporting material portion 22, and the lower substrate layer 30 include silicon. The upper substrate layer 28 is an insulator including buried oxide. The angle α of the reflective surface 36 with regard to a normal to the top surface of the substrate 12 is 45°. The reflection layer 16 does not extend onto the top surface of the supporting material portion 22 but onto the top surface of the substrate 12. FIG. 29 shows a further embodiment of the optical out-coupler unit 10 which includes the features of the out-coupler unit 10 of FIG. 28 except for the following difference. The reflection layer 16 is a metal layer which includes gold or silver. The reflection layer 16 does not cover the top surface of the supporting material portion 22 and/or but extends onto the top surface of the substrate 12.

FIG. 30 shows a further embodiment of the optical out-coupler unit 10 which includes the features of the out-coupler unit 10 of FIG. 29 except for the following difference. The filler portion 18 includes silicon oxide (SiO$_2$).

Figure 31:
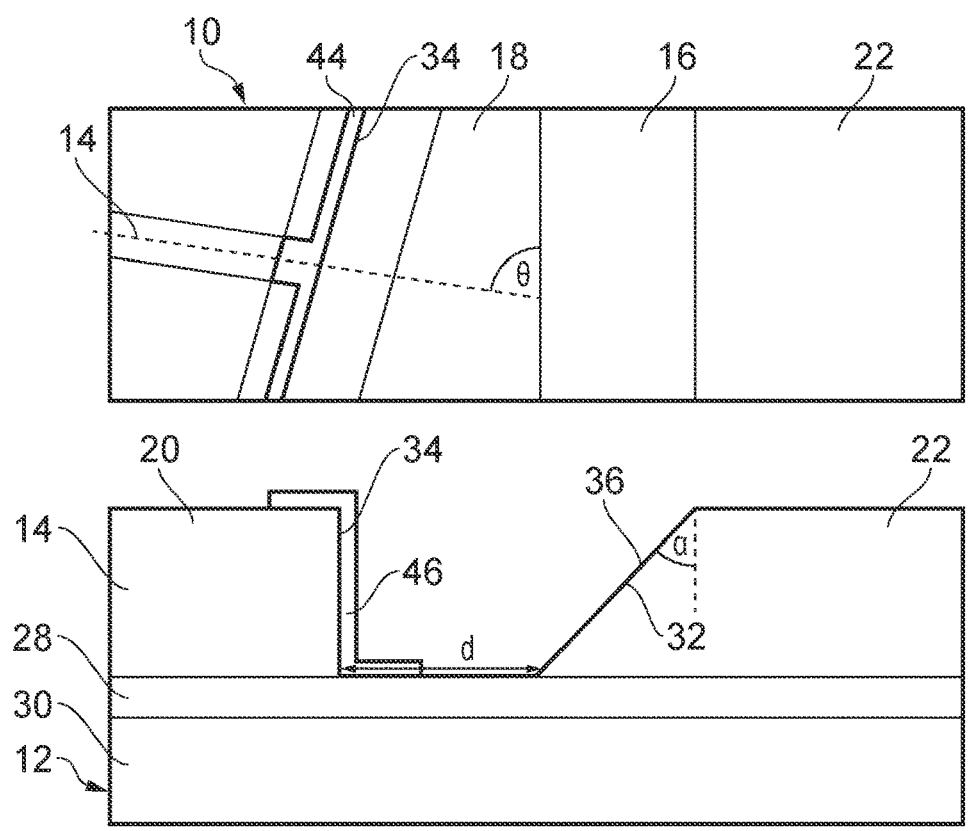
FIG. 31 shows a top view on the x-y plane (top drawing) and a corresponding cross-sectional view in a y-z-plane (bottom drawing) of a ninth embodiment of the optical out-coupler unit.

FIG. 31 shows a further embodiment of the optical out-coupler unit 10 which includes the features of the out-coupler unit 10 of FIGS. 28 to 30 except for the following differences. No filler portion 18 is present with this embodiment so that the space between the facet 34 and the reflective surface 36 is empty or in other words filled with air. This allows to provide the reflective surface 36 by the side surface 32 of the supporting material portion 22 since the refractive index mismatch between the material of the supporting material portion 22 and air is sufficient to provide substantial reflection at the interface between air and the side surface 32 of the supporting material portion 22. In this case, this interface corresponds to the reflective surface 36. Total internal reflection is provided at the reflective surface 36 since the angle α of the reflective surface 36 to a normal of the top surface of the substrate 22 is 54.7°.

The optical out-coupler unit 10 further includes an intermediate layer 46 which may include silicon nitride (SiN). The intermediate layer 46 covers the complete facet 34 and may extend over a top surface of the waveguide 14 and/or the top surface of the substrate 12. The intermediate layer 46 has a refractive index which is between the refractive index of the waveguide 14 and the refractive index of air. Thus, the intermediate layer 46 is provided for reducing back reflection at the facet 34. The intermediate layer 46 provides similar advantages as the anti-reflection coating 20.

Figure 32:
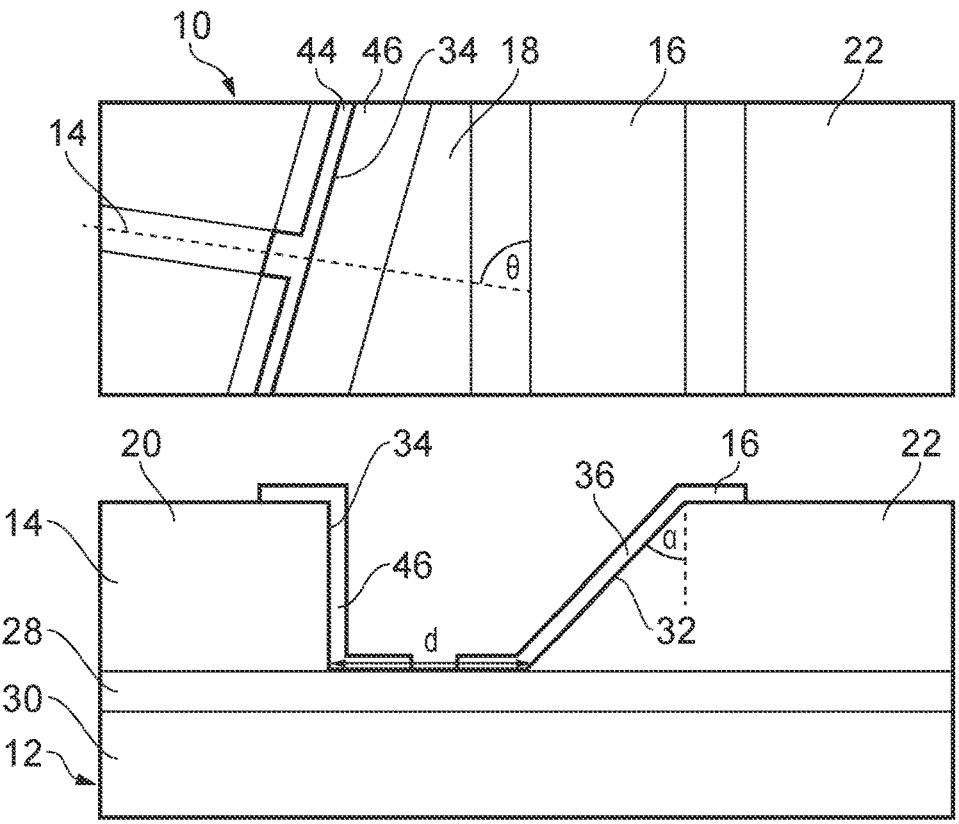
FIG. 32 shows a top view on the x-y plane (top drawing) and a corresponding cross-sectional view in a y-z-plane (bottom drawing) of a tenth embodiment of the optical out-coupler unit.

FIG. 32 shows a further embodiment of the optical out-coupler unit 10 which includes the features of the out-coupler unit 10 of FIG. 31 except for the following difference. The reflection layer 16 is provided on the side surface 32 of the supporting material portion 22 and is a metal layer which includes gold or silver. The reflection layer 16 extends onto the top surface(s) of the supporting material portion 22 and/or of the substrate 12.

Figure 33:
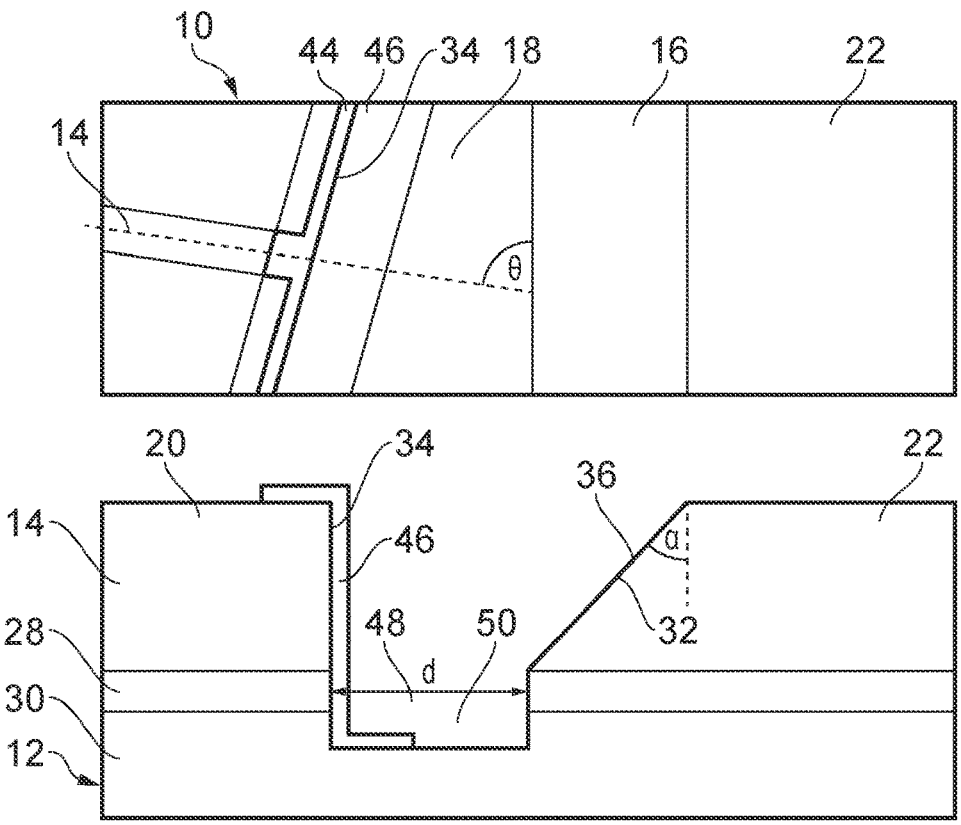
FIG. 33 shows a top view on the x-y plane (top drawing) and a corresponding cross-sectional view in a y-z-plane (bottom drawing) of an eleventh embodiment of the optical out-coupler unit.

FIG. 33 shows a further embodiment of the optical out-coupler unit 10 which includes the features of the out-coupler unit 10 of FIG. 31 except for the following differences. The upper substrate layer 28 includes an opening 48 between the facet 34 and the side surface 34 of the supporting material portion 22. This means that the upper substrate layer 28 is (completely) removed between the facet 34 and the side surface 32 of the supporting material portion 22. Further, the lower substrate layer 30 includes a recess 50 which coincides with the opening 48. The opening 48 and the recess 50 may be manufactured by etching the substrate 12. The intermediate layer 46 extends over side surfaces of the opening 48 and the recess 52 to a bottom surface of the recess 50. This helps to ensure that the intermediate layer 46 covers the complete facet 34.

Figure 34:
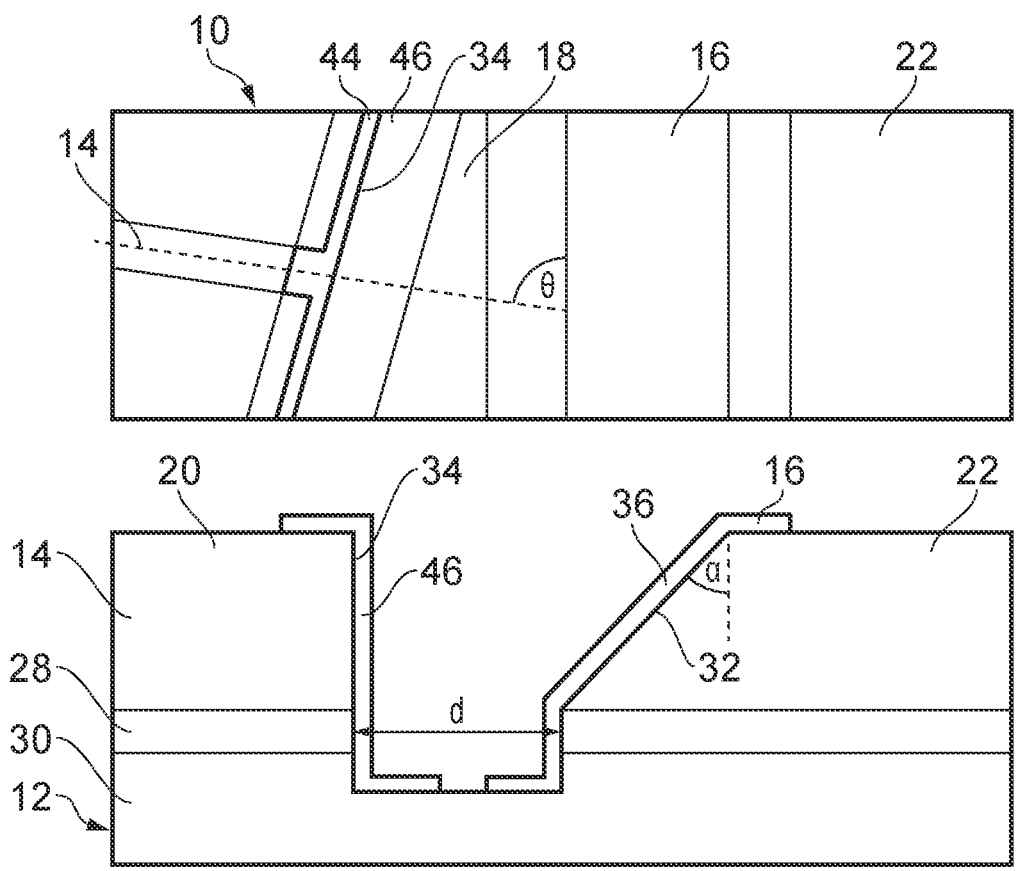
FIG. 34 shows a top view on the x-y plane (top drawing) and a corresponding cross-sectional view in a y-z-plane (bottom drawing) of a twelfth embodiment of the optical out-coupler unit.

FIG. 34 shows a further embodiment of the optical out-coupler unit 10 which includes the features of the out-coupler unit 10 of FIG. 33 except for the following difference. The reflection layer 16 is provided on the side surface 32 of the supporting material portion 22 and is a metal layer which includes gold or silver. The reflection layer 16 extends over the side surfaces of the opening 48 and the recess 52 to the bottom surface of the recess 50. This helps to ensure that the reflection layer 16 covers the complete side surface 32 of the supporting material portion 22.

Figure 35:
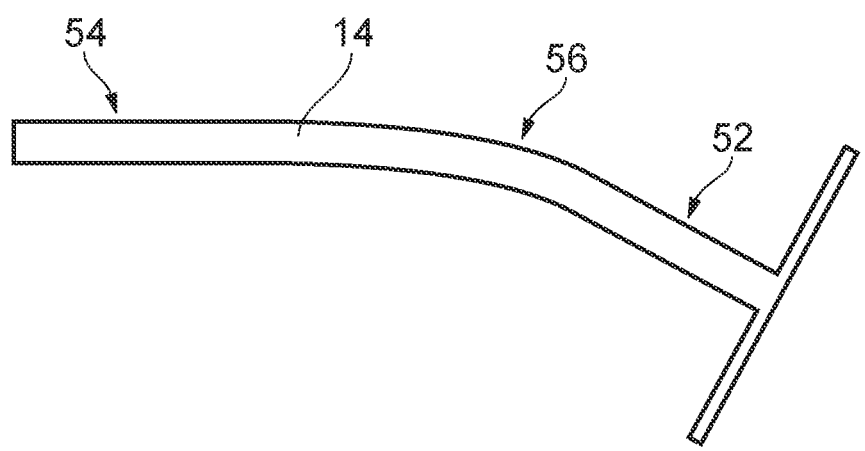
FIG. 35 shows a top view of a waveguide including a bend.

FIG. 35 shows a top view of the waveguide 14 without showing further details of the optical out-coupler unit 10. A straight end section 52 of the waveguide 14 is inclined as depicted in FIGS. 29 to 34. The waveguide 14 further includes a straight horizontal section 54 which is connected to the end section 52 by a bend 56, optionally a Euler bend.

Figure 36:
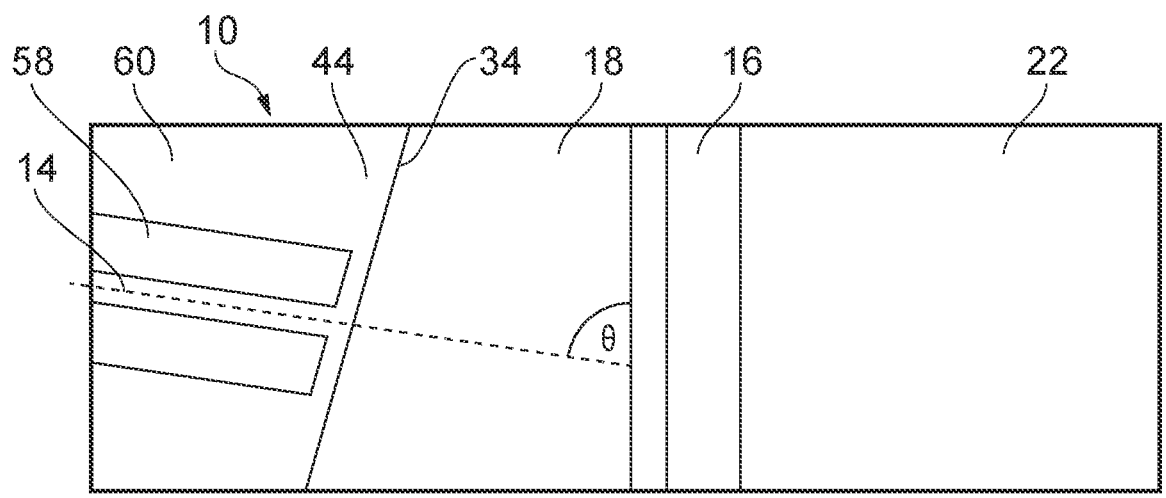
FIG. 36 shows a top view on the x-y plane (top drawing) and a corresponding perspective view (bottom drawing) of a thirteenth embodiment of the optical out-coupler unit.
Figure 36:
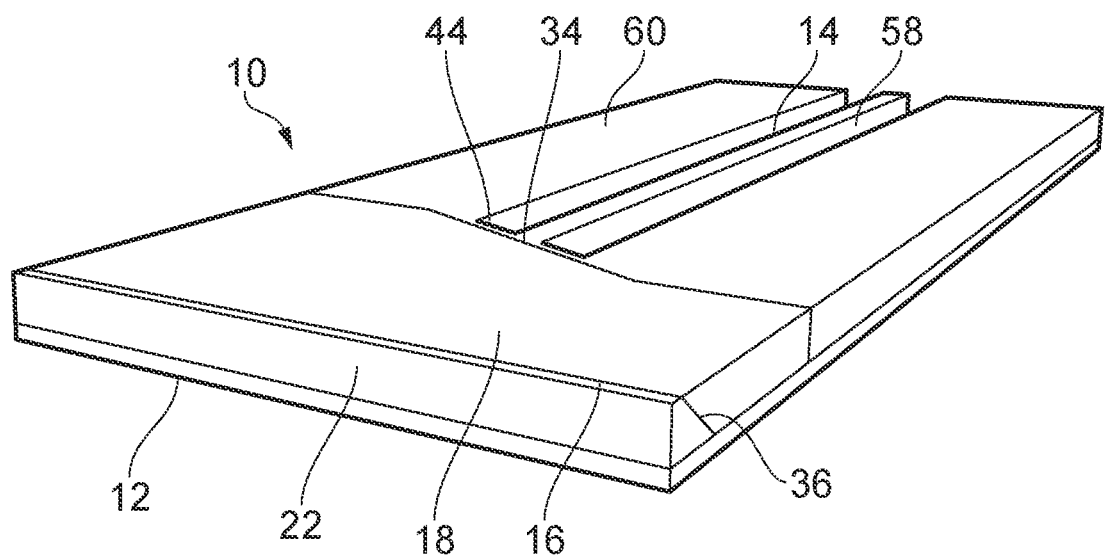

FIG. 36 shows a further embodiment of the optical out-coupler unit 10 which includes the features of the out-coupler unit 10 of FIG. 28 except for the following differences. The waveguide 14 is formed by providing two waveguide cavities 58 in a waveguide substrate 60. The waveguide cavities 58 extend parallel to each other along a direction of extension of the waveguide 14 providing a constant width of the waveguide 14. The waveguide substrate 60 is provided on the substrate 12 and may include crystalline silicon. The waveguide substrate 60 may be a continuous layer of material which is arranged, for example deposited, on substrate 12. The filler portion 18 may be made of amorphous silicon.

A depth of the waveguide cavities 58 may correspond to the thickness of the waveguide substrate 60 so that a bottom surface of the waveguide cavities 58 is provided by the substrate 12. This forms a strip waveguide 14. The waveguide cavities 58 are spaced apart from the facet 34 providing the T-bar 44. The embodiment of FIG. 36 does not include the anti-reflection coating 20.

Figure 37:
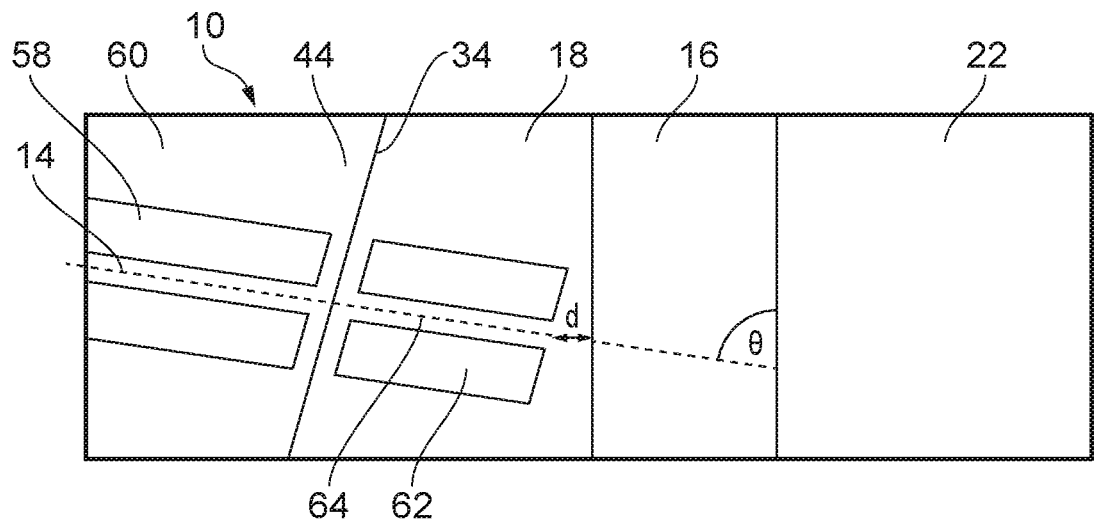
FIG. 37 shows a top view on the x-y plane (top drawing) and a corresponding perspective view (bottom drawing) of a fourteenth embodiment of the optical out-coupler unit.
Figure 37:
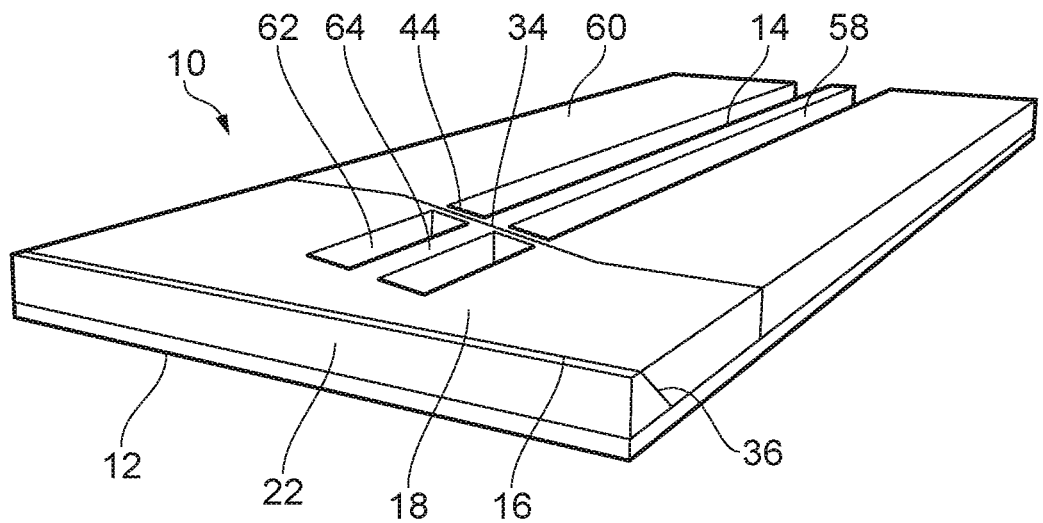

FIG. 37 shows a further embodiment of the optical out-coupler unit 10 which includes the features of the out-coupler unit 10 of FIG. 36 except for the following differences. Two filler cavities 62 are formed within the filler portion 18. A depth of the filler cavities 62 corresponds to the thickness of the filler portion 18 so that a bottom surface of the filler cavity 62 is provided by the substrate 12. The filler cavities 62 extend parallel to each other providing a constant distance between the two filler cavities 62 along the direction of extension. The material of the filler portion 18 provided between the filler cavities 62 forms a second waveguide 64. A width of the second waveguide 64 is equal to a width of the waveguide 14 which means that the (constant) distance between the filler cavities 62 corresponds to the (constant) distance between the waveguide cavities 58. The second waveguide 64 is straight and arranged as an extension of the waveguide 12. This means that a line of extension of the waveguide 12 coincides with a line of extension of the second waveguide 64.

The filler cavities 62 are spaced apart both from the facet 34 and the reflective surface 36 providing two T-bars at opposing ends of the second waveguide 64. The T-bar 44 of the waveguide 12 is in contact to and parallel to the T-bar of the second waveguide 64 facing the waveguide 12. In other words, a first end surface of the second waveguide 64 is parallel to the facet 34. A second end surface of the second waveguide 64 is inclined to the reflective surface by the angle θ due to the inclined arrangement of the waveguide 12 and the second waveguide 46 by the same angle θ.

Figure 38:
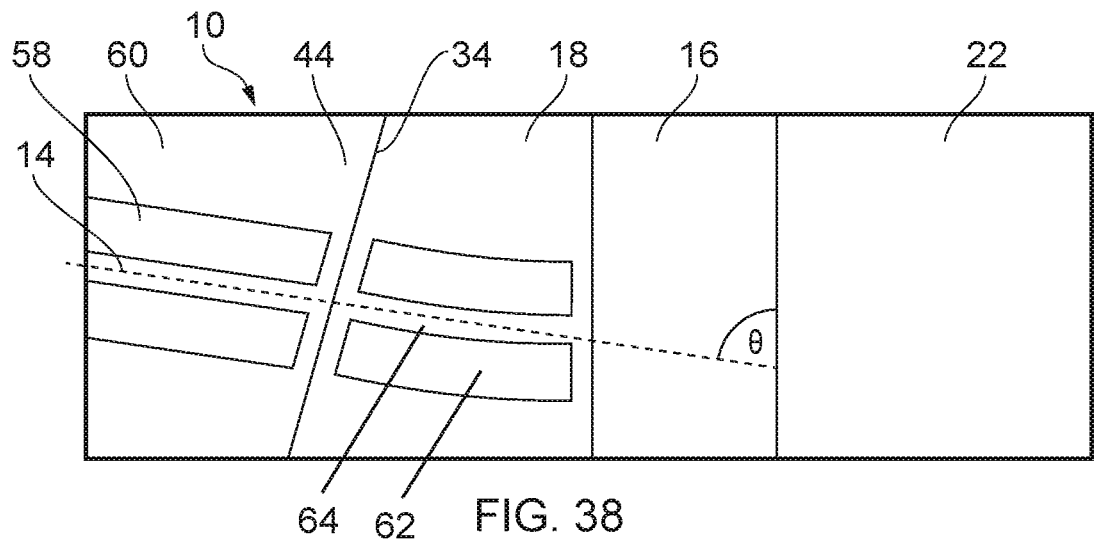
FIG. 38 shows a top view on the x-y plane (top drawing) of a fifteenth embodiment of the optical out-coupler unit

FIG. 38 shows a further embodiment of the optical out-coupler unit 10 which includes the features of the out-coupler unit 10 of FIG. 37 except for the following differences. The second waveguide 64 and/or the filler cavities 62 is not straight but bent. The second waveguide 64 may include a Euler bend. The first end surface of the second waveguide 64 is parallel to the facet 34. However, in the embodiment of FIG. 38, unlike the embodiment of FIG. 37, a normal to the second end surface is orthogonal to the reflective surface, i.e. the angle θ of the second end surface with respect to the facet 34 is 90°. In other words, the bend second waveguide 64 provides a transition between the inclined first end surface at the angle θ (parallel to the facet 34) and the second end surface at the angle of 90°.

What is claimed is:

1. An optical out-coupler unit for out-coupling light from a waveguide, comprising:
    a substrate having a planar top surface;
    a silicon rib waveguide arranged on the top surface of the substrate and having a facet, the rib waveguide comprising a base section and a ridge protruding from the base section;
    a silicon support layer, a first portion of the support layer being spaced apart from the facet and opposing the facet, a second portion of the support layer adjacent to the first portion of the support layer having a side surface and a top surface, and the top surface of the second portion of the support layer and a top surface of the base section having a same height from the substrate;
    a reflection layer defining a reflective surface, the reflection layer being on the support layer and extending from the side surface onto the top surface of the second portion of the support layer, the reflection layer and the support layer being different in material, and the reflection layer having a thickness of 250 nm or more;
    a filler portion between the facet and the reflective surface, the filler portion being directly on the reflection layer and comprising a material having a first refractive index, and the reflection layer having a second refractive index less than the first refractive index such that a light beam coming from the waveguide and impinging on the reflection layer is reflected by total internal reflection;
    a cladding on the base section and on a side of the ridge of the rib waveguide, the cladding and the reflection layer being the same in material, a thickness of the reflection layer on the top surface of the second portion of the support layer and a thickness of the cladding being the same, and a top surface of the ridge of the rib waveguide, a top surface of the cladding, a top surface of the filler portion, and a top surface of the reflection layer on the second portion of the support layer together forming a continuous flat surface; and
    an anti-reflection coating comprising a first top layer arranged on a portion of the continuous flat surface formed by at least part of the top surface of the filler portion, at least part of the top surface of the ridge, at least part of the top surface of the cladding, and at least part of the top surface of the reflection layer, the first top layer having a refractive index less than a refractive index of the filler portion,
    wherein the reflective surface is arranged spaced apart from the facet and opposing the facet,
    wherein the reflective surface is inclined with respect to a normal to the top surface of the substrate by 46° to 51°,
    wherein the reflective surface is aligned on the substrate, in a plan view parallel to the top surface of the substrate, at approximately 90° to a direction of light emitted from the facet.

2. The optical out-coupler unit of claim 1, wherein the filler portion comprises amorphous silicon and/or the reflection layer comprises silicon oxide (SiO2).

3. The optical out-coupler unit of claim 1, wherein the first top layer comprises silicon nitride (SiN).

4. The optical out-coupler unit of claim 1, wherein the first top layer has a thickness of λ/4, λ being a wavelength in a wavelength range of electromagnetic radiation passing through the first top layer.

5. The optical out-coupler unit of claim 4, wherein the thickness of the first top layer is between 100 nm and 300 nm.

6. The optical out-coupler unit of claim 1, wherein the anti-reflection coating further comprises a second top layer arranged on the first top layer.

7. The optical out-coupler unit of claim 6, wherein the second top layer comprises a material having a refractive index that is smaller than the refractive index of a material of the first top layer.

8. The optical out-coupler unit of claim 6, wherein the first top layer and/or the second top layer have a thickness of λ/4, λ being a wavelength in a wavelength range of electromagnetic radiation passing through the first top layer and the second top layer.

9. The optical out-coupler unit of claim 6, wherein the first top layer comprises silicon nitride (SiN) and has a thickness between 100 nm and 200 nm, and/or the second top layer comprises silicon oxide (SiO2) and has a thickness between 100 nm and 200 nm.

10. The optical out-coupler unit of claim 1, wherein the waveguide includes a T-bar providing the facet.

* * * * *